US012771869B2

(12) United States Patent
Yamamoto et al.

(10) Patent No.: US 12,771,869 B2
(45) Date of Patent: Oct. 20, 2026

(54) IMAGE DECODING DEVICE, IMAGE ENCODING DEVICE, AND STORAGE MEDIUM

(71) Applicant: Sharp Kabushiki Kaisha, Sakai City (JP)

(72) Inventors: Tomoyuki Yamamoto, Sakai City (JP); Tomohiro Ikai, Sakai City (JP); Yukinobu Yasugi, Sakai City (JP); Takeshi Tsukuba, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/903,386

(22) Filed: Oct. 1, 2024

(65) Prior Publication Data

US 2025/0039438 A1 Jan. 30, 2025

Related U.S. Application Data

(63) Continuation of application No. 18/113,236, filed on Feb. 23, 2023, now Pat. No. 12,149,735, which is a (Continued)

(30) Foreign Application Priority Data

Jan. 13, 2012 (JP) ................................ 2012-005630

(51) Int. Cl.
*H04N 19/587* (2014.01)
*H04N 19/11* (2014.01)
(Continued)

(52) U.S. Cl.
CPC ........... *H04N 19/587* (2014.11); *H04N 19/11* (2014.11); *H04N 19/14* (2014.11); *H04N 19/176* (2014.11);
(Continued)

(58) Field of Classification Search
CPC ...... H04N 19/587; H04N 19/11; H04N 19/14; H04N 19/176; H04N 19/186; H04N 19/70; H04N 19/117; H04N 19/82
(Continued)

(56) References Cited

U.S. PATENT DOCUMENTS 6,259,823 B1 * 7/2001 Lee .......................... G06T 5/20 382/268
2005/0195898 A1 * 9/2005 Moon .................... H04N 19/00 348/700
(Continued)

OTHER PUBLICATIONS

Yamamoto et al., "Image Decoding Device, Image Encoding Device, and Image Decoding Method", U.S. Appl. No. 18/113,236, filed Feb. 23, 2023.

*Primary Examiner* — Edemio Navas, Jr.
*Assistant Examiner* — Jimmy S Lee
(74) *Attorney, Agent, or Firm* — Keating & Bennett, LLP

(57) ABSTRACT

Memory required during decoding is reduced.
A video image decoding device (1) is equipped with main direction deriving means (1453A) that references a prediction mode definition DEFPM(1), and from a prediction mode number, derives a main direction of a prediction direction corresponding to a prediction mode, and a gradient deriver (1453B) that references a gradient definition table DEFANG(1), and derives a gradient of the prediction direction.

4 Claims, 26 Drawing Sheets

| | refPicFilterFlag | | | | |
|---|---|---|---|---|---|
| IntraPred Mode | nS = 4 | nS = 8 | nS=16 | nS=32 | nS=64 |
| 0 | 0 | 1 | 1 | 1 | 1 |
| 1-3 | 0 | 0 | 0 | 0 | 0 |
| 4 | 0 | 1 | 1 | 1 | 1 |
| 5-16 | 0 | 0 | 1 | 1 | 1 |
| 17,18 | 0 | 1 | 1 | 1 | 1 |
| 19-23 | 0 | 0 | 1 | 1 | 1 |
| 24-27 | 0 | 0 | 0 | 1 | 1 |
| 28-34 | 0 | 0 | 1 | 1 | 1 |
| 35 | 0 | 0 | 0 | 1 | 1 |

Related U.S. Application Data continuation of application No. 17/019,453, filed on Sep. 14, 2020, now Pat. No. 11,627,337, which is a continuation of application No. 14/371,766, filed as application No. PCT/JP2013/050356 on Jan. 11, 2013, now abandoned.

(51) Int. Cl.

| | |
|---|---|
| ***H04N 19/14*** | (2014.01) |
| ***H04N 19/176*** | (2014.01) |
| ***H04N 19/186*** | (2014.01) |
| ***H04N 19/70*** | (2014.01) |
| *H04N 19/117* | (2014.01) |
| *H04N 19/82* | (2014.01) |

(52) U.S. Cl.

CPC ........... *H04N 19/186* (2014.11); *H04N 19/70* (2014.11); *H04N 19/117* (2014.11); *H04N 19/82* (2014.11)

(58) Field of Classification Search

USPC ..................................................... 375/240.12

See application file for complete search history.

(56) References Cited

U.S. PATENT DOCUMENTS

| | | | | |
|---|---|---|---|---|
| 2006/0110062 A1* | 5/2006 | Chiang | H04N 19/16 | 375/E7.161 |
| 2008/0205765 A1* | 8/2008 | Fan | H04N 19/90 | 382/191 |
| 2009/0168878 A1* | 7/2009 | Kawashima | H04N 19/132 | 375/E7.076 |
| 2011/0038415 A1* | 2/2011 | Min | H04N 19/176 | 375/E7.243 |
| 2011/0310982 A1* | 12/2011 | Yang | H04N 21/234327 | 375/E7.2 |

* cited by examiner

| INTRA PREDICTION MODE | INTRA PREDICTION METHOD |
|---|---|
| 0 | Intra_Planar |
| 1 | Intra_Vertical |
| 2 | Intra_Horizontal |
| 3 | Intra_DC |
| OTHERWISE (4..34) | Intra_Angular |
| 35 | Intra_FromLuma (USED ONLY FOR CHROMA) |

FIG. 6

DEFPM1

| NAME | intraPred Mode |
|---|---|
| Planar | 0 |
| HOR | 1 |
| VER | 2 |
| DC | 3 |
| VER-8 | 4 |
| HOR-6 | 5 |
| VER-6 | 6 |
| HOR-4 | 7 |
| VER-4 | 8 |
| HOR-2 | 9 |
| VER-2 | 10 |
| HOR+2 | 11 |
| VER+2 | 12 |
| HOR+4 | 13 |
| VER+4 | 14 |
| HOR+6 | 15 |
| VER+6 | 16 |
| HOR+8 | 17 |
| VER+8 | 18 |

| NAME | intraPred Mode |
|---|---|
| HOR-7 | 19 |
| VER-7 | 20 |
| HOR-5 | 21 |
| VER-5 | 22 |
| HOR-3 | 23 |
| VER-3 | 24 |
| HOR-1 | 25 |
| VER-1 | 26 |
| HOR+1 | 27 |
| VER+1 | 28 |
| HOR+3 | 29 |
| VER+3 | 30 |
| HOR+5 | 31 |
| VER+5 | 32 |
| HOR+7 | 33 |
| VER+7 | 34 |
| LM | 35 |

FIG. 7

| log2PartSize | intraPredModeNum |
|---|---|
| 2 | 18 |
| 3 | 35 |
| 4 | 35 |
| 5 | 35 |
| 6 | 35 |

FIG. 8

| intra_chroma_pred_mode | IntraPredMode [ xB ] [ yB ] | |
|---|---|---|
| | X (0 <= X < 4) | Y (4 <= Y < 35) |
| 0 | LM | LM |
| 1 | VER | VER |
| 2 | HOR | HOR |
| 3 | DC | DC |
| 4 | Planar | Planar |
| 5 | VER+8 | Y |

FIG. 9

DEFPM2

| NAME | intraPred Mode |
|---|---|
| Planar | 0 |
| VER | 1 |
| HOR | 2 |
| VER-8 | 3 |
| DC | 4 |
| VER+8 | 5 |
| HOR+8 | 6 |
| VER-2 | 7 |
| HOR-2 | 8 |
| VER+2 | 9 |
| HOR+2 | 10 |
| VER-4 | 11 |
| HOR-4 | 12 |
| VER+4 | 13 |
| HOR+4 | 14 |
| VER-6 | 15 |
| HOR-6 | 16 |
| VER+6 | 17 |
| HOR+6 | 18 |

| NAME | intraPred Mode |
|---|---|
| VER-1 | 19 |
| HOR-1 | 20 |
| VER+1 | 21 |
| HOR+1 | 22 |
| VER-3 | 23 |
| HOR-3 | 24 |
| VER+3 | 25 |
| HOR+3 | 26 |
| VER-5 | 27 |
| HOR-5 | 28 |
| VER+5 | 29 |
| HOR+5 | 30 |
| VER-7 | 31 |
| HOR-7 | 32 |
| VER+7 | 33 |
| HOR+7 | 34 |
| LM | 35 |

FIG. 11
(A) YUV4 : 2 : 0, 8×8CU, PartType=N×N
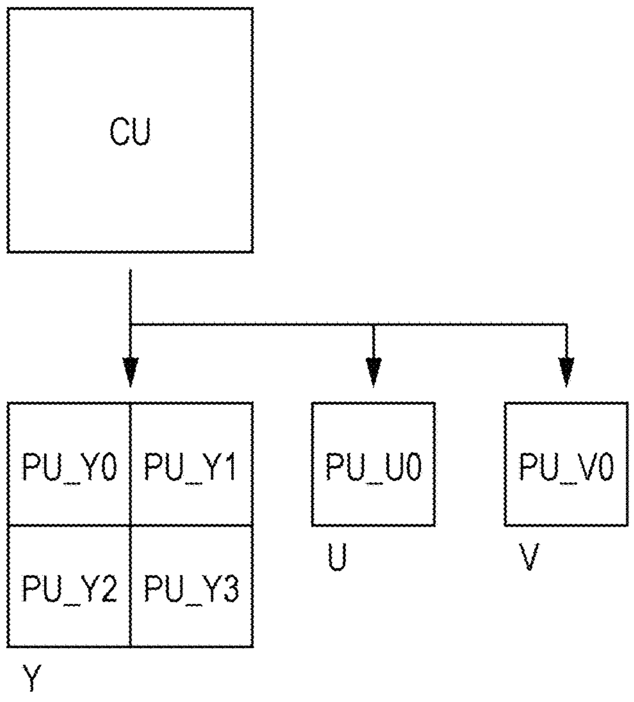
(B) YUV4 : 2 : 0, 16×16CU, PartType=2N×2N
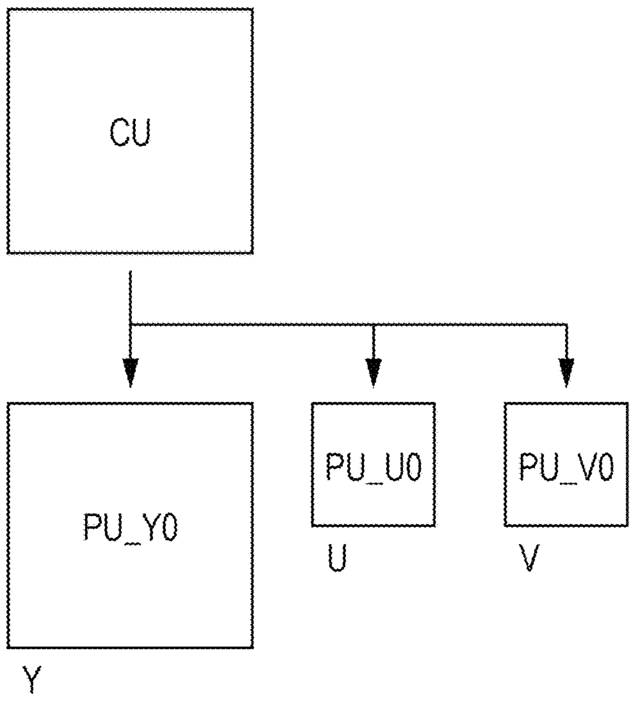

FIG. 12

| | refPicFilterFlag | | | | |
|---|---|---|---|---|---|
| IntraPred Mode | nS = 4 | nS = 8 | nS=16 | nS=32 | nS=64 |
| 0 | 0 | 1 | 1 | 1 | 1 |
| 1-3 | 0 | 0 | 0 | 0 | 0 |
| 4 | 0 | 1 | 1 | 1 | 1 |
| 5-16 | 0 | 0 | 1 | 1 | 1 |
| 17,18 | 0 | 1 | 1 | 1 | 1 |
| 19-23 | 0 | 0 | 1 | 1 | 1 |
| 24-27 | 0 | 0 | 0 | 1 | 1 |
| 28-34 | 0 | 0 | 1 | 1 | 1 |
| 35 | 0 | 0 | 0 | 1 | 1 |

FIG. 15

DEFANG1

| intra pred mode | HOR | HOR+1 | HOR+2 | HOR+3 | HOR+4 | HOR+5 | HOR+6 | HOR+7 | HOR+8 |
|---|---|---|---|---|---|---|---|---|---|
| intraPred Angle | 0 | 2 | 5 | 9 | 13 | 17 | 21 | 26 | 32 |

| intra pred mode | VER | VER+1 | VER+2 | VER+3 | VER+4 | VER+5 | VER+6 | VER+7 | VER+8 |
|---|---|---|---|---|---|---|---|---|---|
| intraPred Angle | 0 | 2 | 5 | 9 | 13 | 17 | 21 | 26 | 32 |

| intra pred mode | | HOR-1 | HOR-2 | HOR-3 | HOR-4 | HOR-5 | HOR-6 | HOR-7 | HOR-8 |
|---|---|---|---|---|---|---|---|---|---|
| intraPred Angle | | -2 | -5 | -9 | -13 | -17 | -21 | -26 | -32 |

| intra pred mode | | VER-1 | VER-2 | VER-3 | VER-4 | VER-5 | VER-6 | VER-7 | VER-8 |
|---|---|---|---|---|---|---|---|---|---|
| intraPred Angle | | -2 | -5 | -9 | -13 | -17 | -21 | -26 | -32 |

FIG. 16

DEFANG1r

| intra pred mode | HOR/ VER | HOR+1/ VER+1 | HOR+2/ VER+2 | HOR+3/ VER+3 | HOR+4/ VER+4 | HOR+5/ VER+5 | HOR+6/ VER+6 | HOR+7/ VER+7 | HOR+8/ VER+8 |
|---|---|---|---|---|---|---|---|---|---|
| intraPred Angle | 0 | 2 | 5 | 9 | 13 | 17 | 21 | 26 | 32 |

| intra pred mode | | HOR-1/ VER-1 | HOR-2/ VER-2 | HOR-3/ VER-3 | HOR-4/ VER-4 | HOR-5/ VER-5 | HOR-6/ VER-6 | HOR-7/ VER-7 | HOR-8/ VER-8 |
|---|---|---|---|---|---|---|---|---|---|
| intraPred Angle | | -2 | -5 | -9 | -13 | -17 | -21 | -26 | -32 |

DEFANG2

| intra pred mode | HOR/ VER | HOR+1/ VER+1/ HOR-1/ VER-1 | HOR+2/ VER+2/ HOR-2/ VER-2 | HOR+3/ VER+3/ HOR-3/ VER-3 | HOR+4/ VER+4/ HOR-4/ VER-4 | HOR+5/ VER+5/ HOR-5/ VER-5 | HOR+6/ VER+6/ HOR-6/ VER-6 | HOR+7/ VER+7/ HOR-7/ VER-7 | HOR+8/ VER+8/ VER-8 |
|---|---|---|---|---|---|---|---|---|---|
| (m+1)>>2 | 0 | 5 | 2 | 6 | 3 | 7 | 4 | 8 | 1 |
| absIntraPred Angle | 0 | 2 | 5 | 9 | 13 | 17 | 21 | 26 | 32 |

FIG. 27

DEFPM3

| NAME | intraPred Mode |
|---|---|
| Planar | 0 |
| DC | 1 |
| VER-8 | 2 |
| VER-7 | 3 |
| VER-6 | 4 |
| VER-5 | 5 |
| VER-4 | 6 |
| VER-3 | 7 |
| VER-2 | 8 |
| VER-1 | 9 |
| VER | 10 |
| VER+1 | 11 |
| VER+2 | 12 |
| VER+3 | 13 |
| VER+4 | 14 |
| VER+5 | 15 |
| VER+6 | 16 |
| VER+7 | 17 |
| VER+8 | 18 |

| NAME | intraPred Mode |
|---|---|
| HOR-7 | 19 |
| HOR-6 | 20 |
| HOR-5 | 21 |
| HOR-4 | 22 |
| HOR-3 | 23 |
| HOR-2 | 24 |
| HOR-1 | 25 |
| HOR | 26 |
| HOR+1 | 27 |
| HOR+2 | 28 |
| HOR+3 | 29 |
| HOR+4 | 30 |
| HOR+5 | 31 |
| HOR+6 | 32 |
| HOR+7 | 33 |
| HOR+8 | 34 |
| LM | 35 |

FIG. 29
(a)
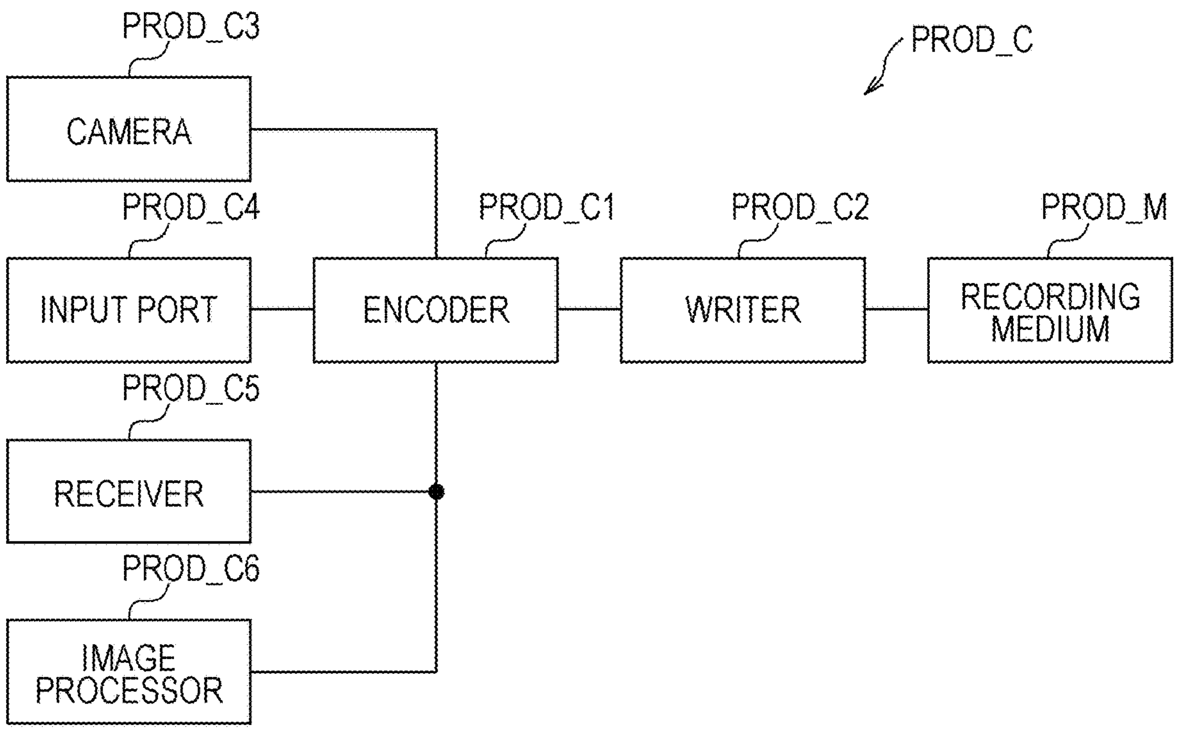
(b)
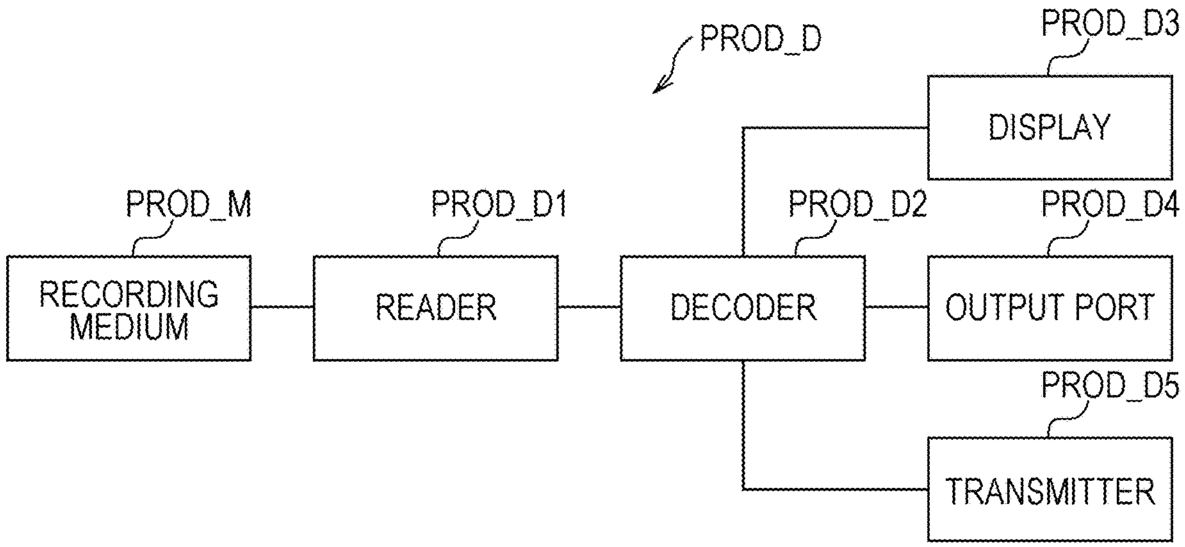

FIG. 30

(a)

| | intraPredModeNum | |
|---|---|---|
| log2PartSize | intraPredPrecision=0 | intraPredPrecision=1 |
| 2 | 18 | 10 |
| 3 | 35 | 10 |
| 4 | 35 | 10 |
| 5 | 35 | 10 |
| 6 | 35 | 10 |

(b)

| | intraPredModeNum | |
|---|---|---|
| log2PartSize | intraPredPrecision=0 | intraPredPrecision=1 |
| 2 | 18 | 4 |
| 3 | 35 | 4 |
| 4 | 35 | 4 |
| 5 | 35 | 4 |
| 6 | 35 | 4 |

FIG. 31

DEFPM4

| NAME | intraPred Mode |
|---|---|
| Planar | 0 |
| VER | 1 |
| HOR | 2 |
| DC | 3 |
| VER-8 | 4 |
| VER-4 | 5 |
| HOR-4 | 6 |
| VER+4 | 7 |
| HOR+4 | 8 |
| VER+8 | 9 |
| HOR+8 | 10 |
| VER-2 | 11 |
| HOR-2 | 12 |
| VER+2 | 13 |
| HOR+2 | 14 |
| VER-6 | 15 |
| HOR-6 | 16 |
| VER+6 | 17 |
| HOR+6 | 18 |

| NAME | intraPred Mode |
|---|---|
| VER-1 | 19 |
| HOR-1 | 20 |
| VER+1 | 21 |
| HOR+1 | 22 |
| VER-3 | 23 |
| HOR-3 | 24 |
| VER+3 | 25 |
| HOR+3 | 26 |
| VER-5 | 27 |
| HOR-5 | 28 |
| VER+5 | 29 |
| HOR+5 | 30 |
| VER-7 | 31 |
| HOR-7 | 32 |
| VER+7 | 33 |
| HOR+7 | 34 |
| LM | 35 |

IMAGE DECODING DEVICE, IMAGE ENCODING DEVICE, AND STORAGE MEDIUM

TECHNICAL FIELD

The present invention relates to an image decoding device that decodes encoded data representing an image, an image encoding device that generates encoded data by encoding an image, and a data structure of encoded data generated by the image encoding device.

BACKGROUND ART

In order to efficiently transmit or record video images, there are used a video image encoding device that generates encoded data by encoding video images, and a video image decoding device that generates decoded images by decoding such encoded data.

Specific video image coding schemes include, for example, the scheme implemented in the KTA software, which is a jointly developed codec by H.264/MPEG-4 AVC and the Video Coding Experts Group (VCEG), the scheme implemented in the Test Model under Consideration (TMuC) software, as well as the scheme (see NPL 1) proposed in the successor codec, High-Efficiency Video Coding (HEVC).

In these video image coding schemes, ordinarily a predicted image is generated on the basis of a locally decoded image obtained by encoding/decoding an input image, and the prediction difference (also called the "differential image" or "residual image") obtained by subtracting the predicted image from the input image (original image) is encoded. Also, inter-frame prediction (inter prediction) and intra-frame prediction (intra prediction) may be cited as methods of generating predicted images.

With inter prediction, predicted images in a frame being predicted are generated in units of prediction units (for example, blocks) by applying motion compensation using motion vectors to reference images within a reference frame (decoded image) in which the entire frame has been decoded.

On the other hand, with intra prediction, predicted images in a frame are successively generated on the basis of locally decoded images within that same frame. Specifically, with intra prediction, ordinarily a prediction mode is selected for each prediction unit (for example, each block) from among any of the prediction modes included in a predetermined prediction mode group, and in addition, a predicted image is generated on the basis of the prediction method associated with the selected prediction mode. Prediction methods include horizontal prediction, vertical prediction, DC prediction, planar prediction, and angular prediction. A unique prediction mode number is assigned to each prediction mode. At the video image decoding device, the prediction method to apply to an area to be predicted is decided on the basis of a prediction mode number decoded from encoded data.

Note that prediction modes corresponding to multiple prediction directions are associated with angular prediction. At the video image decoding device, a prediction direction is decided on the basis of a prediction mode number, and a predicted image is generated on the basis of the decided prediction direction.

Also, in NPL 1, the prediction mode number is also used for purposes other than the above, and is specifically used to select a filter for a reference area that is referenced during predicted image generation by intra prediction, to select a scan method when decoding the transform coefficients of the prediction difference, and to select a transform method to apply to the prediction difference.

CITATION LIST

Non Patent Literature

NPL 1: "WD5: Working Draft 5 of High-Efficiency Video Coding (JCTVC-G1103_d0)", Joint Collaborative Team on Video Coding (JCT-VC) of ITU-T SG16 WP3 and ISO/IEC JTC1/SC29/WG11 7th Meeting: Geneva, CH, 21-30 Nov. 2011 (published 19 Dec. 2011).

SUMMARY OF INVENTION

Technical Problem

However, for the various processes using the prediction mode number discussed above, a table associating prediction modes and processes becomes necessary, and there is a problem of increased memory.

For example, in NPL 1, when deciding a prediction direction to use for predicted image generation from a prediction mode number, a table is used to map the prediction mode number to an index of prediction directions in angular order, and the index is used in the predicted image generation process. Also, for the selection of a filter, the selection of a prediction difference scan method, and the selection of a prediction difference transform method, a transform table is used in order to select the prediction mode number and the filter, scan method, or transform method to apply.

For this reason, with the method of NPL 1, multiple tables that associate prediction modes and processes become necessary, which is problematic because of the memory that these tables require.

The present invention has been devised in light of the above problem, and an object thereof is to realize an image decoding device and the like able to reduce memory by not using a table of prediction mode numbers assigned to prediction methods in order to select various processes using prediction modes, or alternatively, by using a prediction mode number that may be selected using a table of smaller size.

Also provided is an image decoding device and the like able to conduct a decoding process according to an association property between a prediction mode number and a prediction direction.

Solution to Problem

In order to solve the above problem, an image decoding device according to the present invention is an image decoding device that decodes an image from encoded data by generating a predicted image with an intra prediction method associated with a prediction mode, characterized in that for an intra prediction method of directional prediction, a prediction mode corresponding to a prediction direction is associated with a prediction mode number for specifying the prediction mode, the image decoding device comprising decoding means including reference pixel configuring means that determines whether or not the prediction mode number is less than or equal to a designated threshold, and configures reference pixels on the basis of the determined result, in which the decoding means conducts a designated decoding process in accordance with the configured reference pixel.

In order to solve the above problem, an image decoding device according to the present invention is an image decoding device that decodes an image from encoded data by generating a predicted image with an intra prediction method associated with a prediction mode, characterized in that for an intra prediction method of directional prediction, an association between a prediction mode corresponding to a prediction direction expressed by a main direction and gradient, and a prediction mode number for uniquely specifying the prediction mode, has a property enabling a designated feature related to at least one of the main direction and the gradient to be specified from the prediction mode number, the image decoding device comprising feature specifying means that specifies the feature from the prediction mode number decoded from the encoded data, on the basis of the association, and decoding means that conducts a designated decoding process in accordance with the feature.

In order to solve the above problem, an image decoding device according to the present invention is an image decoding device that decodes an image that has been encoded by generating a predicted image with an intra prediction method associated with a prediction mode, characterized by comprising: arithmetic decoding means that, to decode a prediction mode of a target prediction unit, decodes, from encoded data by arithmetic decoding, an estimated prediction mode flag indicating whether or not to use an estimated prediction mode, and an estimated prediction mode index for designating one of multiple estimated prediction modes; estimated prediction mode deriving means that derives the plurality of estimated prediction modes from already-decoded prediction modes assigned to a plurality of nearby prediction units near the target prediction unit; and prediction mode decoding means that, in a case in which context for arithmetic decoding of the estimated prediction mode index is not configured, selects an estimated prediction mode indicated by the estimated prediction mode index if the estimated prediction mode flag indicates a match with an estimated prediction mode, and uses a swapping process for the plurality of estimated prediction modes if the estimated prediction mode flag does not indicates a match with an estimated prediction mode.

In order to solve the above problem, an image decoding device according to the present invention is an image decoding device that decodes an image that has been encoded by generating a predicted image with an intra prediction method associated with a prediction mode, characterized by comprising: filter selecting means that selects a filter to apply to reference pixels used in the predicted image generation, on the basis of a prediction mode number associated with the prediction mode, and a size of a prediction unit, which is the unit of generating the predicted image; wherein, in a case in which the size of a target prediction unit is large, the filter selecting means selects to apply a reference pixel filter to a prediction mode number associated with a prediction mode associated with a prediction direction having a smaller angle obtained with respect to a main direction compared to a case in which the size of a target prediction unit is small.

In order to solve the above problem, an image encoding device according to the present invention is an image encoding device that generates a predicted image with an intra prediction method associated with a prediction mode, and encodes a prediction difference obtained by taking a difference between an original image and the predicted image, characterized in that for an intra prediction method of directional prediction, a prediction mode corresponding to a prediction direction is associated with a prediction mode number for specifying the prediction mode, the image encoding device comprising encoding means that conducts a designated encoding process, and includes reference pixel configuring means that determines whether or not the prediction mode number is less than or equal to a designated threshold, and configures reference pixels on the basis of the determined result.

In order to solve the above problem, an image encoding device according to the present invention is an image encoding device that generates a predicted image with an intra prediction method associated with a prediction mode, and encodes a prediction difference obtained by taking a difference between an original image and the predicted image, characterized in that for an intra prediction method of directional prediction, an association between a prediction mode corresponding to a prediction direction determined by a main direction and gradient, and a prediction mode number for uniquely specifying the prediction mode, has a property enabling a designated feature related to at least one of the main direction and the gradient to be specified from the prediction mode number, the image encoding device comprising: feature specifying means that specifies the feature from the prediction mode number associated with the prediction mode, on the basis of the association; and encoding means that conducts a designated encoding process in accordance with the feature.

Advantageous Effects of Invention

As above, an image decoding device or an image encoding device according to the present invention exhibits the advantageous effect of enabling a reduction in the memory required during decoding or encoding.

Also, as above, an image decoding device according to the present invention enables a reduction in the processing load required to derive a prediction mode in the case of using an estimated prediction mode.

Also, as above, it is possible to conduct a decoding process according to an association property between a prediction mode number and a prediction direction.

BRIEF DESCRIPTION OF DRAWINGS

FIG. 6 is a diagram illustrating an example of a prediction mode definition, which defines associations between intra prediction methods and prediction mode numbers.

FIG. 7 is a diagram illustrating the relationship between the log base 2 of the PU size (log 2PartSize) and the number of prediction modes.

FIG. 8 is a diagram illustrating definitions of chroma prediction modes according to the prediction mode number of a corresponding luma prediction mode.

FIG. 9 is a diagram illustrating another example of a prediction mode definition, which defines associations between intra prediction methods and prediction mode numbers.

FIG. 11 is a diagram illustrating the PU configuration order and the PUs included in a CU in the case of an input image in 4:2:0 YUV format. (A) illustrates PUs in a CU in the case in which the size of the target CU is 8×8 pixels, and the split type is N×N. (B) illustrates PUs in a CU in the case in which the size of the target CU is 16×16 pixels, and the split type is 2N×2N.

FIG. 12 is a diagram illustrating the relationship between a prediction mode number according to the prediction mode definition in FIG. 6, and the value of a filter application flag (refPicFilterFlag).

FIG. 15 is a table illustrating an example of correspondence relationships between prediction mode identifiers and values of a gradient intraPredAngle.

FIG. 16 is a table illustrating another example of correspondence relationships between prediction mode identifiers and values of a gradient intraPredAngle.

FIG. 27 is a table illustrating yet another example of correspondence relationships between prediction mode identifiers and values of a gradient intraPredAngle.

FIG. 29 is a diagram illustrating a configuration of a recording device on board the above video image encoding device, and a playback device on board the above video image decoding device, in which (a) illustrates the recording device on board the above video image encoding device, and (b) illustrates the playback device on board the above video image decoding device.

FIG. 30 is a diagram illustrating the relationship between combinations of a variable intraPredPrecison and the log base 2 of the PU size (log 2PartSize), and the number of prediction modes.

FIG. 31 is a diagram illustrating another example of a prediction mode definition, which defines associations between intra prediction methods and prediction mode numbers.

DESCRIPTION OF EMBODIMENTS

Overview

Figure 1:
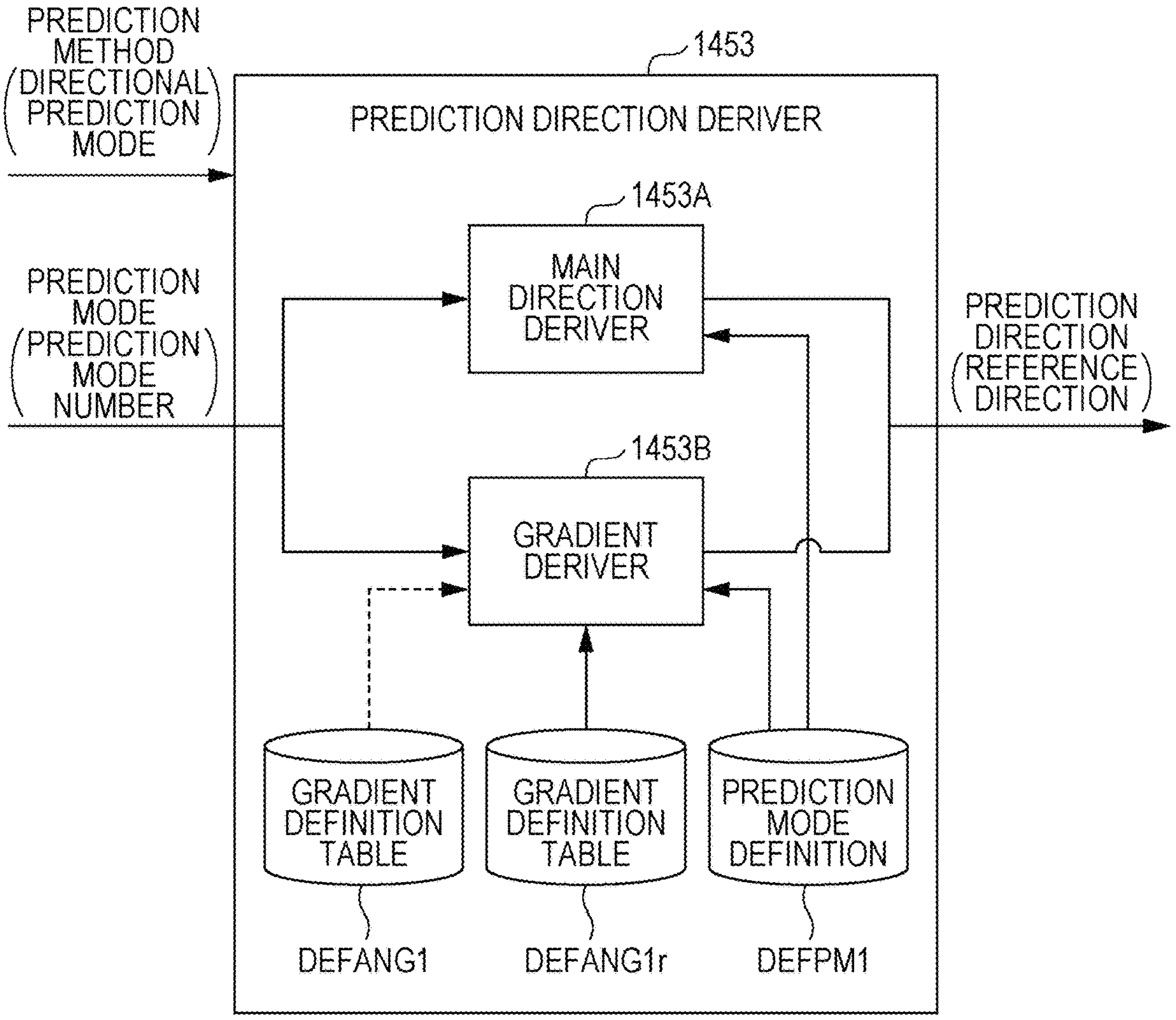
FIG. 1 is a function block diagram illustrating an exemplary configuration of a prediction direction deriver in a video image decoding device according to an embodiment of the present invention.
Figure 2:
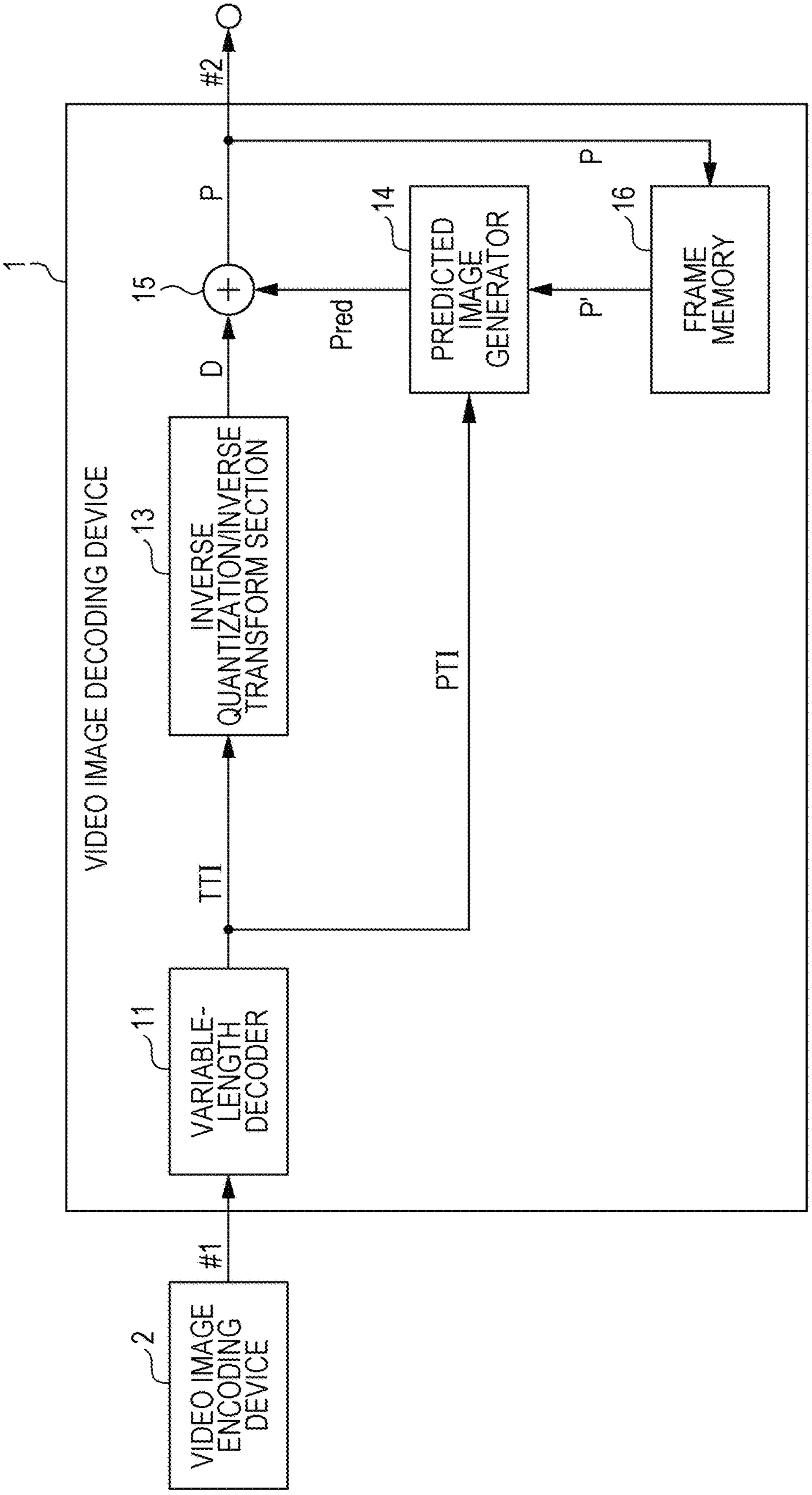
FIG. 2 is a function block diagram illustrating a schematic configuration of the above video image decoding device.

An embodiment of the present invention will be described with reference to FIGS. 1 to 31. First, FIG. 2 will be referenced to describe an overview of a video image decoding device (image decoding device) 1 and a video image encoding device (image encoding device) 2. FIG. 2 is a function block diagram illustrating a schematic configuration of the video image decoding device 1.

The video image decoding device 1 and the video image encoding device 2 illustrated in FIG. 2 implement technology adopted in the H.264/MPEG-4 AVC standard, technology adopted in the KTA software, which is a jointly developed codec by the Video Coding Experts Group (VCEG), technology adopted in the Test Model under Consideration (TMuC) software, as well as technology proposed in the successor codec, High-Efficiency Video Coding (HEVC).

The video image encoding device 2 generates encoded data #1 by entropy-coding syntax values whose transmission from the encoder to the decoder is prescribed in these video image coding schemes.

Established entropy coding schemes include context-based adaptive variable-length coding (CAVLC) and context-based adaptive binary arithmetic coding (CABAC).

With encoding/decoding according to CAVLC and CABAC, a process adapted to the context is conducted. Context refers to the encoding/decoding conditions, and is determined by the previous encoding/decoding results of related syntax. The related syntax may be, for example, various syntax related to intra prediction and inter prediction, various syntax related to luminance (luma) and chrominance (chroma), and various syntax related to the coding unit (CU) size. Also, with CABAC, a binary position to be encoded/decoded in binary data (a binary sequence) corresponding to syntax may also be used as context in some cases.

With CAVLC, a VLC table used for encoding is adaptively modified to encode various syntax. On the other hand, with CABAC, a binarization process is performed on syntax that may take multiple values, such as the prediction mode and the transform coefficients, and the binary data obtained by this binarization process is adaptively encoded by arithmetic coding according to the probability of occurrence. Specifically, multiple buffers that hold the probability of a binary value (0 or 1) are prepared, one of the buffers is selected according to context, and arithmetic coding is conducted on the basis of the probability recorded in that buffer. Also, by updating the probability in that buffer on the basis of the binary value to decode/encode, a suitable probability may be maintained according to context.

The encoded data #1 representing a video image encoded by the video image encoding device 2 is input into the video image decoding device 1. The video image decoding device 1 decodes the input encoded data #1, and externally outputs a video image #2. Before giving a detailed description of the video image decoding device 1, the structure of the encoded data #1 will be described below.

<Structure of Encoded Data>

Figures 3, 4:
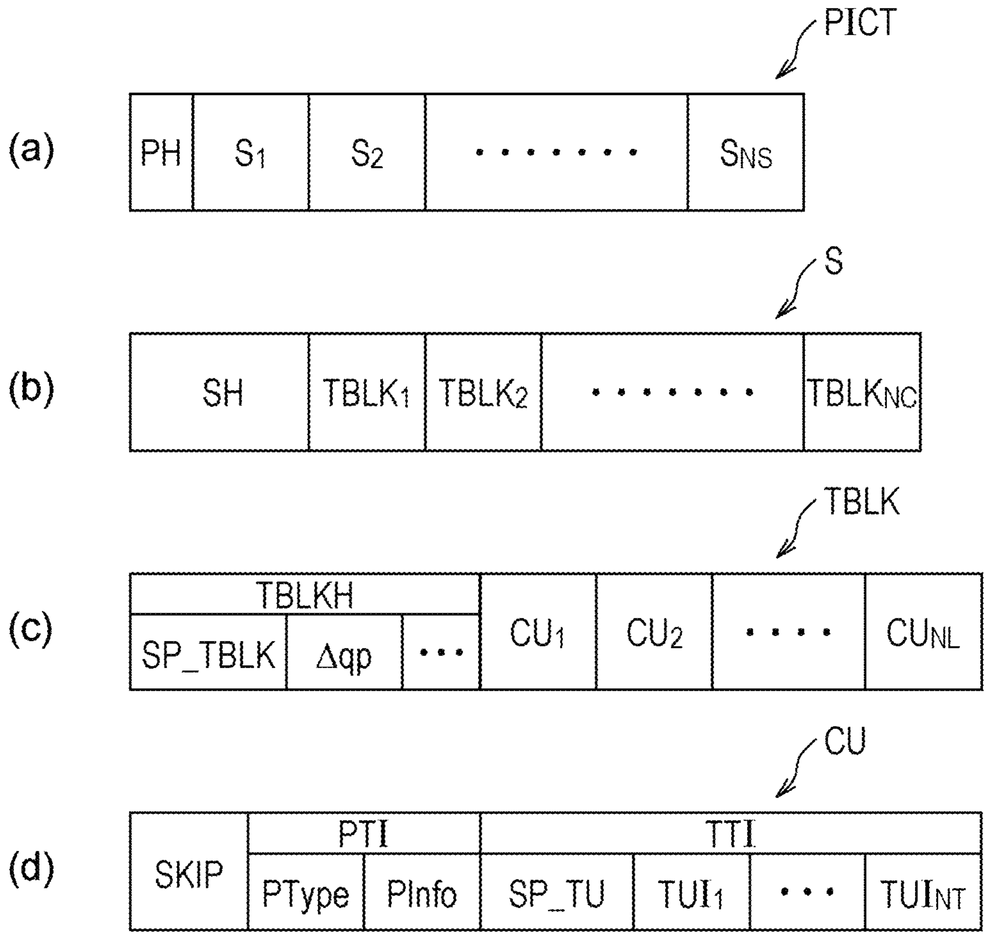
FIG. 3 is a diagram illustrating the data structure of encoded data that is generated by a video image encoding device according to an embodiment of the present invention, and decoded by the above video image decoding device, in which (a) to (d) are diagrams illustrating the picture layer, the slice layer, the tree block layer, and the CU layer, respectively.
FIG. 4 is a diagram illustrating an example of types of intra prediction methods used by the above video image decoding device, and associated prediction mode numbers.

FIG. 3 will be used to describe an exemplary structure of encoded data #1 that is generated by the video image encoding device 2 and decoded by the video image decoding device 1. As an example, the encoded data #1 includes a sequence, as well as multiple pictures constituting the sequence.

FIG. 3 illustrates the hierarchical structure of the picture layer and below in the encoded data #1. FIGS. 3(*a*) to 3(*d*) are diagrams that illustrate the picture layer that defines a picture PICT, the slice layer that defines a slice S, the tree block layer that defines a tree block TBLK, and the coding unit (CU) layer that defines a CU included in the tree block TBLK, respectively.

(Picture Layer)

In the picture layer, there is defined a set of data that the video image decoding device 1 references in order to decode a picture PICT being processed (hereinafter also referred to as the target picture). As illustrated in FIG. 3(*a*), a picture PICT includes a picture header PH, as well as slices $S_1$ to $S_{NS}$ (NS is the total number of slices included in the picture PICT).

Note that the subscripts of the sign may be omitted in cases where distinguishing each of the slices $S_1$ to $S_{NS}$ is unnecessary. The above similarly applies to other data given subscripts from among the data included in the encoded data #1 described hereinafter.

The picture header PH includes a coding parameter group that the video image decoding device 1 references in order to decide a decoding method for the target picture. For example, the standard value within the picture for the quantization step of the prediction difference (pic_init_qp_minus26) is an example of a coding parameter included in the picture header PH.

Note that the picture header PH may also be referred to as the picture parameter set (PPS).

(Slice Layer)

In the slice layer, there is defined a set of data that the video image decoding device 1 references in order to decode a slice S being processed (hereinafter also referred to as the target slice). As illustrated in FIG. 3(*b*), a slice S includes a slice header SH, as well as tree blocks $TBLK_1$ to $TBLK_{NC}$ (where NC is the total number of tree blocks included in the slice S).

The slice header SH includes a coding parameter group that the video image decoding device 1 references in order to determine a decoding method for the target slice. Slice type designation information (slice_type) that designates a slice type is one example of a coding parameter included in the slice header SH.

Potential slice types that may be designated by the slice type designation information include (1) I slices that use only intra prediction in the case of encoding, (2) P slices that use unidirectional prediction or intra prediction in the case of encoding, and (3) B slices that use unidirectional prediction, bidirectional prediction, or intra prediction in the case of encoding.

In addition, the slice header SH may also include filter parameters referenced by a loop filter (not illustrated) provided in the video image decoding device 1.

(Tree Block Layer)

In the tree block layer, there is defined a set of data that the video image decoding device 1 references in order to decode a tree block TBLK being processed (hereinafter also referred to as the target tree block).

A tree block TBLK includes a tree block header TBLKH and coding unit information $CU_1$ to $CU_{NL}$ (where NL is the total number of coding units included in the tree block TBLK). At this point, first, the relationship between a tree block TBLK and coding unit information CU will be described as follows.

A tree block TBLK is split into units for specifying block sizes for the respective processes of intra prediction or inter prediction, as well as transformation.

The above units of a tree block TBLK are recursively split by quadtree subdivision. A tree structure obtained by such recursive quadtree subdivision is hereinafter designated a coding tree.

Hereinafter, units that correspond to the leaves, that is, the end nodes of a coding tree, will be referred to as coding nodes. Also, since coding nodes become the basic units of the encoding process, hereinafter, coding nodes will also be referred to as coding units (CUs).

In other words, the coding unit information (hereinafter designated CU information) $CU_1$ to $CU_{NL}$ is information corresponding to respective coding nodes (coding units) obtained by recursive quadtree subdivision of a tree block TBLK.

Also, the root of a coding tree is associated with a tree block TBLK. In other words, a tree block TBLK is associated with the highest node of the tree structure of a quadtree subdivision that recursively contains multiple coding nodes.

Note that the size of a particular coding node is half, both vertically and horizontally, of the size of the coding node to which the particular coding node directly belongs (that is, the unit of the node that is one layer above the particular coding node).

Also, the size that a particular coding node may take depends on the size of the tree block, as well as coding node size designation information included in the sequence parameter set (SPS) of the encoded data #1. Since a tree block is the root of a coding node, the maximum size of a coding node is the size of the tree block. Since the maximum size of a tree block matches the maximum size of a coding node (CU), the term “largest CU (LCU)” is also used to refer to a tree block. Regarding the minimum size, the minimum coding node size (log 2min_coding_block_size_minus3) and the difference between the maximum and minimum coding node size (log 2_diff_max_min_coding_block_size) is used as size designation information, for example. In a typical configuration, coding node size designation information is used so that the maximum coding node size is 64×64 pixels, and the minimum coding node size is 8×8 pixels. In this case, the size of a coding node and a coding unit CU becomes any of 64×64 pixels, 32×32 pixels, 16×16 pixels, or 8×8 pixels.

(Tree Block Header)

The tree block header TBLKH includes coding parameters that the video image decoding device 1 references in order to decide a decoding method for the target tree block.

Specifically, there is included tree block split information SP_TBLK that designates a split pattern for each CU in the target tree block, as well as a quantization parameter differential Δqp (qp_delta) that designates the size of the quantization step, as illustrated in FIG. 3(*c*).

The tree block split information SP_TBLK is information expressing a coding tree for splitting a tree block, and more specifically, information that designates the shape and size of each CU included in the target tree block, as well as the position inside the target tree block.

Note that the tree block split information SP_TBLK may also not explicitly include CU shapes and sizes. For example, the tree block split information SP_TBLK may also be a set of flags (split_coding_unit_flag) indicating whether or not to split the entire target tree block or a partial area of the tree block into four subdivisions.

In this case, the shape and size of each CU may be specified by combined use of the tree block shape and size.

Also, the quantization parameter differential Δqp is the difference qp-qp' between a quantization parameter qp for the target tree block, and a quantization parameter qp' for a tree block encoded immediately before that target tree block.

(Cu Layer)

In the CU layer, there is defined a set of data that the video image decoding device 1 references in order to decode a CU being processed (hereinafter also referred to as the target CU).

At this point, before describing the specific content of data included in the CU information CU, the tree structure of data included in a CU will be described. A coding node becomes the root node of a prediction tree (PT) and a transform tree (TT). The prediction tree and the transform tree are described as follows.

In the prediction tree, a coding node is split into one or multiple prediction blocks, and the position and size of each prediction block are defined. Stated differently, prediction blocks are one or more non-overlapping areas that constitute a coding node. In addition, the prediction tree includes the one or more prediction blocks obtained by the above splitting.

A prediction process is conducted on each of these prediction blocks. Hereinafter, these prediction blocks which are the units of prediction will also be referred to as prediction units (PUs).

Roughly speaking, there are two types of splits in a prediction tree: one for the case of intra prediction, and one for the case of inter prediction.

In the case of intra prediction, the splitting method may be 2N×2N (the same size as the coding node), or N×N.

Also, in the case of inter prediction, the splitting method may be 2N×2N (the same size as the coding node), 2N×N, N×2N, N×N, or the like.

Meanwhile, in the transform tree, a coding node is split into one or multiple transform blocks, and the position and size of each transform block are defined. Stated differently, transform blocks are one or more non-overlapping areas that constitute a coding node. In addition, the transform tree includes the one or more transform blocks obtained by the above splitting.

A transform process is conducted on each transform block. Hereinafter, these transform blocks which are the units of transformation will also be referred to as transform units (TUs).

(Data Structure of CU Information)

Next, the specific content of data included in the CU information CU will be described with reference to FIG. 3(*d*). As illustrated in FIG. 3(*d*), the CU information CU specifically includes a skip flag SKIP, PT information PTI, and TT information TTI.

The skip flag SKIP is a flag indicating whether or not a skip mode is applied to the target PU. In the case where the skip flag SKIP has a value of 1, that is, in the case where skip mode is applied to the target CU, the PT information PTI and the TT information TTI in that CU information CU is omitted. Note that the skip flag SKIP is omitted in I slices.

The PT information PTI is information related to a PT included in a CU. In other words, the PT information PTI is a set of information related to each of one or more PUs included in the PT, and is referenced in the case in which the video image decoding device 1 generates a predicted image. As illustrated in FIG. 3(*d*), the PT information PTI includes prediction type information PType, and prediction information PInfo.

The prediction type information PType is information that designates whether to use intra prediction or inter prediction as the predicted image generation method for a target PU.

The prediction information PInfo is made up of intra prediction information or inter prediction information, depending on which prediction method is designated by the prediction type information PType. Hereinafter, a PU to which intra prediction is applied will be designated an intra PU, while a PU to which inter prediction is applied will be designated an inter PU.

Also, the prediction information PInfo includes information designating the shape, size, and position of a target PU. As discussed earlier, a predicted image is generated in units of PUs. The prediction information PInfo will be discussed in detail later.

The TT information TTI is information related to a TT included in a CU. In other words, the TT information TTI is a set of information related to each of one or more TUS included in the TT, and is referenced in the case in which the video image decoding device 1 decodes difference data. Note that hereinafter, a TU may also be referred to as a transform block.

As illustrated in FIG. 3(*d*), the TT information TTI includes TT split information SP_TU that designates a split pattern for splitting a target CU into respective transform blocks, as well as TU information $TUI_1$ to $TUI_{NT}$ (NT is the total number of transform blocks included in the target CU).

Specifically, the TT split information SP_TU is information for determining the shape and size of each TU included in the target CU, as well as the position within the target CU. For example, the TT split information SP_TU may be realized from information indicating whether or not to split the node being processed (split_transform_unit_flag), and information indicating the depth of the splitting (trafoDepth).

Also, in the case of a CU size of 64×64, for example, each TU obtained by splitting may take a size from 32×32 pixels to 4×4 pixels.

Also, the TU split information SP_TU includes information on whether or not non-zero transform coefficients exist in each TU. For example, the TU split information SP_TU includes non-zero coefficient presence information for individual TUs (a coded block flag; CBP), or non-zero coefficient presence information for multiple TUs (no_residual_data_flag).

The TU information $TUI_1$ to $TUI_{NT}$ is individual information related to each of the one or more TUs included in a TT. For example, the TU information TUI includes a quantized prediction difference.

Each quantized prediction difference is encoded data generated due to the video image encoding device 2 performing the following processes 1 to 3 on a target block, that is, the block being processed.

Process 1: Apply the discrete cosine transform (DCT) to the prediction difference obtained by subtracting a predicted image from the image to be encoded.

Process 2: Quantize the transform coefficients obtained in Process 1.

Process 3: Encode the transform coefficients quantized in process 2 into variable-length codes.

Note that the quantization parameter qp discussed earlier expresses the size of the quantization step QP used in the case of the video image encoding device 2 quantizing transform coefficients ($QP=2^{qp/6}$).

(Prediction Information PInfo)

As discussed above, there are two types of prediction information PInfo: inter prediction information and intra prediction information.

The inter prediction information includes coding parameters that are referenced in the case in which the video image decoding device 1 generates an inter-predicted image by inter prediction. More specifically, inter prediction information includes inter PU split information that designates a split pattern for splitting a target CU into respective inter PUs, as well as inter prediction parameters for each inter PU.

The inter prediction parameters include a reference image index, an estimated motion vector index, and a motion vector difference.

On the other hand, the intra prediction information includes coding parameters that are referenced in the case in which the video image decoding device 1 generates an intra-predicted image by intra prediction. More specifically, intra prediction information includes intra PU split information that designates a split pattern for splitting a target CU into respective intra PUs, as well as intra prediction parameters for each intra PU. The intra prediction parameters are parameters for reconstructing intra prediction (the prediction mode) for each intra PU. The parameters for reconstructing the prediction mode include a flag mpm_flag related to a most probable mode (hereinafter designated MPM), an index mpm_idx for selecting an MPM, as well as an index rem_idx for designating a prediction mode other than an MPM. Herein, the MPM refers to the estimated prediction mode with the highest probability of being selected by the target partition. For example, an estimated prediction mode that has been estimated on the basis of a prediction mode assigned to a partition near the target partition, the DC mode which typically has the highest probability, or planar mode may be included in the MPM.

Additionally, in the following, the case of simply using the term "prediction mode" refers to the luma prediction mode. The term "chroma prediction mode" will be used to refer to the chroma prediction mode, as distinguished from the luma prediction mode. Also, the parameters that reconstruct the prediction mode include a parameter chroma_mode for designating the chroma prediction mode.

Note that the parameters mpm_flag, mpm_idx, rem_idx, and chroma_mode will be discussed in detail later.

In addition, mpm_flag and rem_index respectively correspond to "prev_intra_luma_pred_flag" and "rem_intra_luma_pred_mode" in NPL 1. Also, chroma_mode corresponds to "intra_chroma_pred_mode".

<Video Image Decoding Device>

Hereinafter, a configuration of a video image decoding device 1 according to the present embodiment will be described with reference to FIGS. 1 to 23.

(Overview of Video Image Decoding Device)

The video image decoding device 1 generates a predicted image for each PU, generates a decoded image #2 by adding together the generated predicted image and the prediction difference decoded from the encoded data #1, and externally outputs the generated decoded image #2.

Herein, the generation of a predicted image is conducted by referencing coding parameters obtained by decoding the encoded data #1. Coding parameters refer to parameters that are referenced in order to generate a predicted image. Coding parameters include prediction parameters such as motion vectors referenced in inter frame prediction and prediction modes referenced in intra frame prediction, and additionally include information such as the sizes and shapes of PUs, the sizes and shapes of blocks, and difference data between an original image and a predicted image. Hereinafter, from among the information included in the coding parameters, the set of all information except the above difference data will be called side information.

Also, in the following, a picture (frame), slice, tree block, CU, block, and PU to be decoded will be called the target picture, target slice, target tree block, target CU, target block, and target PU, respectively.

Note that the size of a tree block is 64×64 pixels, for example, while the size of a CU is 64×64 pixels, 32×32 pixels, 16×16 pixels, or 8×8 pixels, for example, and the size of a PU is 64×64 pixels, 32×32 pixels, 16×16 pixels, 8×8 pixels, 4×4 pixels, and the like, for example. However, these sizes are merely illustrative examples, and the sizes of a tree block, CU, and PU may also be sizes other than the sizes indicated above.

(Configuration of Video Image Decoding Device)

Referring to FIG. 2 again, a schematic configuration of the video image decoding device 1 is described as follows. FIG. 2 is a function block diagram illustrating a schematic configuration of the video image decoding device 1.

As illustrated in FIG. 2, the video image decoding device 1 is equipped with a variable-length decoder 11, an inverse quantization/inverse transform section 13, a predicted image generator 14, an adder 15, and frame memory 16.

[Variable-Length Decoder]

The variable-length decoder 11 decodes various parameters included in encoded data #1 input from the video image decoding device 1. In the following description, the variable-length decoder 11 is assumed to suitably decode parameters that have been encoded according to an entropy coding scheme such as CABAC or CAVLC. Specifically, the variable-length decoder 11 decodes one frame worth of encoded data #1 according to the following procedure.

First, the variable-length decoder 11 demultiplexes one frame worth of encoded data #1, thereby separating various information included in the hierarchical structure illustrated in FIG. 3. For example, the variable-length decoder 11 references information included in various headers to successively separate the encoded data #1 into slices and tree blocks.

At this point, the various headers include (1) information about the splitting method for splitting the target picture into slices, and (2) information about the size and shape of a tree block belonging to the target slice, as well as the position within the target slice.

Subsequently, the variable-length decoder 11 references the tree block split information SP_TBLK included in the tree block header TBLKH, and splits the target tree block into CUs. Also, the variable-length decoder 11 decodes TT information TTI related to a transform tree obtained for the target CU, and PT information PTI related to a prediction tree obtained for the target CU.

Note that, as discussed earlier, the TT information TTI includes TU information TUI corresponding to TUs included in the transform tree. Also, as discussed earlier, the PT information PTI includes PU information PUI corresponding to PUs included in the target prediction tree.

The variable-length decoder 11 supplies the TT information TTI obtained for the target CU to a TU information decoder 12. The variable-length decoder 11 also supplies the PT information PTI obtained for the target CU to the predicted image generator 14. Note that the configuration of the variable-length decoder 11 will be described in further detail later.

[Inverse Quantization/Inverse Transform Section]

The inverse quantization/inverse transform section 13 executes an inverse quantization/inverse transform process on the basis of the TT information TTI for each block included in the target CU. Specifically, for each target TU, the inverse quantization/inverse transform section 13 applies an inverse quantization and an inverse orthogonal transform to the quantized prediction difference included in the TU information TUI corresponding to the target TU, thereby reconstructing a prediction difference D for each pixel. Note that the orthogonal transform at this point refers to an orthogonal transform from the pixel domain to the frequency domain. Consequently, an inverse orthogonal transform is a transform from the frequency domain to the pixel domain. Also, examples of the inverse orthogonal transform include the inverse discrete cosine transform (inverse DCT transform) and the inverse discrete sine transform (inverse DST transform). The inverse quantization/inverse transform section 13 supplies the reconstructed prediction difference D to the adder 15.

[Predicted Image Generator]

The predicted image generator 14 generates a predicted image on the basis of the PT information PTI for each PU included in the target CU. Specifically, for each target PU, the predicted image generator 14 conducts intra prediction or inter prediction in accordance with the parameters included in the PU information PUI corresponding to the target PU, thereby generating a predicted image Pred from a locally decoded image P', which is an already-decoded image. The predicted image generator 14 supplies the generated predicted image Pred to the adder 15. Note that the configuration of the predicted image generator 14 will be described in further detail later.

[Adder]

The adder 15 adds together the predicted image Pred supplied by the predicted image generator 14 and the prediction difference D supplied by the inverse quantization/inverse transform section 13, thereby generating a decoded image P for the target CU.

[Frame Memory]

Decoded images P that have been decoded are successively recorded in the frame memory 16. In the case of decoding a target tree block, decoded images corresponding to all tree blocks decoded prior to that target tree block (for example, all preceding tree blocks in the raster scan order) are recorded in the frame memory 16.

Also, in the case of decoding a target CU, decoded images corresponding to all CUs decoded prior to that target CU are recorded.

Note that in the video image decoding device 1, when the per-tree block decoded image generation process has finished for all tree blocks within an image, a decoded image #2 corresponding to the one frame worth of encoded data #1 input into the video image decoding device 1 is externally output.

(Prediction Mode Definitions)

As discussed above, the predicted image generator 14 generates and outputs a predicted image on the basis of the PT information PTI. In the case in which the target CU is an intra CU, the PU information PTI input into the predicted image generator 14 includes a prediction mode (IntraPredMode) and a chroma prediction mode (IntraPredModeC). Hereinafter, definitions of prediction modes (luma/chroma) will be described with reference to FIGS. 4 to 9.

(Overview)

FIG. 4 illustrates an example of types of intra prediction methods used by the video image decoding device 1, and associated prediction mode numbers. A prediction mode number of "0" is assigned to planar prediction (Intra_Planar), "1" to vertical prediction (Intra_Vertical), "2" to horizontal prediction (Intra_Horizontal), "3" to DC prediction (Intra_DC), from "4" to "34" to angular prediction (Intra_Angular), and "35" to LM prediction (Intra_FromLuma). LM prediction is a method that predicts a chroma pixel value on the basis of the decoded luma pixel value, and is only selectable when predicting chroma. Other prediction modes may be selected for both luma and chroma. Note that horizontal prediction, vertical prediction, and angular prediction are collectively called directional prediction. Directional prediction is a prediction method that generates a predicted image by extrapolating in a specific direction from neighboring pixel values near the target PU.

Figure 5:
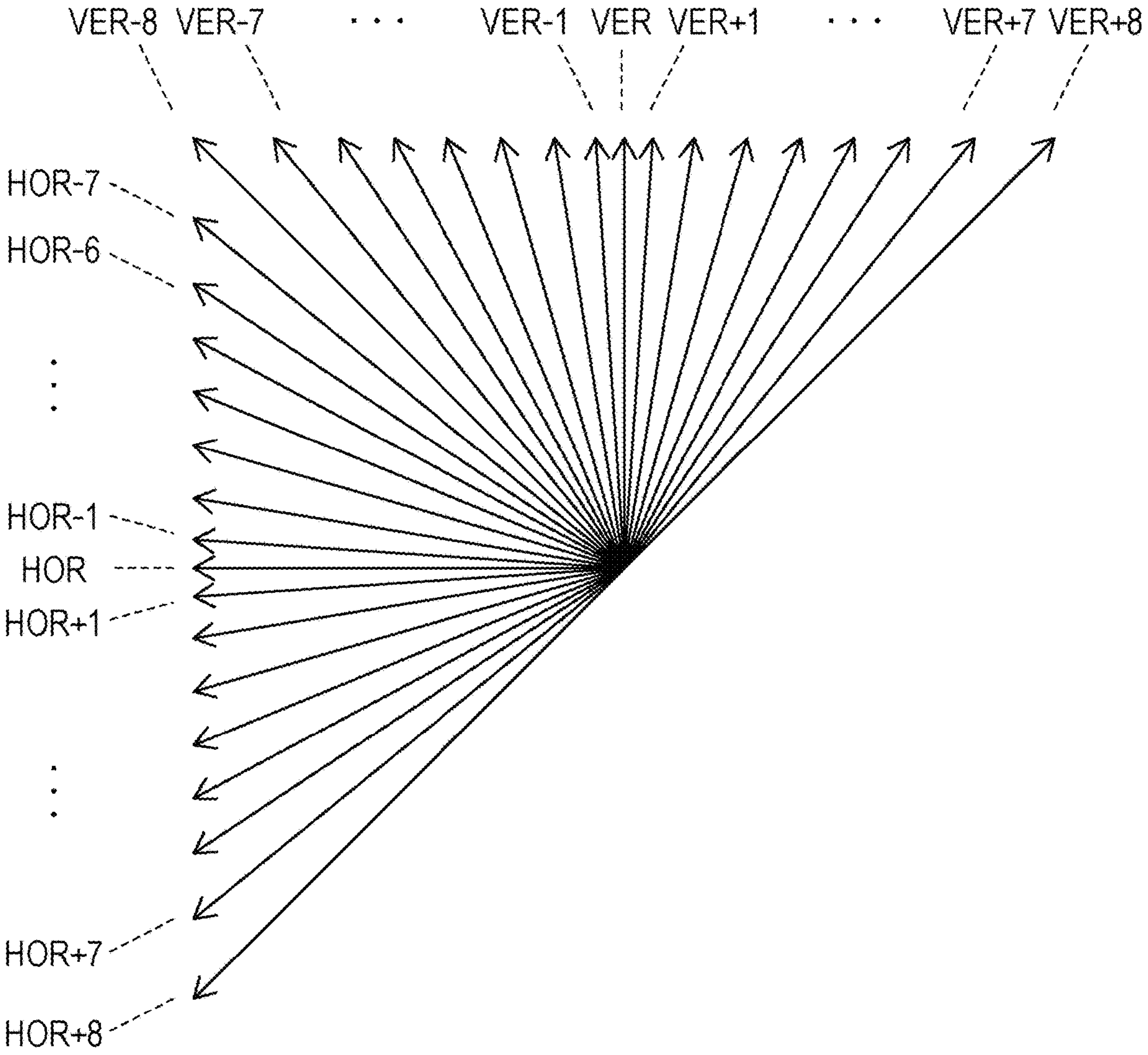
FIG. 5 is a diagram illustrating prediction directions corresponding to prediction mode identifiers for 33 types of prediction modes belonging to directional prediction.

Next, FIG. 5 will be used to describe identifiers for the respective prediction modes included in directional prediction. FIG. 5 illustrates prediction mode identifiers and corresponding prediction directions for 33 types of prediction modes belonging to directional prediction. The directions of the arrows in FIG. 5 represent prediction directions, or more accurately, illustrate the orientation of a vector from a pixel to be predicted to an already-decoded pixel that is referenced by the pixel to be predicted. In this sense, prediction directions are also called reference directions. Associated with each prediction mode is an identifier made up of a sign indicating whether the main direction is the horizontal (HOR) or the vertical direction (VER), and a displacement with respect to the main direction. For example, the sign HOR is assigned to horizontal prediction, VER to vertical prediction, VER+8 to a prediction mode that references a nearby pixel in an upper-right 45 degree direction, VER−8 to a prediction mode that references a nearby pixel in an upper left 45 degree direction, and HOR+8 to a prediction mode that references a nearby pixel in a lower-left 45 degree direction. For directional prediction, there are defined 17 prediction modes from VER−8 to VER+8 whose main direction is the vertical direction, and 16 prediction modes from HOR−7 to HOR+8 whose main direction is the horizontal direction.

The prediction direction is expressed by the main direction and a gradient. The main direction refers to a direction used as a base of reference for expressing the prediction direction, and is the vertical direction or the horizontal direction, for example. The gradient refers to an expression of the angle obtained between the prediction direction and the main direction.

Each prediction mode has an associated prediction direction. For the prediction modes, 33 types of directional prediction may be adopted, as described in NPL 1, for example. Also, each prediction mode has an associated prediction mode number.

Note that, as described in NPL 1, it may also be configured so that each prediction mode is assigned a prediction mode identifier. A prediction mode identifier may be constructed from a main direction and a displacement. The displacement is identification information for specifying a gradient.

Specifically, in the main direction expression, the vertical direction is expressed as "VER", while the horizontal direction is expressed as "HOR". Also, the displacement from a main direction is expressed from "−8" to "−1" and from "+1" to "+8". Additionally, for directional prediction, there may be defined 17 prediction modes from VER−8 to VER+8 whose main direction is the vertical direction, and 16 prediction modes from HOR−7 to HOR+8 whose main direction is the horizontal direction.

In addition, as described in NPL 1, the gradient may also be configured to be associated with a prediction mode identifier (prediction mode number). In the above configuration, the prediction mode number and the prediction direction are associated, and the identifier of the prediction direction and the gradient are associated.

According to the above configuration, the above association between the prediction mode and the prediction mode number has the property of enabling a designated feature related to directional prediction to be specified from the prediction mode number. Herein, the feature refers to the main direction and gradient of the prediction direction, for example. Additionally, the feature may also be the precision of the prediction direction, the absolute value of the gradient (displacement), the sign of the gradient (displacement), the similarity/dissimilarity of the displacement of two prediction modes, or the like.

The above property may be the following properties 1 to 3, for example. Not that in the above association, it is acceptable even if not all of the following properties 1 to 3 are simultaneously satisfied. For example, in the above association, it is sufficient for at least one of either property 1 or property 2 to be satisfied. Additionally, an association in which a combination of properties 1 to 3 is satisfied is also possible.

(Property 1) Simplicity of Determining Main Direction

This is the simplicity of determining whether the main direction is the vertical direction or the horizontal direction. As an example of an association for realizing this property, vertical prediction modes and horizontal prediction modes may be associated according to whether the prediction mode number is odd or even. Consequently, the main direction may be determined by simply determining whether the prediction mode number is odd or even.

Also, as another example, vertical prediction modes and horizontal prediction modes may be associated according to whether or not the prediction mode number is equal to or greater than a designated number. Consequently, the main direction may be determined by determining whether or not the prediction mode has a designated number or greater.

As a result, if such a property exists, it is not necessary to provide a table associating prediction modes and the main directions of the prediction modes. Consequently, a memory reduction is possible.

(Property 2) Simplicity of Determining Directional Prediction Modes with the Same Displacement This is the simplicity of determining whether or not two prediction modes have different main directions but equal displacements (gradients) with respect to the main direction.

As an example of an association for realizing this property, consecutive prediction mode numbers may be associated with two prediction modes having different main directions but equal displacements (gradients) with respect to the main direction. Consequently, a prediction mode with a different displacement is associated with every third prediction mode number. As a result, by determining this periodicity, it is possible to specify whether or not two prediction modes have different main directions but equal displacements (gradients) with respect to the main direction.

Also, as another example, prediction mode numbers having a fixed differential may be associated with two prediction modes having different main directions but equal displacements (gradients) with respect to the main direction. Consequently, by determining the differential between the prediction mode numbers corresponding to two prediction modes, it is possible to determine whether the displacements (gradients) of the two prediction modes are the same or different.

At this point, the association with a displacement (gradient) may be shared between two prediction modes having different main directions but equal displacements (gradients) with respect to the main direction. In other words, one displacement (gradient) may be associated with two prediction mode numbers. More specifically, by simply associating a prediction mode number (prediction mode identifier) with one displacement (gradient) for either one of the main directions, the association may be omitted for the other main direction. Stated differently, the association of a gradient may be unified with respect to two prediction mode identifiers having different main directions but equal displacements. Consequently, the table size for the association may be reduced.

(Property 3) Simplicity of Determining Directional Prediction Precision

Regarding directional prediction precision, an even-numbered displacement is low precision, while an odd-numbered displacement is high precision.

As an example of an association for satisfying this property, prediction modes with an even-numbered displacement and prediction modes with an odd-numbered displacement may be associated according to whether or not the prediction mode number is equal to or greater than a designated number.

Also, as another example, prediction modes with an even-numbered displacement and prediction modes with an odd-numbered displacement may be associated according to whether the prediction mode number is odd or even.

Since the determination technique has already been described, that description will be omitted herein.

According to the above configuration, it becomes possible to derive the above features from the prediction mode number on the basis of the above properties. For this reason, it is possible to reduce the size of a table associating prediction mode numbers (prediction mode identifiers) with the above features, or eliminate the table.

Also, in a designated reconstruction process, a process may be executed in accordance with a feature specified as above. The designated reconstruction process may be part of the generation of a predicted image, and may be a process that derives a prediction direction, a process that selects a filter to apply to reference pixels used in predicted image generation, a process that decides the scan order in which to decode transform coefficients, an orthogonal transform process that applies a vertical one-dimensional transform and a horizontal one-dimensional transform to transform coefficients, or the like. These reconstruction processes conduct processes according to a designated feature related to the prediction direction in some cases. In other words, these reconstruction processes may also be reconstruction processes conducted according to a designated feature related to the prediction direction.

As indicated above, according to the above configuration, a reconstruction process is conducted in accordance with a specified feature. As a result, there is exhibited an advantageous effect that enables a reduction in the required memory in the case of conducting a reconstruction process such as one that conducts a process according to a designated feature related to the prediction direction.

[Definition 1] The association between a prediction mode number and an intra prediction method applied by the video image decoding device 1 may be defined as illustrated in FIG. 6, for example. FIG. 6 is a diagram illustrating an example of a prediction mode definition DEFPM1, which defines associations between intra prediction methods and prediction mode numbers. In the prediction mode definition DEFPM1 illustrated in FIG. 6, the prediction mode number "0" is assigned to planar prediction, "1" to horizontal prediction, "2" to vertical prediction, and "3" to DC prediction. For the prediction mode numbers from "4" to "18", angular prediction modes having an even-numbered displacement from the main direction are assigned to prediction mode numbers in order of the prediction modes with the least displacement, and in the case of equal displacement, in the order of vertical, then horizontal for the main direction. For the prediction mode numbers from "19" to "35", angular prediction modes having an odd-numbered displacement from the main direction are assigned to prediction mode numbers in order of the prediction modes with the least displacement, and in the case of equal displacement, in the order of vertical, then horizontal for the main direction.

Note that, at this point, the types of prediction modes applied to the luma and chroma are described as follows.

First, types of prediction modes applied to the luma will be described using FIG. 7. The types of prediction modes applied to the luma differ according to the PU size. FIG. 7 illustrates the relationship between the log base 2 of the PU size (log 2PartSize) and the number of prediction modes. The number of selectable prediction modes is 18 in the case of a log 2PartSize of 2 (a PU size of 4×4 pixels), and 35 in all other cases, that is, in the case of a log 2PartSize of 3 to 6 (a PU size from 8×8 pixels to 64×64 pixels). Herein, the 18 prediction modes are the prediction modes with the prediction mode numbers from 0 to 17, while the 35 prediction modes are the prediction modes with the prediction mode numbers from 0 to 34.

Next, types of prediction modes applied to the chroma will be described using FIG. 8. The number of prediction modes applied to the chroma is six, irrespective of the prediction unit size, but the types of prediction modes differ according to the prediction mode applied to a luma prediction unit corresponding to the target chroma prediction unit (the corresponding luma prediction mode). FIG. 8 illustrates definitions of chroma prediction modes according to the prediction mode numbers of a corresponding luma prediction mode. In the case in which the prediction mode number of the corresponding luma prediction mode is from "0" to "3", the selectable chroma prediction modes include LM prediction, vertical prediction, horizontal prediction, planar prediction, and VER+8 prediction. In the case in which the prediction mode number of the corresponding luma prediction mode is equal to or greater than "4", the selectable chroma prediction modes include LM prediction, VER prediction, HOR prediction, and planar prediction, as well as the same prediction mode as the corresponding luma prediction mode.

The prediction mode definition DEFPM1 in FIG. 6 will be referenced again to describe the properties of prediction mode numbers in the prediction mode definition DEFPM1. The prediction mode numbers defined by the above prediction mode definition DEFPM1 in FIG. 6 have the following three properties 1 to 3.

(Property 1) Simplicity of Determining Main Direction

Even-numbered prediction mode numbers are associated with directional prediction with a main direction in the vertical direction, while odd-numbered prediction mode numbers are associated with directional prediction with a main direction in the horizontal direction. In this case, the main direction may be determined to be the horizontal direction or the vertical direction by determining whether the prediction mode number is odd or even. The determination of whether a prediction mode number is odd or even may be determined according to whether the least significant bit of the prediction mode number is 0 or 1.

(Property 2) Simplicity of Determining Directional Prediction Modes with the Same Displacement Consecutive prediction mode numbers are associated with two prediction modes having different main directions but equal displacements with respect to the main direction. For example, the prediction mode numbers 13 and 14 are respectively assigned to HOR+4 prediction and VER+4 prediction. In this case, the determination of whether or not the displacement with respect to the main direction is equal for two prediction modes may be easily realized. Provided that the two prediction modes are m1 and m2, the two prediction modes may be determined to have the same displacement or not according to whether or not (m1+c)>>1 and (m2+c)>>1 match. Note that c is 1 in the case in which the smaller of the prediction mode numbers with equal displacement is an odd number, and 0 in the case of an even number.

(Property 3) Simplicity of Determining Directional Prediction Precision

Directional prediction with an even-numbered displacement with respect to the main direction is associated with small prediction mode numbers (18 or less), whereas directional prediction with an odd-numbered displacement with respect to the main direction is associated with large prediction mode numbers (19 or greater). By adding an odd-numbered displacement to an even-numbered displacement, displacement may be realized with higher precision. Consequently, displacement of low precision is associated with small prediction mode numbers, while displacement of high precision is associated with large prediction mode numbers. In this case, whether or not a prediction direction is of low precision may be determined according to whether or not the prediction mode number is less than or equal to a designated value (in the above example, 18).

The properties 1 to 3 of the prediction mode definition indicated above has the advantageous effect of simplifying a determination process based on the prediction mode. Herein, simplifying encompasses a decrease in the number of computations in the determination process, and a reduction in the table size required by the determination process. Examples of processes involving a determination based on the prediction mode include predicted image generation by angular prediction, the derivation of estimated prediction mode candidates, the application of a reference pixel filter, a transform coefficients scan, and direction-dependent orthogonal transform. Each example will be discussed in detail later.

[Definition 2] Note that a prediction mode definition different from the above may also be used. For example, the prediction mode definition DEFPM2 illustrated in FIG. 9 may also be used. In the prediction mode definition DEFPM2 illustrated in FIG. 9, the prediction mode number "0" is assigned to planar prediction (Planar), "1" to vertical prediction (VER), "2" to horizontal prediction (HOR), "3" to VER−8 prediction (VER−8), and "4" to DC prediction (DC). For the prediction mode numbers from "5" to "34", prediction mode numbers are assigned so that the absolute values of the displacement with respect to the main direction become arranged in a predetermined priority order. The predetermined priority order herein is an order in which low prediction mode numbers are assigned to the absolute values of the displacement in the order 8, 2, 4, 6, 1, 3, 5, and 7. In this priority order, first there are the prediction modes corresponding to the diagonal directions (8), then the prediction modes corresponding to the prediction directions with rough directional precision with the absolute values of the displacement in ascending order (2, 4, 6), and then the prediction modes corresponding to the prediction directions with fine directional precision with the absolute values of the displacement in ascending order (1, 3, 5, 7). This priority order utilizes the fact that prediction modes corresponding to the diagonal directions are more readily selected compared to the prediction modes corresponding to other prediction directions, with the exception of horizontal and vertical. Also, this priority order utilizes the fact that prediction directions with a smaller absolute value of the displacement, or in other words prediction modes corresponding to directions that are close to a main direction, are more readily selected.

In addition, for the prediction mode numbers from "5" to "34", in the case in which the absolute values of the displacement with respect to a main direction are equal, lower prediction mode numbers are assigned to prediction modes corresponding to negative displacement compared to prediction modes corresponding to positive displacement. This priority order is decided with consideration for the fact that, in the case of equal absolute values of the displacement, prediction modes with negative displacement are more readily selected than prediction mode with positive displacement. Prediction modes having a negative displacement are the prediction modes that correspond to prediction directions from upper-left to lower-right, whereas prediction modes having a positive displacement correspond to the prediction modes that correspond to prediction directions from upper-right to lower-left, or from lower-left to upper-right. In the case of decoding CUs by scanning in the raster scan order or the Z-scan order, upper-right and lower-left decoded images are unusable compared to upper-left decoded images in many cases. For this reason, prediction modes having a positive displacement that reference an upper-right or lower-left decoded image are less readily selected compared to prediction modes having a negative displacement that reference an upper-left decoded image.

In addition, for the prediction mode numbers from "5" to "34", in the case in which the displacement with respect to a main direction is equal, lower prediction mode numbers are assigned to prediction modes with a main direction in the vertical direction compared to prediction modes with a main direction in the horizontal direction. In the case of a main direction in the vertical direction, decoded images to the upper-left, directly above, and to the upper-right of the target PU are referenced. On the other hand, in the case of a main direction in the horizontal direction, decoded images to the upper-left, directly left, and to the lower-left of the target PU are referenced. In the case of conducting a decoding process by scanning in the raster scan order or the Z-scan order, decoded images to the lower-left of the target PU are highly likely to be unusable compared to decoded images to the upper-left, directly above, to the upper-right, and directly left of the target PU. For this reason, prediction modes with a main direction in the horizontal direction that reference a decoded image to the lower-left of the target PU are less readily selected compared to prediction modes with a main direction in the vertical direction.

The prediction mode definition DEFPM2 illustrated in FIG. 9 includes the properties 1 to 3 of the prediction mode definition in FIG. 6 discussed earlier, as well as the following two properties.

(Property 4) Simplicity of Determining Sign of Displacement

Prediction modes associated with displacements of the same sign are periodically repeated two at a time. For example, the consecutive prediction mode numbers 7 to 10 are VER−2, HOR−2, VER+2, HOR+2 in order, and the signs are "−", "−", "+", and "+" in order. In this case, the positivity or negativity of the sign may be derived from the prediction mode number. Specifically, the sign s may be derived from a prediction mode number m according to the following formula.

$$s = (((m + d)\ \&\ 2) > 0)?+1:-1$$

Herein, the variable d is a value that corresponds to the phase of the repeating period of the sign. In the example of FIG. 9, d=1. The operator "&" is an operator that takes a bitwise logical sum. Thus, in (m+d) &2, if the second-least significant bit in the binary representation of the integer m+d is 1, a value of 2 is returned, whereas if the same second bit is 0, a value of 0 is returned. Stated differently, the above formula may also be expressed such that if the remainder from dividing the value of m+d by 4 is 0 or 1, s becomes −1 (a negative sign), whereas if the remainder is 2 or 3, s becomes +1 (a positive sign).

(Property 5) Simplicity of Determining Absolute Value of Displacement

Prediction modes associated with displacements having equal absolute values are consecutive. For example, the consecutive prediction mode numbers 7 to 10 are VER−2, HOR−2, VER+2, HOR+2 in order, and the absolute values of the displacement are all 2. At this point, for a prediction mode number m, an index DI the uniquely specifies the absolute value of the displacement may be derived according to DI=(m+d)>>2.

(Details of Predicted Image Generator)

Figure 10:
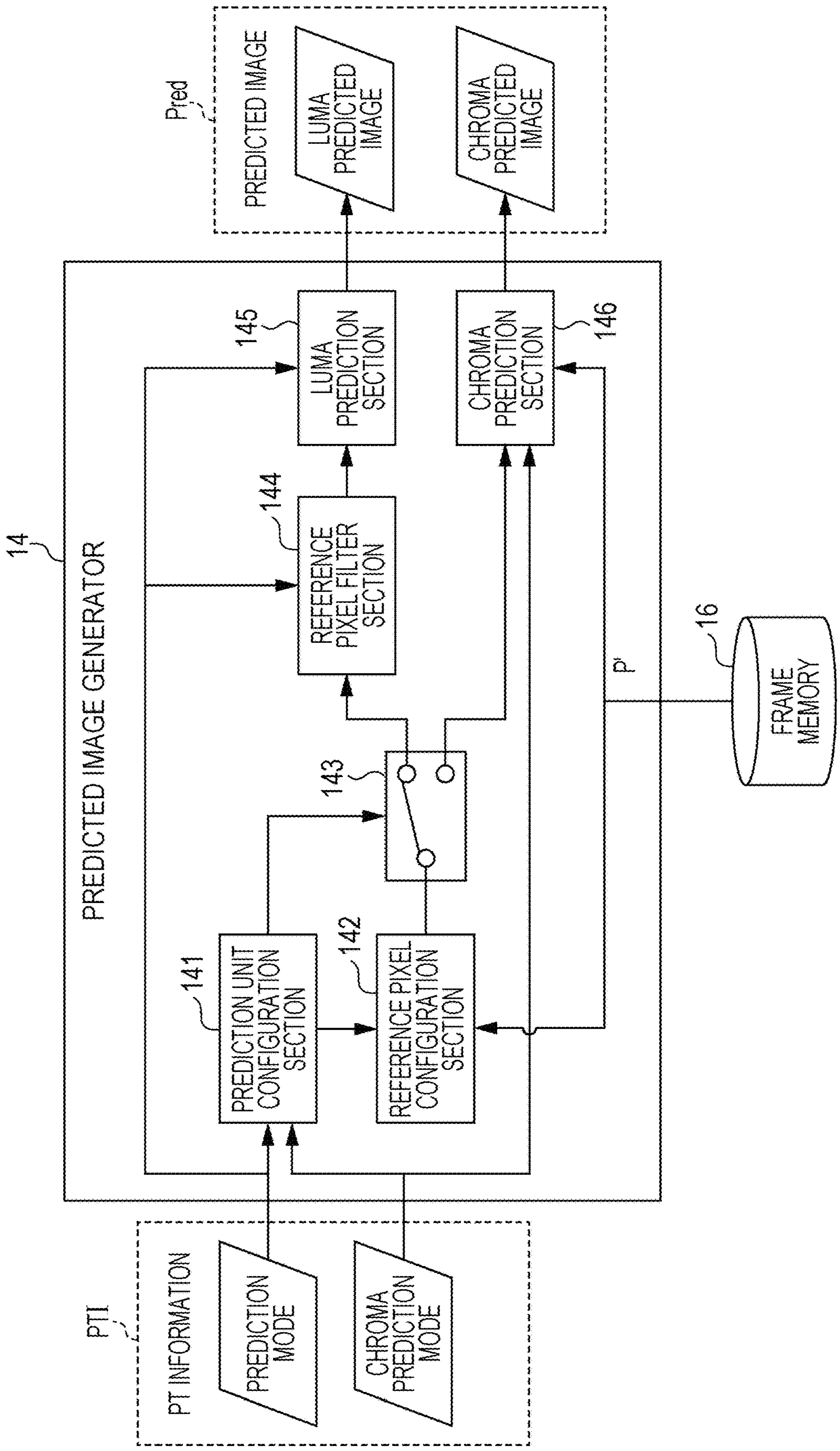
FIG. 10 is a function block diagram illustrating an exemplary configuration of a predicted image generator provided in the above video image decoding device.

Next, FIG. 10 will be used to describe a configuration of the predicted image generator 14 in further detail. FIG. 10 is a function block diagram illustrating an exemplary configuration of the predicted image generator 14. Note that this exemplary configuration illustrates function blocks related to predicted image generation of an intra CU from among the functions of the predicted image generator 14.

As illustrated in FIG. 10, the predicted image generator 14 is equipped with a prediction unit configuration section 141, a reference pixel configuration section 142, a switch 143, a reference pixel filter section 144, a luma prediction section 145, and a chroma prediction section 146.

The prediction unit configuration section 141 configures PUs included in the target CU as the target PU in a prescribed configuration order, and outputs information related to the target PU (target PU information). The target PU information at least includes the size of the target PU, the position of the target PU within the CU, and an index indicating the luma or chroma plane of the target PU (luma/chroma index cIdx).

In the case of an input image in YUV format, for example, the PU configuration order uses an order such that PUs corresponding to Y included in the target CU are configured in raster scan order, and subsequently, PUs corresponding to U, then V are respectively configured in raster scan order.

FIG. 11 will be used to describe the PU configuration order and the PUs included in a CU in the case of an input image in 4:2:0 YUV format.

FIG. 11(A) illustrates PUs in a CU in the case in which the size of the target CU is 8×8 pixels, and the split type is N×N. First, the four 4×4 pixel PUs corresponding to the luma Y are configured in raster scan order (the order PU_Y0, PU_Y1, PU_Y2, and PU_Y3). Next, the one 4×4 pixel PU corresponding to the chroma U (PU_U0) is configured. Lastly, the one 4×4 pixel prediction unit corresponding to the chroma V (PU_V0) is configured.

FIG. 11(B) illustrates PUs in a CU in the case in which the size of the target CU is 16×16 pixels, and the split type is 2N×2N. First, the one 16×16 pixel prediction unit corresponding to the luma Y (PU_Y0) is configured. Next, the one 8×8 pixel prediction unit corresponding to the chroma U (PU_U0) is configured. Lastly, the one 8×8 pixel prediction unit corresponding to the chroma V (PU_V0) is configured.

The reference pixel configuration section 142, on the basis of the input target PU information, reads out the pixel values of a decoded image (decoded pixel values) near the target PU recorded in the frame memory, and configures reference pixels to be referenced during predicted image generation. A reference pixel value p(x, y) is configured using a decoded pixel value r(x, y) according to the following formula.

$$p(x, y) = r(xB + x, yB + y)\ x = -1,\ y = -1 \ldots (nS*2-1),\text{ and}$$
$$x = 0 \ldots (nS*2-1),\ y = -1$$

Herein (xB, yB) represents the position of the upper-left pixel within the target PU, while nS represents the size of the target PU, and indicates the value of the greater of the width or height of the target PU. In the above formula, basically, decoded pixel values included in the line of decoded pixels neighboring the top edge of the target PU as well as decoded pixel values included in the column of decoded pixels neighboring the left edge of the target PU are copied to corresponding reference pixel values. Note that in the case in which a decoded pixel value corresponding to a specific reference pixel position does not exist or cannot be referenced, a predetermined value may be used, or a referenceable decoded pixel value that exists in the vicinity of the corresponding decoded pixel value may be used.

The switch 143 determines whether the target PU is luma or chroma on the basis of the input target PU information, and outputs input reference pixels in a corresponding output direction.

The reference pixel filter section 144 applies a filter to input reference pixel values according to the input prediction mode, and outputs the filtered reference pixel values. Specifically, the reference pixel filter section 144 decides whether or not to apply a filter according to the target PU size and the prediction mode. The relationship between whether or not to apply a filter, and the target PU size and prediction mode, is described as follows using FIG. 12. FIG. 12 illustrates the relationship between prediction mode numbers according to the prediction mode definition DEFPM1 in FIG. 6, and the values of filter application flags (refPicFilterFlag). In FIG. 12, a refPicFilterFlag value of 1 indicates applying a smoothing filter using neighboring pixels on each pixel of the reference pixels, while a refPicFilterFlag value of 0 indicates not applying the smoothing filter. In the case of a target PU size nS of 4, refPicFilterFlag is set to 0, irrespective of the prediction mode. In the case of a target PU size nS of 8, refPicFilterFlag is set to 1 when the prediction mode number is 0 (Planar), 4 (VER−8), 17 (HOR+8), or 18 (VER+8), and set to 0 otherwise. In the case of a target PU size nS of 16, refPicFilterFlag is set to 0 when the prediction mode number is 1 (HOR), 2 (VER), 3 (DC), or 24 to 27 (VER+1, HOR+1), and set to 1 otherwise. In the case of a target PU size nS of 32 or 64, refPicFilterFlag is set to 0 when the prediction mode number is from 1 to 3, and set to 1 otherwise.

Note that in the above configuration, when the target PU size nS is 32 or 64, or in other words, when the target PU size is 32×32 pixels or 64×64 pixels, it is preferable to decide whether or not to apply a smoothing filter according to the same selection criteria. Typically, the suitability of applying a smoothing filter to reference pixels in any prediction mode differs according to the PU size. However, both 32×32 pixel PUs and 64×64 pixel PUs tend to be selected in comparatively flat areas compared to areas where PUs with a size of less than 32×32 pixels are selected, and thus the areas where both are applied have similar properties. Consequently, by applying a smoothing filter to the same prediction modes for both, it is possible to reduce the table size required to select a smoothing filter, without lowering the encoding efficiency.

Also, since typically a PU of large size may be selected in flat areas compared to a PU of small size, it is preferable to apply a reference pixel smoothing filter to more prediction modes.

The luma prediction section 145 generates and outputs a luma predicted image of the target PU on the basis of an input prediction mode and reference pixels. The luma prediction section 145 will be discussed in detail later.

The chroma prediction section 146 generates and outputs a chroma predicted image of the target PU on the basis of an input prediction mode and reference pixels. The chroma prediction section 146 will be discussed in detail later.

(Flow of Predicted Image Generation Process)

Figure 13:
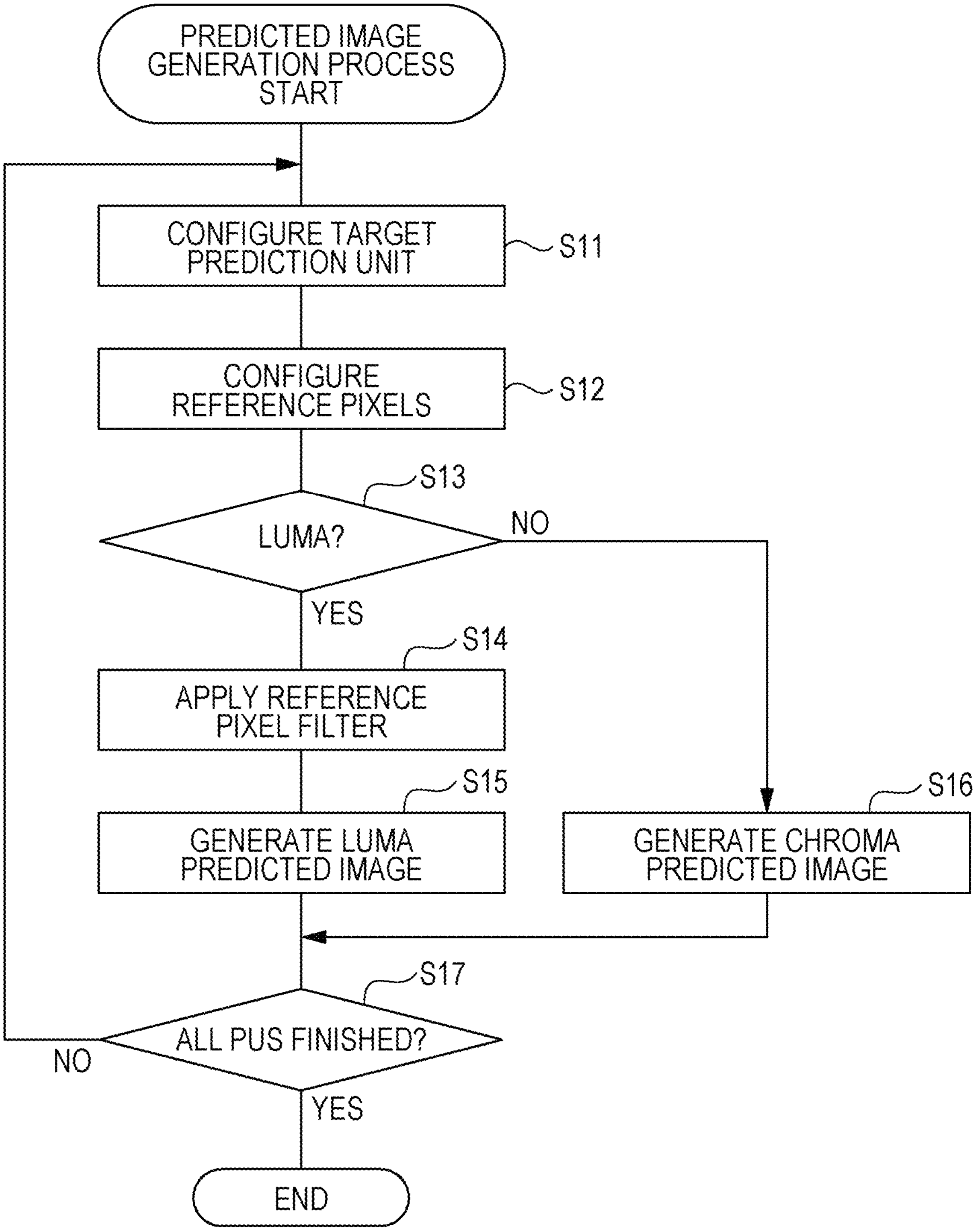
FIG. 13 is a flowchart illustrating an overview of a per-CU predicted image generation process in the above predicted image generator.

Next, an overview of a per-CU predicted image generation process in the predicted image generator 14 will be described using the flowchart in FIG. 13. When the per-CU predicted image generation process starts, first, the prediction unit configuration section 141 configures one PU included in the CU as a target PU in accordance with a predetermined order, and outputs target PU information to the reference pixel configuration section 142 and the switch 143 (S11). Next, the reference pixel configuration section 142 configures reference pixels of the target PU using decoded pixel values read out from the external frame memory (S12). Next, the switch 143 determines whether the target PU is luma or chroma on the basis of the input target PU information, and switches the output according to the determination result (S13).

In the case in which the target PU is luma (S13, Yes), the output of the switch 143 is connected to the reference pixel filter section 144. Subsequently, reference pixels are input into the reference pixel filter section 144, a reference pixel filter is applied according to a separately input prediction mode, and the filtered reference pixels are output to the luma prediction section 145 (S14). Next, the luma prediction section 145 generates and outputs a luma predicted image in the target PU on the basis of the input reference pixels and prediction mode (S15).

On the other hand, in the case in which the target PU is chroma (S13, No), the output of the switch 143 is connected to the chroma prediction section 146. Subsequently, the chroma prediction section 146 generates and outputs a chroma predicted image in the target PU on the basis of the input reference pixels and prediction mode (S16). After the generation of a luma or chroma predicted image of the target PU ends, the prediction unit configuration section 141 determines whether or not a predicted image has been generated for all PUs within the target CU (S17). In the case in which a predicted image has not been generated for some PUs within the target CU (S17, No), the process returns to the above S1, and the predicted image generation process is executed for the next PU within the target CU. In the case in which a predicted image has been generated for all PUs within the target CU (S17, Yes), the luma and chroma predicted images of each PU within the target CU are combined and output as the predicted image of the target CU, and the process ends.

(Details of Luma Prediction Section)

Figure 14:
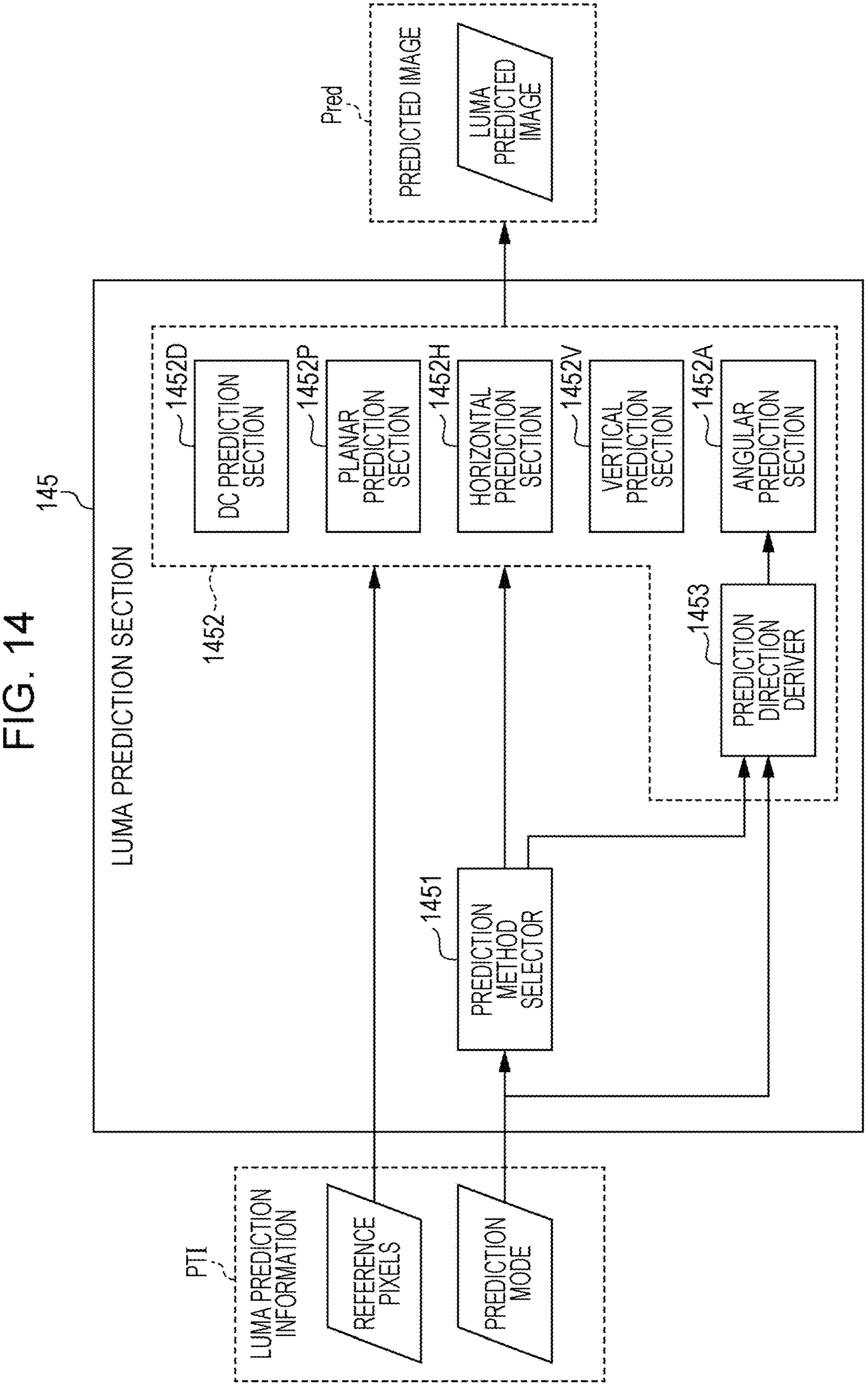
FIG. 14 is a block diagram illustrating a detailed configuration of a luma prediction section provided in the above predicted image generator.

Next, FIG. 14 will be used to describe the luma prediction section 145 in detail. FIG. 14 illustrates details of the luma prediction section 145. As illustrated in FIG. 14, the luma prediction section 145 is equipped with a prediction method selector 1451 and a predicted image deriver 1452.

The prediction method selector 1451 selects a prediction method to use for predicted image generation on the basis of an input prediction mode, and outputs the selection result. The selection of a prediction method is realized by selecting a prediction method corresponding to the prediction mode number of the input prediction mode, on the basis of the definition in FIG. 4 discussed earlier.

The predicted image deriver 1452 derives a predicted image according to a prediction method selection result output by the prediction method selector 1451. More specifically, the predicted image deriver 1452 is equipped with a DC prediction section 1452D, a planar prediction section 1452P, a horizontal prediction section 1452H, a vertical prediction section 1452V, an angular prediction section 1452A, and a prediction direction deriver 1453. In addition, in the case in which the prediction method is planar, vertical prediction, horizontal prediction, DC prediction, or angular, the predicted image deriver 1452 derives a predicted image with the planar prediction section 1452P, vertical prediction section 1452V, horizontal prediction section 1452H, and angular prediction section 1452A, respectively.

The DC prediction section 1452D derives DC predicted values corresponding to the average value of the pixel values of the input reference pixels, and outputs a predicted image whose pixel values are the derived DC predicted values.

The planar prediction section 1452P generates and outputs a predicted image with pixel values derived by linear summation of multiple reference pixels according to the distance to the target predicted pixel. For example, the pixel values predSamples[x, y] of a predicted image may be derived using reference pixel values p[x, y] and the target PU size nS according to the following formula.

$$predSamples[x,y] = ((nS-1-x)*p[-1,y]+(x+1)*p[nS,-1]+(nS-1-y)*p[x,-1]+(y+1)*p[-1,nS]+nS) >> (k+1)$$

Herein, x, y is defined as x, y=0 . . . nS−1, and k as k=log 2(nS).

The horizontal prediction section 1452H generates, on the basis of input reference pixels, a predicted image obtained by extrapolating pixels neighboring on the left edge of the target PU in the horizontal direction, and outputs the result as a predicted image.

The vertical prediction section 1452V generates, on the basis of input reference pixels, a predicted image obtained by extrapolating pixels neighboring on the top edge of the target PU in the vertical direction, and outputs the result as a predicted image.

In the case in which the input prediction mode is a directional prediction mode, the prediction direction deriver 1453 decides and outputs the prediction direction (reference direction) associated with that prediction mode. The output prediction direction is expressed by combining a main direction flag bRefVer that indicates whether or not the main direction is the vertical direction, and a gradient (offset) intraPredAngle with respect to the main direction of the prediction direction. A main direction flag bRefVer with a value of 0 indicates that the main direction is the horizontal direction, while a value of 1 indicates that the main direction is the vertical direction.

Using FIG. 1, a specific configuration of the prediction direction deriver 1453 is described as follows. FIG. 1 is a function block diagram illustrating an exemplary configuration of the prediction direction deriver 1453. As illustrated in FIG. 1, more specifically, the prediction direction deriver 1453 is equipped with a main direction deriver 1453A and a gradient deriver 1453B.

The main direction deriver 1453A derives the main direction flag bRefVer. In addition, the main direction deriver 1453A is able to reference the prediction mode definition DEFPM1 of FIG. 6. The main direction flag bRefVer is derived on the basis of a prediction mode number m according to the following formula.

$$bRefVer = (m \bmod 2) == 0?1:0;$$

According to the above formula, in the case of an even prediction mode number m, the value of the main direction flag bRefVer becomes 1 (the main direction is the vertical direction), while in the case of an odd prediction mode number m, the value of the main direction flag bRefVer becomes 0 (the main direction is the horizontal direction). Note that deciding the main direction on the basis of whether the prediction mode number m is odd or even as above is possible in the case in which prediction mode numbers are defined in the prediction mode definition DEFPM1 of FIG. 6 so that an even prediction mode number has a main direction in the vertical direction, while an odd-numbered prediction mode has a main direction in the horizontal direction. Note that it is preferable for the prediction mode numbers to satisfy the property 1 discussed earlier, that is, the simplicity of determining the main direction, as the main direction flag bRefVer may be simply derived. Conversely, in the case in which the prediction mode numbers do not satisfy the simplicity of determining the main direction, a table associating the prediction mode number m and the main direction becomes necessary. Consequently, by using a prediction mode number definition that satisfies the simplicity of determining the main direction, the main direction may be derived without using such a table, and thus memory may be reduced.

The gradient deriver 1453B derives the gradient intraPredAngle. In addition, the gradient deriver 1453B is able to reference a gradient definition table DEFANG1 illustrated in FIG. 15. The gradient definition table DEFANG1 illustrated in FIG. 15 is a table illustrating correspondence relationships between prediction mode identifiers and values of the gradient intraPredAngle.

The gradient deriver 1453B may also derive the gradient intraPredAngle on the basis of the gradient definition table DEFANG1. The value of the gradient intraPredAngle is a value indicating the gradient of a prediction direction. More accurately, in the case in which the main direction is the vertical direction, the direction of a vector expressed as (intraPredAngle, −32) becomes the prediction direction. In the case in which the main direction is the horizontal direction, the direction of a vector expressed as (−32, intraPredAngle) becomes the prediction direction. According to the gradient definition table DEFANG1 illustrated in FIG. 15, the absolute value of the gradient intraPredAngle corresponding to the absolute values 0 to 8 of the displacement with respect to the main direction become 0, 2, 5, 9, 13, 17, 21, 26, and 32 in order.

The sign of the displacement with respect to the main direction and the sign of the gradient intraPredAngle are the same. For example, the value of the gradient intraPredAngle corresponding to the identifier HOR−1 is −2.

Note that in the gradient definition table DEFANG1 illustrated in FIG. 15, two prediction modes with different main directions but equal displacements with respect to the main direction are associated with the same intraPredAngle value. Consequently, a table may be configured so that two prediction modes with equal displacements with respect to the main direction share the configuration of the same value of the gradient intraPredAngle, as in the gradient definition table DEFANG1*r* illustrated in FIG. 16, for example.

Consequently, the gradient deriver 1453B may also derive the gradient intraPredAngle on the basis of the gradient definition table DEFANG1*r* illustrated in FIG. 16. Note that in the prediction direction deriver 1453, it is sufficient to provide one of either the gradient definition table DEFANG1 illustrated in FIG. 15, or the gradient definition table DEFANG1*r* illustrated in FIG. 16.

By using the gradient definition table DEFANG1*r* illustrated in FIG. 16, memory may be reduced compared to the case of using the gradient definition table DEFANG1 illustrated in FIG. 15. Note that in the case in which the prediction mode numbers satisfy the property 2 discussed earlier, that is, the simplicity of determining directional prediction modes with the same displacement, prediction modes with equal displacements with respect to the main direction may be simply derived. Specifically, in the case of using the prediction mode number definition of FIG. 6, an index k that uniquely indicates the displacement with respect to the main direction may be derived using the prediction mode number m according to the formula k=(m+1)>>1. Using a table that associates this index k and the offset intraPredAngle, the value of the offset intraPredAngle may be derived from the prediction mode number. In other words, in the case in which the prediction mode numbers satisfy the simplicity of determining directional prediction modes with the same displacement, the size of a table used to derive a parameter used for angular prediction (intraPredAngle) may be reduced.

Figures 17, 18:
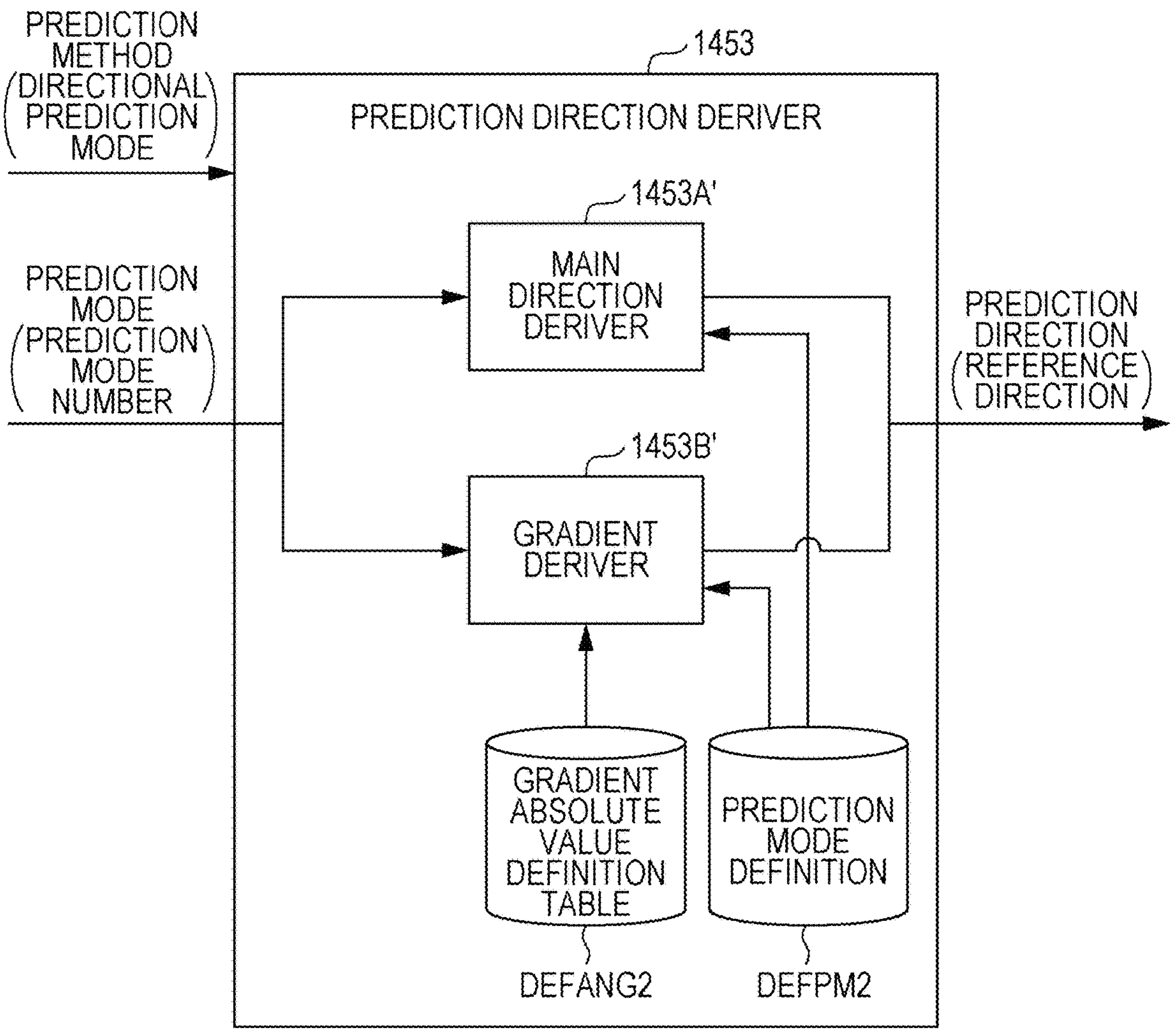
FIG. 17 is a function block diagram illustrating another exemplary configuration of a prediction direction deriver in the above video image decoding device.
FIG. 18 is a table illustrating another example of correspondence relationships between prediction mode identifiers and the absolute values absIntraPredAngle of a gradient intraPredAngle.

In the case of using the prediction mode definition DEFPM2 illustrated in FIG. 9, it is sufficient to modify the configuration of the prediction direction deriver 1453 illustrated in FIG. 1 as illustrated in FIG. 17. FIG. 17 is a function block diagram illustrating another exemplary configuration of the prediction direction deriver 1453. In the prediction direction deriver 1453 illustrated in FIG. 17, the main direction deriver 1453A and the gradient deriver 1453B in FIG. 1 are modified to a main direction deriver 1453A' and a gradient deriver 1453B'.

The main direction deriver 1453A' references the prediction mode definition DEFPM2 of FIG. 9. Since the derivation of the main direction flag bRefVer is similar to that of the main direction deriver 1453A illustrated in FIG. 1, description thereof will be omitted.

The gradient deriver 1453B' derives the gradient intraPredAngle by deriving the absolute value and the sign of the gradient from the prediction mode number. The gradient deriver 1453B' is able to derive the absolute value of the gradient by referencing a gradient absolute value definition table DEFANG2 illustrated in FIG. 18. The gradient absolute value definition table DEFANG2 illustrated in FIG. 18 is a table associating the absolute value of the displacement with respect to the main direction and the absolute value absIntraPredAngle of the gradient intraPredAngle. In the case of using the prediction mode definition DEFPM2 of FIG. 9, the property 5 discussed earlier, that is, the simplicity of determining the absolute value of the displacement, enables the derivation of an index DI that uniquely specifies the absolute value of the displacement according to the formula DI=(m+d)>>2. Also, FIG. 18 illustrates correspondence relationships between the index DI and absIntraPredAngle. The values 0, 5, 2, 6, 3, 7, 4, 8, and 1 of the index DI are associated with the values 0, 2, 5, 9, 13, 17, 21, 26, and 32 of absIntraPredAngle, respectively.

In addition, the gradient deriver 1453B' uses the property 4 of the prediction mode definition of FIG. 9, that is, the simplicity of determining the sign of the displacement, to derive by calculation the sign of the offset (gradient) intraPredAngle.

The gradient deriver 1453B' derives the gradient intraPredAngle by combining the absolute value of the gradient and the sign of the gradient derived as above.

The angular prediction section 1452A uses reference pixels in the input prediction direction (reference direction) to generate and output a corresponding predicted image within the target PU. In the process of generating a predicted image by angular prediction, main reference pixels are configured according to the value of the main direction flag bRefVer, and a predicted image is generated by referencing main reference pixels in units of lines or columns within the PU. In the case in which the value of the main direction flag bRefVer is 1 (the main direction is the vertical direction), the units of generating the predicted image are configured to lines, and in addition, reference pixels on top of the target PU are configured as the main reference pixels. Specifically, main reference pixels refMain[x] are configured using the values of reference pixels p[x, y] according to the following formula.

$$refMain[x]=p[-1+x,-1], \text{ with } x=0\ldots 2*nS$$

$$refMain[x]=p[-1,-1+((x*invAngle+128)>>8)], \text{ with } x=-nS\ldots -1$$

Note that herein, invAngle corresponds to a value obtained by scaling (multiplying by 8192) the inverse of the displacement intraPredAngle of the prediction direction. According to the above formula, in the range of x equal to or greater than 0, the value of refMain[x] is configured to a decoded pixel value of a pixel neighboring the top edge of the target PU. Meanwhile, in the range of x less than 0, a reference pixel value of a pixel neighboring the left edge of the target PU is configured as the value of refMain[x] at a position derived on the basis of the prediction direction. A predicted image predSamples[x, y] is calculated according to the following formula.

$$predSamples[x,y]=((32-iFact)*refMain[x+iIdx+1]+iFact*refMain[x+iIdx+2]+16)>>5$$

Herein, iIdx and iFact represent the position of a main reference pixel used to generate a prediction target pixel, which is calculated according to the distance between the prediction target line and the main reference pixel (y+1), and the gradient intraPredAngle. Herein, iIdx corresponds to an integer-precision position in units of pixels, iFact to a fractional-precision position in units of pixels, and are derived according to the following formulas.

$$iIdx=((y+1)*intraPredAngle)>>5$$

$$iFact=((y+1)*intraPredAngle)\&\&31$$

In the case in which the value of the main direction flag bRefVer is 0 (the main direction is the horizontal direction), the units of generating the predicted image are configured to columns, and in addition, reference pixels to the left of the target PU are configured as the main reference pixels. Specifically, main reference pixels refMain[x] are configured using the values of reference pixels p[x, y] according to the following formula.

$$refMain[x]=p[-1,-1+x], \text{ with } x=0\ldots nS$$

$$refMain[x]=p[-1+((x*invAngle+128)>>8),-1], \text{ with } x=-nS\ldots -1$$

A predicted image predSamples[x, y] is calculated according to the following formula.

$$predSamples[x,y]=((32-iFact)*refMain[y+iIdx+1]+iFact*refMain[y+iIdx+2]+16)>>5$$

Herein, iIdx and iFact represent the position of a main reference pixel used to generate a prediction reference pixel, which is calculated according to the distance between the prediction target column and the main reference pixel (x+1), and the gradient intraPredAngle. Herein, iIdx corresponds to an integer-precision position in units of pixels, iFact to a fractional-precision position in units of pixels, and are derived according to the following formulas.

$$iIdx=((x+1)*intraPredAngle)>>5$$

$$iFact=((x+1)*intraPredAngle)\&31$$

Herein, "&" is an operator that represents a bitwise logical product operation. The result of "A&31" means the remainder from dividing the integer A by 32.

(Flow of Angular Prediction Process)

Figure 19:
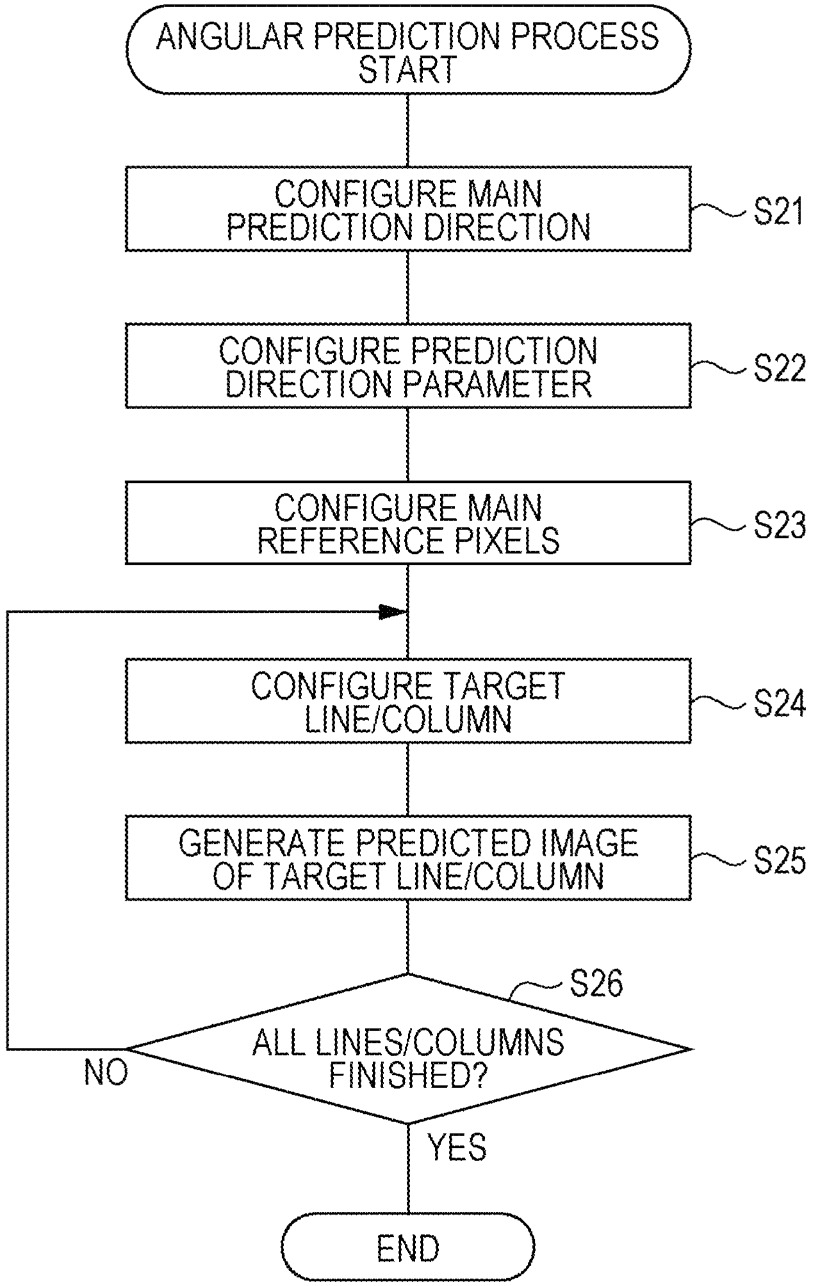
FIG. 19 is a flowchart illustrating an angular prediction process in the above luma prediction section.

Next, the predicted image generation process in the luma prediction section 145 in the case in which the prediction mode is angular prediction will be described using the flowchart in FIG. 19. FIG. 19 is a flowchart illustrating an angular prediction process in above luma prediction section. First, in the case in which the prediction mode input into the prediction method selector 1451 is angular prediction, a predicted image generation process by angular prediction starts. The prediction direction deriver 1453 decides the main direction of the prediction direction on the basis of the input prediction mode, and outputs to the angular prediction section 1452A (S21). Next, the prediction direction deriver 1453 decides the offset intraPredAngle with respect to the main direction of the prediction direction on the basis of the input prediction mode, and outputs to the angular prediction section 1452A (S22). The angular prediction section 1452A configures main reference pixels on the basis of the input main direction (S23). Subsequently, the angular prediction section 1452A configures a prediction target line or column (S24), and generates a predicted image for the target line or column (S25). It is checked whether or not predicted image generation has completed for all lines/columns of the target PU (S26), and if not completed (S26, No), the process in S24 is executed. If completed (S26, Yes), the predicted image of the target PU is output, and the process ends.

(Details of Luma Prediction Section)

Figure 20:
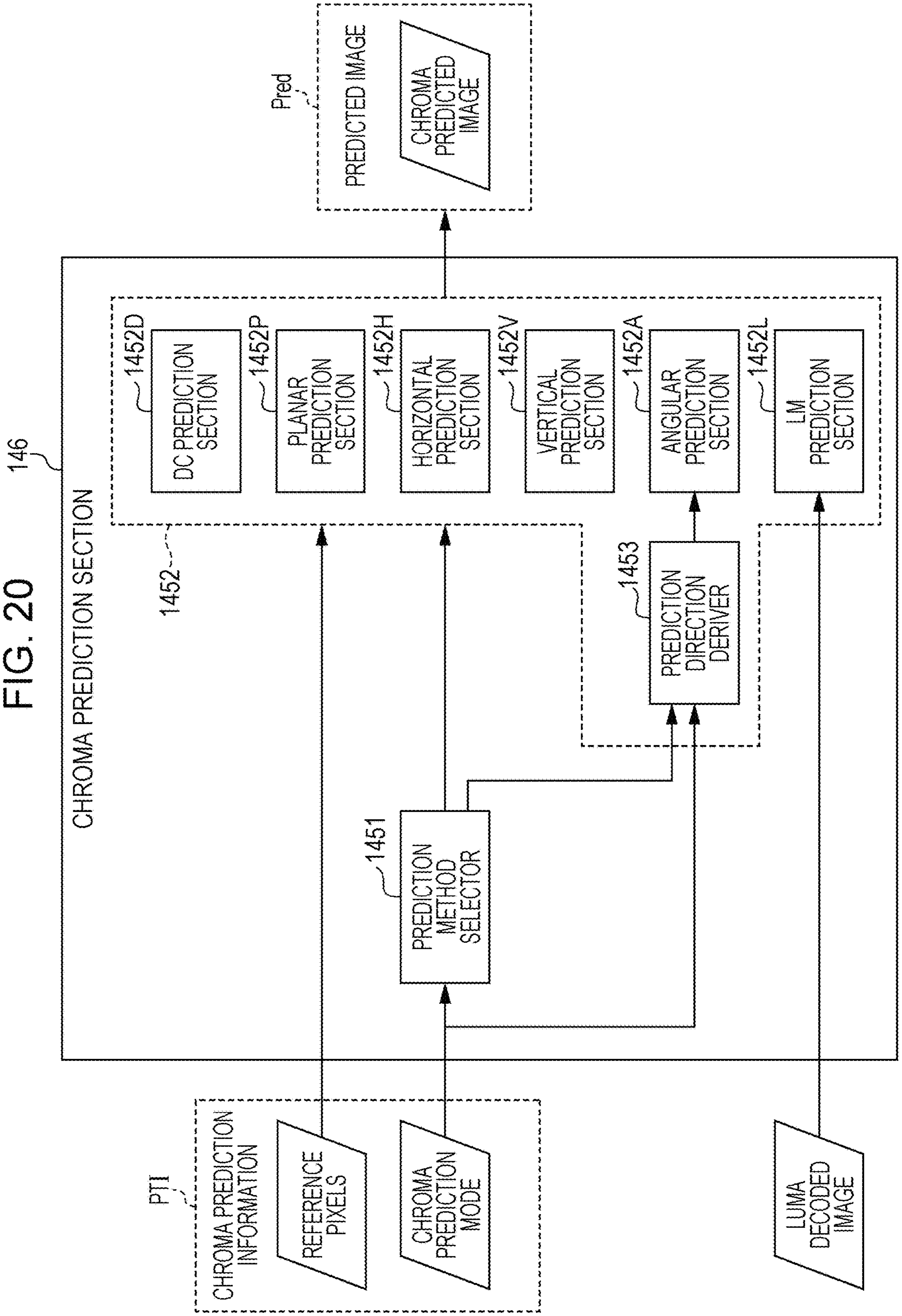
FIG. 20 is a block diagram illustrating a detailed configuration of a chroma prediction section provided in the above predicted image generator.

Next, FIG. 20 will be used to describe the chroma prediction section 146 in detail. FIG. 20 illustrates details of the chroma prediction section 146. The chroma prediction section 146 is equipped with a prediction method selector 1451, a predicted image deriver 1452, and a prediction direction deriver 1453. The predicted image deriver 1452 is equipped with a DC prediction section 1452D, a planar prediction section 1452P, a horizontal prediction section 1452H, a vertical prediction section 1452V, an angular prediction section 1452A, and an LM prediction section 1452L. Note that since the structural elements other than the LM prediction section 1452L have the same functions as the corresponding structural elements included in the luma prediction section 145, the same signs are denoted, and description will be omitted.

The LM prediction section 1452L estimates parameters related to the correlation of luma pixel values and chroma pixel values within the target PU, on the basis of the correlation between luma decoded pixel values near the target PU, and reference pixel values (chroma decoded pixel values). The correlation parameters include a correlation coefficient a and an offset b. The prediction target PU, that is, a chroma predicted image predSamplesC[x, y] is calculated using the pixel values recY[x, y] of a luma decoded image corresponding to the target PU and the correlation parameters according to the following formula.

$$predSamplesC[x, y] = a * recY[x, y] + b$$

The foregoing thus describes a predicted image generation process for a target CU in the predicted image generator 14.

(Details of Variable-Length Decoder)

Figure 21:
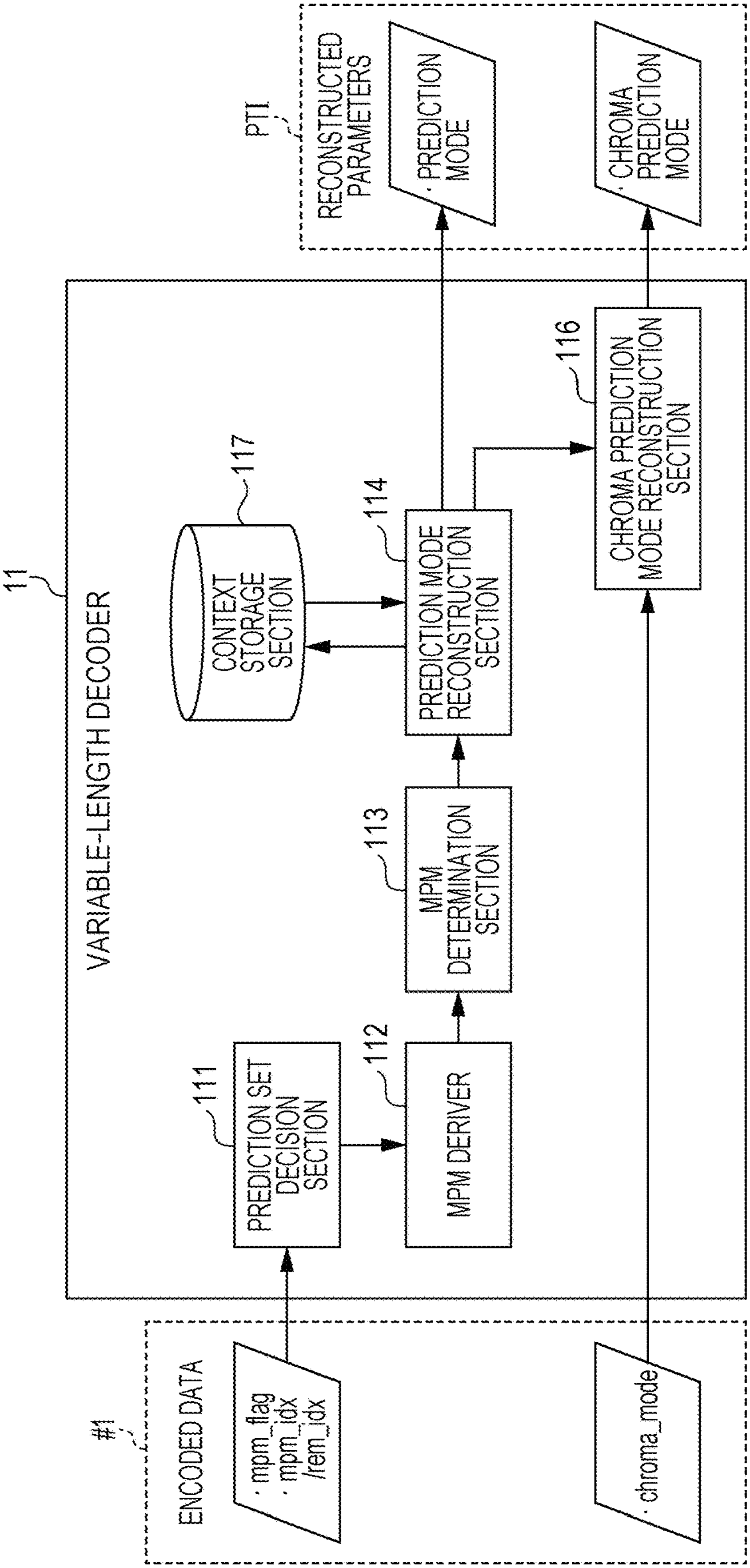
FIG. 21 is a function block diagram illustrating an exemplary configuration of a variable-length decoder provided in the above video image decoding device.

Next, FIG. 21 will be used to describe a configuration of the variable-length decoder 11 in further detail. FIG. 21 is a function block diagram illustrating an exemplary configuration of the variable-length decoder 11. Note that FIG. 21 illustrates details related to the part of the configuration that decodes the prediction mode from among the configuration of the variable-length decoder 11.

As illustrated in FIG. 21, the variable-length decoder 11 is equipped with a prediction set decision section 111, an MPM deriver 112, an MPM determination section 113, a prediction mode reconstruction section 114, a chroma prediction mode reconstruction section 116, and a context storage section 117.

The prediction set decision section 111 decides a prediction set, which is a set of prediction modes to use in the prediction process. As an example, the prediction set decision section 111 computes a number of prediction modes to used in the prediction process according to the size of the target block, and decides the prediction set by selecting a number of prediction modes equal to the computed number from a prediction mode definition. In other words, the prediction set is defined for individual sizes of target block, or for individual numbers of prediction modes usable in the target PU.

The MPM deriver 112 derives an MPM on the basis of prediction modes distributed in partitions near the target partition.

As an example, the MPM deriver 112 may derive two MPMs. The MPM deriver 112 respectively derives a first MPM candidate (hereinafter designated MPM0) and a second MPM candidate (hereinafter designated MPM1) as follows.

Figure 22:
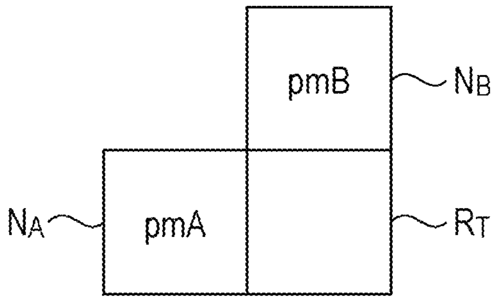
FIG. 22 is a diagram illustrating an MPM candidate derivation method in an MPM deriver provided in the above variable-length decoder.

First, as illustrated in FIG. 22, the prediction mode of the left-neighboring PU $N_A$ neighboring to the left of the target PU RT is set to pmA, and the prediction mode of the top-neighboring PU $N_B$ neighboring on top of the target PU RT is set to pmB. In the case in which the prediction mode of left-neighboring PU or the top-neighboring PU is unusable, a predetermined prediction mode such as "Intra_Planar", for example, is configured.

The case of an unusable neighboring PU encompasses the case in which the prediction mode of the neighboring PU is not yet decoded, and the case in which the neighboring PU is a top-neighboring PU that belongs to a different LCU (tree block).

Subsequently, the MPM deriver 112 derives MPM0 according to the following formula (1).

$$MPM0 = pmA \qquad (1)$$

Next, the MPM deriver 112 derives MPM1 according to whether or not pmA and pmB match. If pmA and pmB do not match, MPM1 is derived according to the following formula (2).

$$MPM1 = pmB \qquad (2)$$

On the other hand, if pmA and pmB do match, the MPM deriver 112 sets "Intra_Planar" to MPM1 if pmA is "Intra_DC", and sets "Intra_DC" to MPM1 if pmA is other than "Intra_DC".

The MPM determination section 113 determines whether or not the prediction mode of the target PU matches an estimated prediction mode MPM, on the basis of an mpm_flag included in the encoded data. The mpm_flag is "1" if the prediction mode of the target PU matches the estimated prediction mode MPM, and "0" if the prediction mode of the target PU does not match the estimated prediction mode MPM. The MPM determination section 113 reports the determination result to the prediction mode reconstruction section 114.

Note that the MPM determination section 113 decodes mpm_flag from the encoded data according to context being stored in the context storage section 117.

The prediction mode reconstruction section 114 reconstructs a prediction mode for the target PU.

The prediction mode reconstruction section 114 reconstructs a prediction mode according to a determination result reported from the MPM determination section 113.

If the prediction mode of the target PU matches the estimated prediction mode MPM, the prediction mode reconstruction section 114 decodes mpm_idx from the encoded data, and reconstructs the prediction mode on the basis of that value. The mpm_idx is "0" if the prediction mode of the target PU matches MPM0, and "1" if the prediction mode of the target PU matches MPM1.

Note that the prediction mode reconstruction section 114 may or may not use context being stored in the context storage section 117 when decoding mpm_idx.

In the case of using context, it is preferable to conditionally swap the values of MPM0 and MPM1 so that the prediction mode corresponding to the smaller prediction mode number between MPM0 and MPM1 derived by the above process becomes the value of MPM0. In the case of using context, the bit rate may be reduced if bias occurs in the probability of 0 or 1. Since smaller prediction mode numbers are associated with prediction modes typically having a high probability, by assigning the prediction mode of the smaller prediction mode number to MPM0, the probability of MPM0 becomes higher than the probability of MPM1. Consequently, since mpm_idx has a higher likelihood of producing a value of 0 compared to the likelihood of producing a value of 1, the bit rate of mpm_idx may be reduced.

On the other hand, in the case of not using context, it is preferable to not apply a swap so that the prediction mode having the smaller prediction mode number between MPM0 and MPM1 derived by the above process becomes associated with MPM0. In the case of not using context, since mpm_idx is decoded by assuming equal likelihood, the bit rate cannot be reduced even if bias occurs in the occurrence of 0 and 1. Consequently, there is no bit rate reduction effect due to associating the smaller prediction mode with MPM0. On the other hand, by omitting the conditional swap for associating the smaller prediction mode with MPM0, it is possible to reduce the processing load required to derive the prediction mode in the case in which the prediction mode of the target PU is the MPM.

If the prediction mode of the target PU does not match the estimated prediction mode MPM, the prediction mode reconstruction section 114 reconstructs the prediction mode on the basis of rem_idx included in the encoded data. Specifically, first, the values of MPM0 and MPM1 are conditionally swapped so that the smaller prediction mode number from between MPM0 and MPM1 is assigned to MPM0. Next, if the value of rem_idx is equal to or greater than the value of MPM0, the value of rem_idx is incremented by 1. Next, if the value of rem_idx is equal to or greater than the value of MPM1, the value of rem_idx is incremented by 1. Lastly, the prediction mode corresponding to the prediction mode number of the value of rem_idx is reconstructed.

The chroma prediction mode reconstruction section 116 reconstructs a chroma prediction mode for the target PU. More specifically, the chroma prediction mode reconstruction section 116 reconstructs a chroma prediction as follows.

First, the chroma prediction mode reconstruction section 116 decodes intra chroma prediction mode designation information chroma_mode (intra_chroma_pred_mode) included in the encoded data #1.

Subsequently, the chroma prediction mode reconstruction section 116 reconstructs a chroma prediction mode on the basis of the reconstructed intra chroma prediction mode designation mode chroma_mode, and the luma prediction mode (IntraPredMode[xB][yB]).

[Overall Flow]

Figure 23:
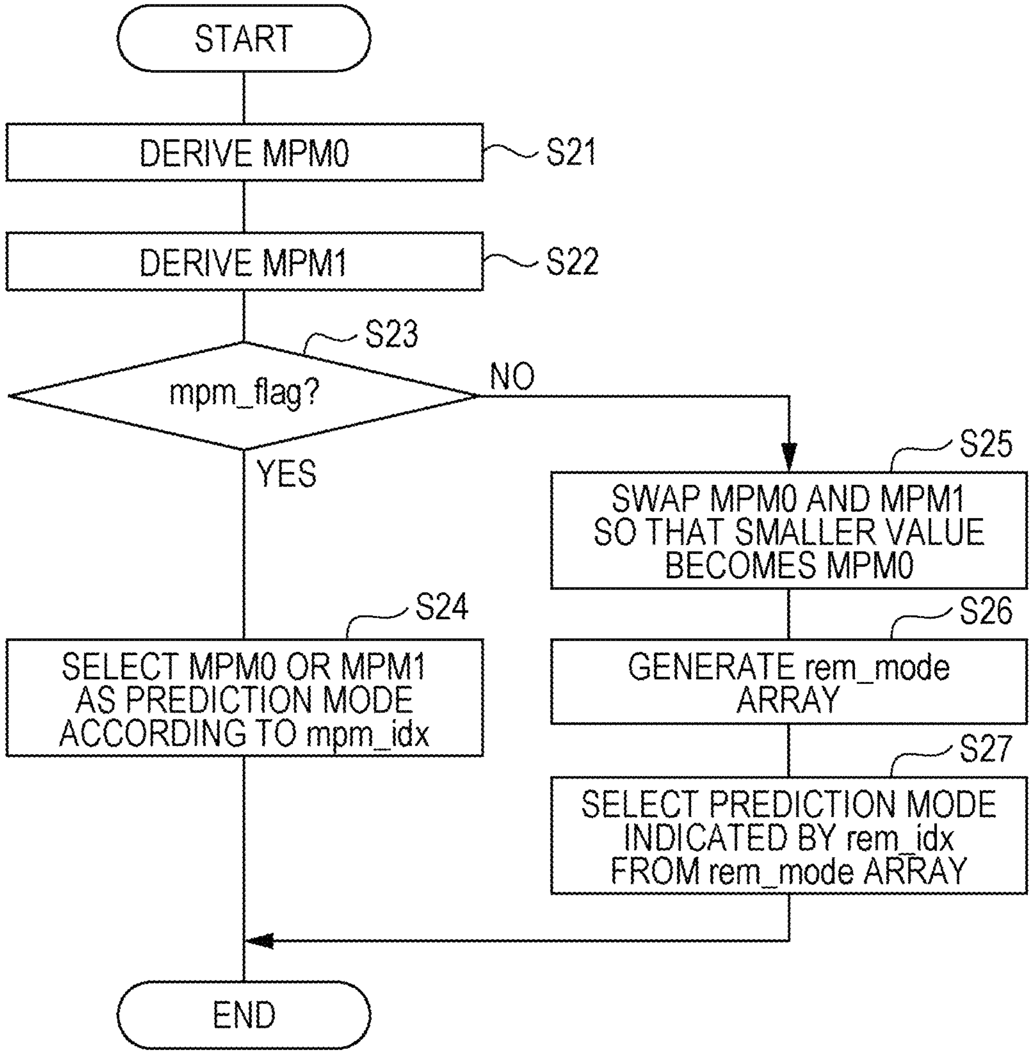
FIG. 23 is a flowchart illustrating an example of a diagrammatic flow of a prediction mode decoding process in the above video image decoding device.

First, the flowchart illustrated in FIG. 23 will be used to describe an example of the overall flow of a prediction mode reconstruction process in the video image decoding device 1.

When the prediction mode reconstruction process starts in the video image decoding device 1, the MPM deriver 112 derives MPM0 (S21). Subsequently, the MPM deriver 112 derives MPM1 (S22).

Next, the MPM determination section 113 determines whether or not the prediction mode of the target PU matches an estimated prediction mode MPM, on the basis of mpm_flag (S23).

If the prediction mode of the target PU matches an estimated prediction mode MPM, that is, MPM0 or MPM1 (S23, Yes), the prediction mode reconstruction section 114 reconstructs the prediction mode on the basis of mpm_idx. The prediction mode reconstruction section 114 treats MPM0 as the prediction mode pmT of the target PU if mpm_idx is “0”, and treats MPM1 as the prediction mode pmT of the target PU if mpm_idx is “1” (S24).

On the other hand, if the prediction mode of the target PU does not match an estimated prediction mode MPM (S23, No), the prediction mode reconstruction section 114 compares MPM0 and MPM1, and swaps MPM0 and MPM1 if the prediction mode number of MPM1 is smaller than the prediction mode number of MPM0 (S25). Subsequently, the prediction mode reconstruction section 114 generates a rem mode array (S26). Lastly, the prediction mode reconstruction section 114 selects the rem_idx-numbered element of the rem mode array as the prediction mode (S27).

<Video Image Encoding Device>

Hereinafter, the video image encoding device 2 according to the present embodiment will be described with reference to FIGS. 24 to 26.

(Overview of Video Image Encoding Device)

Generally speaking, the video image encoding device 2 is a device that generates and outputs encoded data #1 by encoding an input image #10.

(Configuration of Video Image Encoding Device)

Figure 24:
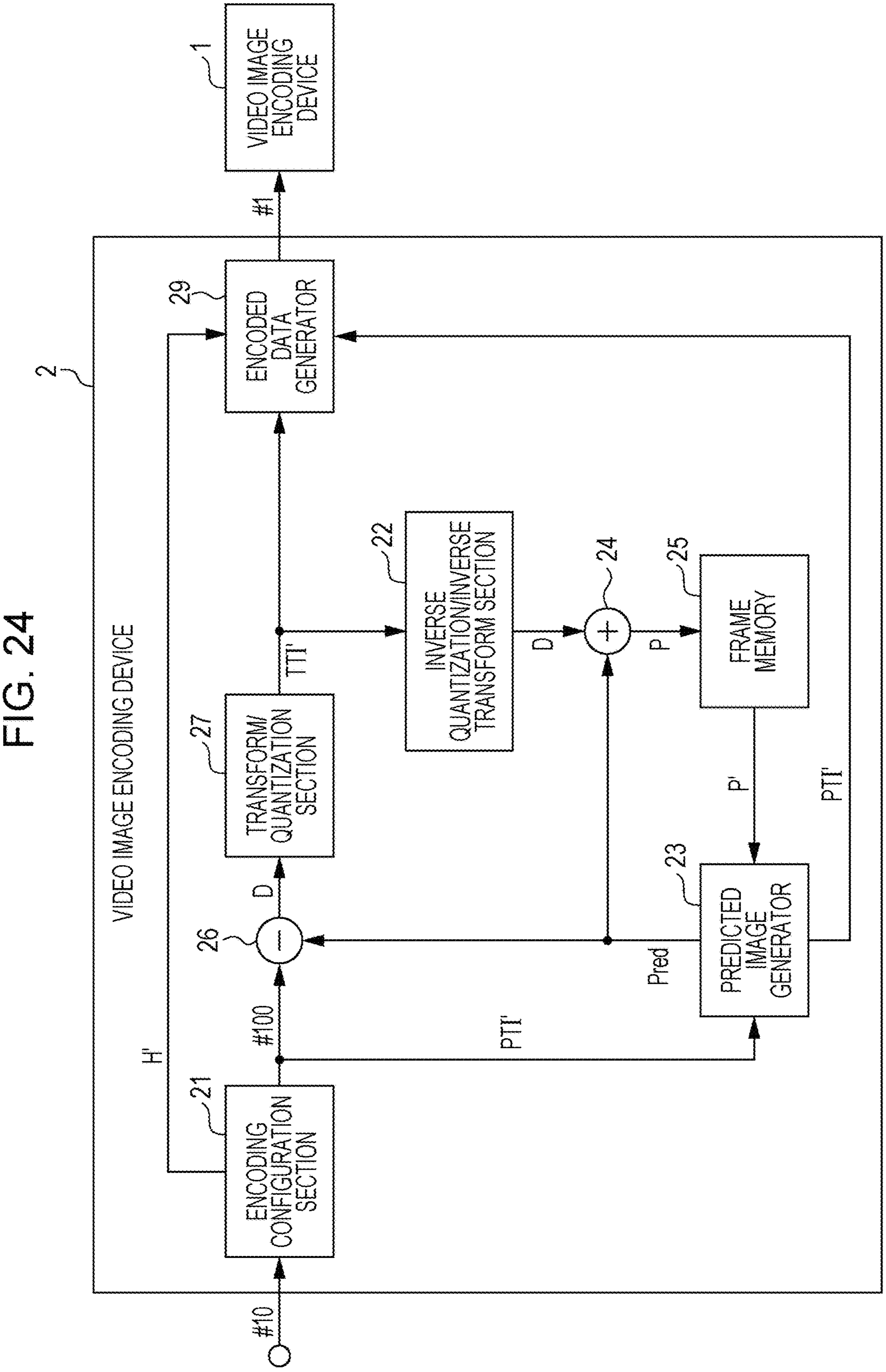
FIG. 24 is a function block diagram illustrating a configuration of a video image encoding device according to an embodiment of the present invention.

First, FIG. 24 will be used to describe an exemplary configuration of the video image encoding device 2.

FIG. 24 is a function block diagram illustrating a configuration of the video image encoding device 2.

As illustrated in FIG. 24, the video image encoding device 2 is equipped with an encoding configuration section 21, an inverse quantization/inverse transform section 22, a predicted image generator 23, an adder 24, frame memory 25, a subtractor 26, a transform/quantization section 27, and an encoded data generator 29.

The encoding configuration section 21 generates image data related to encoding and various configuration information on the basis of an input image #10.

Specifically, the encoding configuration section 21 generates the following image data and configuration information.

First, the encoding configuration section 21 generates a CU image #100 for a target CU by successively splitting the input image #10 in units of slices, units of tree blocks, and units of CUs.

Additionally, the encoding configuration section 21 generates header information H' on the basis of the result of the splitting process. The header information H' includes (1) information about the sizes and shapes of tree blocks belonging to the target slice, as well as the positions within the target slice, and (2) CU information CU' about the sizes and shapes of CUs belonging to each tree block, as well as the positions within the target tree block.

Furthermore, the encoding configuration section 21 generates a CU image #100, and also references the CU information CU' to generate PT configuration information PTI'. The PT configuration information PTI' includes (1) available split patterns for splitting the target CU into respective PUs, and (2) information related to all combinations of prediction modes assignable to each PU.

The encoding configuration section 21 supplies the CU image #100 to the subtractor 26. Also, the encoding configuration section 21 supplies the header information H' to the encoded data generator 29. Also, the encoding configuration section 21 supplies the PT configuration information PTI' to the predicted image generator 23.

The inverse quantization/inverse transform section 22 reconstructs the prediction difference for each block by applying an inverse quantization and an inverse orthogonal transform to the quantized prediction difference of each block supplied by the transform/quantization section 27. Since the inverse orthogonal transform has already been described with respect to the inverse quantization/inverse transform section 13 illustrated in FIG. 1, that description will be omitted herein.

Additionally, the inverse quantization/inverse transform section 22 consolidates the prediction difference of each block according to a split pattern designated by the TT split information (discussed later), and generates a prediction difference D for the target CU. The inverse quantization/inverse transform section 22 supplies the generated prediction difference D for the target CU to the adder 24.

The predicted image generator 23 references a locally decoded image P' recorded in the frame memory 25, as well as the PT configuration information PTI', to generate a predicted image Pred for the target CU. The predicted image generator 23 configures prediction parameters obtained by the predicted image generation process in the PT configuration information PTI', and transfers the configured PT configuration information PTI' to the encoded data generator 29. Note that since the predicted image generation process by the predicted image generator 23 is similar to that of the predicted image generator 14 provided in the video image decoding device 1, description herein is omitted.

The adder 24 adds together the predicted image Pred supplied by the predicted image generator 23 and the prediction difference D supplied by the inverse quantization/inverse transform section 22, thereby generating a decoded image P for the target CU.

Decoded images P that have been decoded are successively recorded to the frame memory 25. In the case of decoding a target tree block, decoded images corresponding to all tree blocks decoded prior to that target tree block (for example, all preceding tree blocks in the raster scan order) are recorded in the frame memory 25.

The subtractor 26 generates the prediction difference D for a target CU by subtracting the predicted image Pred from the CU image #100. The subtractor 26 supplies the generated prediction difference D to the transform/quantization section 27.

The transform/quantization section 27 generates a quantized prediction difference by applying an orthogonal transform and quantization to the prediction difference D. Note that the orthogonal transform at this point refers to a transform from the pixel domain to the frequency domain. Also, examples of the inverse orthogonal transform include the discrete cosine transform (DCT transform) and the discrete sine transform (DST transform).

Specifically, the transform/quantization section 27 references the CU image #100 and the CU information CU', and decides a split pattern for splitting the target CU into one or multiple blocks. Also, the prediction difference D is split into a prediction difference for each block according to the decided split pattern.

In addition, the transform/quantization section 27, after generating a prediction difference in the frequency domain by orthogonally transforming the prediction difference for each block, generates a quantized prediction difference for each block by quantizing the prediction difference in the frequency domain.

Also, the transform/quantization section 27 generates TT configuration information TTI' that includes the generated quantized prediction difference for each block, TT split information designating the split pattern of the target CU, and information about all available split patterns for splitting the target CU into respective blocks. The transform/quantization section 27 supplies the generated TT configuration information TTI' to the inverse quantization/inverse transform section 22 and the encoded data generator 29.

The encoded data generator 29 encodes the header information H', TT configuration information TTI', and the PT configuration information PTI', and generates and outputs encoded data #1 by multiplexing the encoded header information H, TT configuration information TTI, and PT configuration information PTI.

(Details of Encoded Data Generator)

Figure 25:
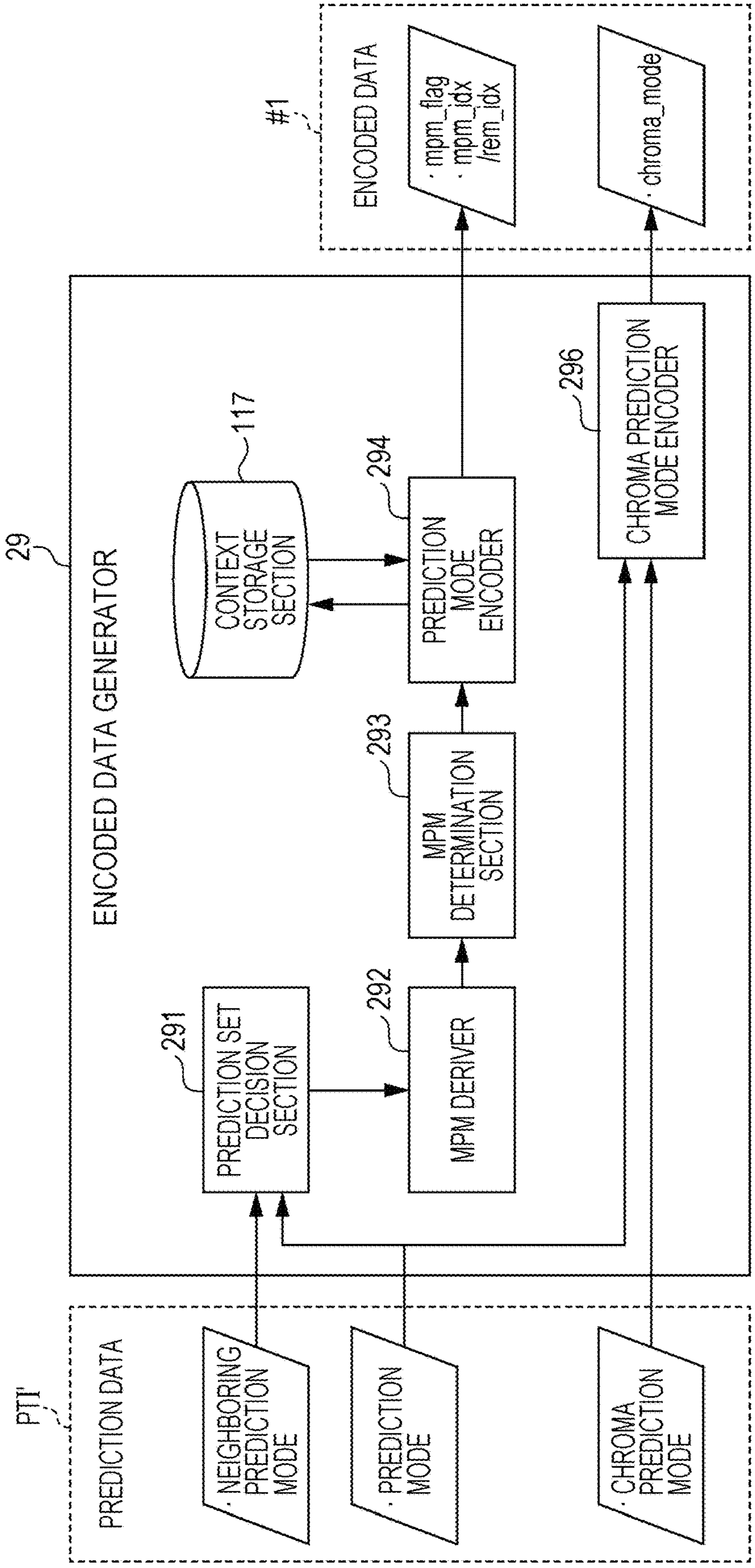
FIG. 25 is a function block diagram illustrating an exemplary configuration of an encoded data generator provided in the above video image encoding device.

Next, FIG. 25 will be used to describe the encoded data generator 29 in detail. FIG. 25 is a function block diagram illustrating an exemplary configuration of the encoded data generator 29.

Note that hereinafter, the configuration of the encoded data generator 29 for encoding parameters related to the prediction mode (luma) and the chroma prediction mode from among the parameters included in the TT configuration information TTI' will be described.

However, the encoded data generator 29 is not limited thereto, and may also encode data other than the transform coefficients included in the TT information TTI', such as side information, for example.

As illustrated in FIG. 25, the encoded data generator 29 is equipped with a context storage section 117, a prediction set decision section 291, an MPM deriver 292, an MPM determination section 293, a prediction mode encoder 294, and a chroma prediction mode encoder 296.

Also, regarding MPM derivation, for example, there is no difference between the video image decoding device 1 and the video image encoding device 2.

In this way, for portions of the configuration that correspond between the video image decoding device 1 and the video image encoding device 2 or portions of the configuration that conduct similar processes, the configuration of the video image decoding device 1 may be used in the video image encoding device 2.

Consequently, the prediction set decision section 291 and the MPM deriver 292 are similar to the context storage section 151, the chroma prediction mode definition storage section 154, the prediction set decision section 111, and the MPM deriver 112 illustrated in FIG. 1, respectively. Consequently, description thereof is omitted herein.

Hereinafter, the MPM determination section 293, the prediction mode encoder 294, and the chroma prediction mode encoder 296 will be described.

The MPM determination section 293 determines whether or not an MPM matches the prediction mode, and encodes mpm_flag according to the determination result. Regarding the encoding process, since the variable-length decoder 11 illustrated in FIG. 1 has already been described, that description will be omitted herein.

The prediction mode encoder 294 encodes information related to the prediction mode (mpm_idx, rem_idx) according to the determination result of the MPM determination section 293. The prediction mode encoder 294 encodes mpm_idx in the case of using an MPM, and encodes rem_idx in the case of not using an MPM.

Regarding the encoding of mpm_idx, since the variable-length decoder 11 illustrated in FIG. 1 has already been described, that description will be omitted herein.

The encoding of rem_idx will be discussed later.

The chroma prediction mode encoder 296 encodes a chroma prediction mode for the target PU. More specifically, the chroma prediction mode encoder 296 encodes a chroma prediction as follows.

First, the chroma prediction mode encoder 296 uses prediction modes corresponding to luma and chroma prediction modes to acquire the value of the intra chroma prediction mode designation information chroma_mode (intra_chroma_pred_mode).

Subsequently, the chroma prediction mode encoder 296 encodes the acquired value of the intra chroma prediction mode designation information chroma_mode.

Figure 26:
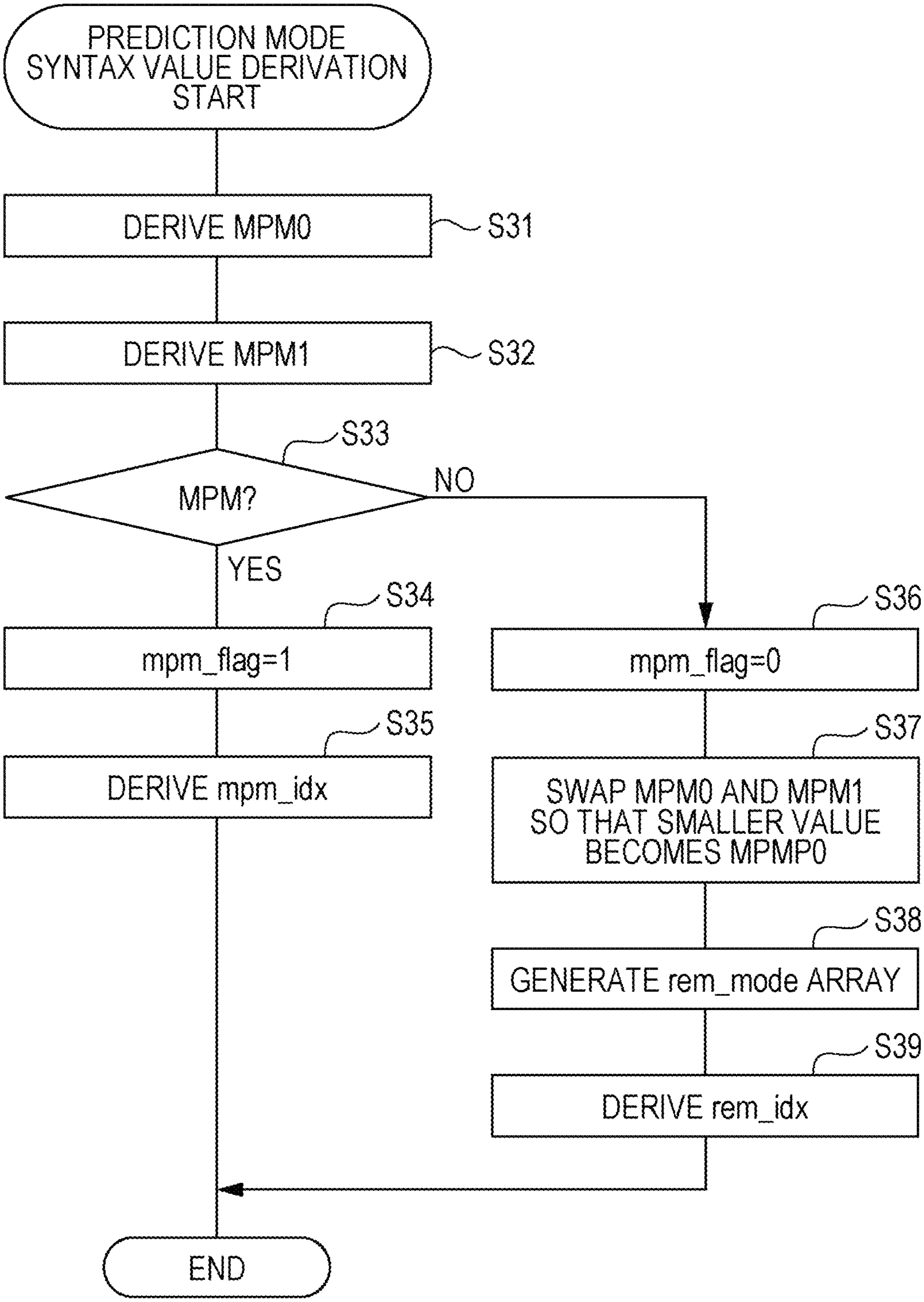
FIG. 26 is a flowchart illustrating an example of a flow of a prediction mode encoding process in the above video image encoding device.

Next, FIG. 26 will be used to describe the flow of a prediction mode encoding process in the video image encoding device 2.

First, the flowchart illustrated in FIG. 26 will be used to describe an example of the overall flow of a prediction mode encoding process in the video image encoding device 2.

When the prediction mode encoding process starts in the video image encoding device 2, the MPM deriver 292 derives MPM0 (S31). Subsequently, the MPM deriver 292 derives MPM1 (S32).

Next, the MPM determination section 293 determines whether or not the prediction mode and an MPM (MPM0 or MPM1) match (S33).

At this point, if the prediction mode and an MPM match (S33, Yes), the MPM determination section 293 encodes mpm_flag=1 (S34), while in addition, the prediction mode encoder 294 derives mpm_idx for the one of MPM0 and MPM1 that matches the prediction mode (S35).

On the other hand, if the prediction mode and an MPM do not match (S33, No), the MPM determination section 293 encodes mpm_flag=0 (S36). The prediction mode encoder 294 compares MPM0 and MPM1, and swaps MPM0 and MPM1 if the prediction mode number of MPM1 is smaller than the prediction mode number of MPM0 (S37). Subsequently, the prediction mode encoder 294 generates a rem mode array (S38). Lastly, the prediction mode encoder 294 derives rem_idx (S39).

(Operational Effects and Advantages)

As indicated above, in a video image decoding device 1 that generates a predicted image according to an intra prediction method associated with a prediction mode, the video image decoding device 1 is equipped with a predicted image generator that, in the case in which the prediction mode is angular prediction, decides a main direction of the prediction direction on the basis of a prediction mode number, and generates a predicted image on the basis of the determination result, and in addition, is equipped with a variable-length decoder that decodes a prediction mode having a property such that the main direction of a corresponding directional prediction mode may be simply determined to be the vertical direction or the horizontal direction.

In addition, as indicated above, in a video image encoding device 2 that generates a predicted image according to an intra prediction method associated with a prediction mode, the video image encoding device 1 is equipped with a predicted image generator that, in the case in which the prediction mode is angular prediction, decides a main direction of the prediction direction on the basis of a prediction mode number, and generates a predicted image on the basis of the determination result, and in addition, is equipped with a variable-length encoder that encodes a prediction mode having a property such that the main direction of a corresponding directional prediction mode may be simply determined to be the vertical direction or the horizontal direction.

In the above configurations, the decision of the main direction of the prediction direction based on a directional prediction mode may be derived by using the above property of the prediction mode number, without using a table that maps prediction mode numbers and main directions. Consequently, the memory required during encoding and decoding may be reduced.

(Supplementary Remarks Regarding Encoded Data #1)

Hereinafter, supplementary remarks regarding the encoded data #1 generated by the video image encoding device 2 will be given.

The basic structure of the encoded data #1 is as described with reference to FIG. 3. The intra prediction parameters included in the intra prediction information in the encoded data #1 include a flag mpm_flag related to the most probable mode (MPM, designated similarly hereinafter), an index mpm_idx for selecting the MPM, as well as an index rem_idx for designating a prediction mode other than the MPM. By using mpm_flag, mpm_idx, and rem_idx, the prediction mode number of the prediction mode (luma) to apply to each PU is decoded, as described with respect to the variable-length decoder 11 of the video image decoding device 1 (FIG. 21). Additionally, in the case of using the prediction mode definition DEFPM2 of FIG. 9, the decoded prediction mode number also has at least the property 1 discussed earlier (simplicity of determining the main direction). As already described, the above property 1 is useful for the predicted image generation process and prediction mode-dependent process in the video image decoding device, but is also useful for other processes, and may be used when taking a decoded image output from the video image encoding device 2 and the encoded data #1 as input, and adaptively applying a post-filter to a decoded image. More specifically, prediction mode numbers are reconstructed on the basis of the encoded data #1, the main direction of each prediction mode is determined to be the vertical direction or the horizontal direction, and a filter that depends on the determination result is applied to the areas corresponding to each prediction mode in the decoded image. In this case, the above property 1 enables the determination of the main direction of a prediction mode to be executed without using a table.

<Modifications>

<Modification 1: Selecting the Transform Coefficient Scan Order>

In the transform coefficient decoding process in the variable-length decoder 11 of the video image decoding device 1, the order in which to decode transform coefficients within a transform unit (the transform coefficient scan order) may also be modified according to the prediction mode number. Since the properties of the produced prediction difference differ according to the prediction method, the properties of the transform coefficients obtained by applying an orthogonal transform and quantization to the prediction difference also differ. Consequently, by selecting according to the prediction method a scan order having more consecutive runs of transform coefficients with a value of 0, the bit rate of the transform coefficients may be reduced. In the case in which the applicable transform coefficient scan order are a horizontal scan (horzScan), a vertical scan (vertScan), and a diagonal scan (diagScan), it is preferable to apply the vertical scan to directional prediction in directions close to vertical, the horizontal scan to directional prediction in directions close to horizontal, and the diagonal scan to all other prediction modes.

For example, a scan order may be decided according to the following procedure. First, if the prediction mode is not directional prediction, or if the angle obtained between the prediction direction and the main direction (the gradient) is greater than a designated value, the diagonal scan is selected. Otherwise, if the main direction of the prediction direction is the vertical direction, the vertical scan is selected. Otherwise, (if the main direction of the prediction direction is the horizontal direction) the vertical scan is selected.

The above selection process may be expressed by the pseudocode indicated below.

```
if (bPlanar(m) || bDC(m) || absIntraPredAngle > 13)
  scanIdx = diagScan;
else
  scanIdx = (bHorz(m)) ? horzScan : vertScan;
```

Herein, bPlanar(m) and bDC(m) are functions that determine if the prediction mode is planar prediction or DC prediction, respectively. Also, the value of absIntraPredAngle is a value indicating the absolute value of the gradient of a prediction direction, and may be derived from FIG. 18 discussed earlier. Also, bHorz(m) is a function that returns a value of 1 if the main direction of the prediction mode is the horizontal direction, and 0 if the vertical direction.

In the case in which the prediction mode has the property 1, that is, the simplicity of determining the main direction as in the prediction mode definitions of FIGS. 6 and 9, the value of bHorz(m) may be simply derived without using a table. For example, in the prediction mode definition of FIG.

9, if the prediction mode number m is even, the main direction is the horizontal direction, and if odd, the main direction is the vertical direction. A scan order may be selected without using an additional table other than the table used during predicted image generation. Consequently, in the case of using a prediction mode definition having the property 1, that is, the simplicity of determining the main direction, memory may be reduced.

<Modification 2: Selecting the Transform/Inverse Transform>

The inverse orthogonal transform in the inverse quantization/inverse transform section 13 of the video image decoding device 1 is a transform between the image domain and a two-dimensional frequency domain, and is a two-dimensional inverse transform. A two-dimensional inverse transform may also be realized by a combination of two one-dimensional inverse transforms (a vertical one-dimensional inverse transform and a horizontal one-dimensional inverse transform). Specifically, a one-dimensional inverse DCT or one-dimensional inverse DST may be used as the vertical one-dimensional inverse transform. Similarly, a one-dimensional inverse DCT or one-dimensional inverse DST may be used as the horizontal one-dimensional inverse transform. Similarly, the transform in the transform/quantization section 27 of the video image encoding device 2 likewise may be realized by a combination of two one-dimensional transforms. For the one-dimensional transforms, the one-dimensional DCT and the one-dimensional DST may be used.

By selecting and applying to the prediction difference a combination of one-dimensional transforms according to the characteristics of the prediction difference, the transform coefficients may be concentrated in low-frequency components compared to the case of always applying the same type of transform, and thus the bit rate of the transform coefficients may be reduced.

For example, a combination of one-dimensional DCTs applied in the vertical/horizontal directions by the following procedure may be selected. First, if the prediction mode is planar prediction, the main direction of the prediction mode is the vertical direction, or alternatively, the main direction of the prediction mode is the horizontal direction and the prediction direction is from the upper-left to the lower-right direction, the one-dimensional DST is configured as the vertical one-dimensional transform. Otherwise, the one-dimensional DCT is configured as the vertical one-dimensional transform. Next, if the prediction mode is planar prediction, the main direction of the prediction mode is the horizontal direction, or alternatively, the main direction of the prediction mode is the vertical direction and the prediction direction is from the upper-left to the lower-right direction, the one-dimensional DST is configured as the horizontal one-dimensional transform. Otherwise, the one-dimensional DCT is configured as the horizontal one-dimensional transform.

The above process of selecting a vertical one-dimensional transform (vertTrans) and a horizontal one-dimensional transform (horzTrans) may be expressed by the pseudocode indicated below.

```
vertTrans = (bPlanar(m) || !bHorz(m) ||
    (bHorz(m) && intraPredAngle < 0)) ? DST : DCT;
horzTrans = (bPlanar(m) || bHorz(m) ||
    intraPredAngle < 0) ? DST : DCT;
```

Herein, intraPredAngle represents the gradient of the prediction direction as discussed earlier, with a negative value indicating that the prediction direction (reference direction) is to the upper-left. Note that the positivity or negativity of the prediction direction gradient matches the positivity or negativity of the displacement with respect to the main direction in the prediction mode identifier.

Consequently, if the prediction mode definition satisfies the property 4 discussed earlier, that is, the simplicity of determining the sign of the displacement, it becomes possible to determine positivity or negativity by calculation based on the prediction mode number m, without using a table. In this case, the process of selecting one-dimensional transforms may be executed without using a table. Consequently, if the prediction mode number satisfies the simplicity of determining the sign of the displacement as in the prediction mode definition of FIG. 9, memory may be reduced when selecting one-dimensional transforms.

Note that although the above describes a process of selecting one-dimensional transforms, a process of selecting one-dimensional inverse transforms in the video image decoding device 1 likewise may be executed according to the same process.

<Modification 3: Another Method of Selecting Reference Pixel Filter>

The foregoing description of the predicted image generator 14 describes a method of using the table in FIG. 12 to derive the value of the filter application flag (refPicFilterFlag) in the reference pixel filter section 144, but another derivation method may also be used. For example, the reference pixel filter section 144 may configure the value of the filter application flag depending on the value of the target PU size puSize according to the following formula.

```
refPicFilterFlag = 0 (puSize: 4×4)
refPicFilterFlag = (bPlanar (m) || absAng (m) >= 32) ?
1:0 (puSize: 8×8)
refPicFilterFlag = (bPlanar (m) || absAng (m) >= 5) ? 1:0
(puSize: 16×16)
refPicFilterFlag = (bPlanar (m) || absAng (m) >= 2) ? 1:0
(puSize: 32×32, 64×64)
```

Herein, absAng(m) is the same as the value of absIntraPredAngle defined in the gradient absolute value definition table illustrated in FIG. 18. Consequently, in the above formula, the value of the filter application flag may also be configured on the basis of the absolute value of the gradient of the prediction direction. According to the above formula, in the case in which the prediction mode is directional prediction, applying the reference pixel filter (a refPicFilterFlag value of 1) is selected if the absolute value of the gradient of the prediction direction is less than or equal to a designated threshold depending on the target PU size. The threshold is configured with a smaller value for larger target PU sizes. In the case of a 4×4 PU size, there is no condition related to the gradient of the prediction direction, and the reference pixel filter is never applied. Thus, the threshold may be interpreted as being infinite in this case. Note that the case of a large prediction direction gradient means that the angle obtained between the prediction direction and the main direction is large. Consequently, in the case of a large target PU size, it is preferable to apply the reference pixel filter even to prediction modes associated with prediction directions with smaller angles obtained with respect to the main direction compared to the case of a small target PU size. Qualitatively, since large-sized PUs are selected for comparatively flat areas, and since smoothing is effective in flat areas, the above selection is considered effective. Note that although the above describes modifying the threshold depending on the PU size, the determination may also be made depending on another size, such as the CU size or the transform unit size, for example.

<Modification 4: Another Example of a Prediction Mode Definition>

The prediction mode definitions of FIGS. 6 and 9 have been described as examples of prediction mode definitions with specific properties. The following five properties are given.

(Property 1) Simplicity of determining main direction (Property 2) Simplicity of determining directional prediction modes with the same displacement (Property 3) Simplicity of determining directional prediction precision (Property 4) Simplicity of determining sign of displacement (Property 5) Simplicity of determining absolute value of displacement A different prediction mode definition having some of the above properties may also be used. For example, the prediction mode definition DEFPM3 of FIG. 27 may also be used. In the prediction mode definition DEFPM3 of FIG. 27, the prediction mode number 0 is assigned to planar prediction, and 1 to DC prediction. Furthermore, the prediction mode numbers from 2 to 18 are sequentially assigned to the prediction modes from VER−8 to VER+8. Furthermore, the prediction mode numbers from 19 to 34 are sequentially assigned to the prediction modes from HOR−7 to HOR+8. The prediction mode definition DEFPM3 of FIG. 27 satisfies properties 1 to 3 from among the properties discussed above. Regarding the property 1, the determination of whether the prediction mode is the horizontal direction or the vertical direction may be realized by determining whether or not the prediction mode number is less than or equal to 18. Regarding the property 2, the determination of whether or not two prediction modes have the same displacement may be determined according to whether or not the difference between the two prediction mode numbers is equal to 16. Regarding the property 3, the determination of whether the precision of the directional prediction is high or low, that is, whether the displacement part of the prediction mode identifier is even or odd, may be determined according to whether the prediction mode number is even or odd. Note that the prediction mode definition DEFPM3 of FIG. 27 has simplicity of determining directional prediction as an additional property. In other words, whether or not the prediction mode belongs to directional prediction may be simply determined according to whether or not the prediction mode number is equal to or greater than 2.

<Modification 5: Example of Encoding Different Prediction Modes>

The above example describes an example in which 18 prediction modes are selectable for a PU size of 4×4 and 35 prediction modes are selectable for PU sizes from 8×8 to 64×64 as the intra prediction mode, but is not limited thereto. For example, 19 intra prediction modes may be selectable for a PU size of 4×4 and 35 intra prediction modes may be selected for PU sizes from 8×8 to 64×64. Hereinafter, a prediction mode definition as well as a prediction mode decoding process will be described for such a case.

Assume a prediction mode definition that defines prediction mode numbers as in FIG. 9, and enables the selection of prediction modes with the prediction mode numbers from 0 to 18 for a PU size of 4×4, and the prediction mode numbers from 0 to 34 for PU sizes from 8×8 to 64×64.

The prediction mode decoding process is basically the same as the prediction mode decoding process in the variable-length decoder 11 discussed earlier, but the following points differ. In the prediction mode reconstruction section 114 inside the variable-length decoder 11, the value of rem_idx is not decoded directly from the encoded data. Instead, the value of rem_idx is decided on the basis of the values of rem_idx_zero_flag and rem_idx_minus_one decoded from the encoded data. More specifically, if the decoded value of the mpm_flag is 0, the prediction mode reconstruction section 114 decodes rem_idx_zero_flag from the encoded data. If the value of rem_idx_zero_flag is 1, rem_idx is set to 0. If the value of rem_idx_zero_flag is 0, the value of rem_idx_minus_one is subsequently decoded, and the value of rem_idx_minus_one incremented by 1 is set as the value of rem_idx. At this point, since the range of rem_idx is from 0 to 16 in the case of a 4×4 PU size, and from 0 to 32 otherwise, the range of rem_idx_minus_one is from 0 to 15 in the case of a 4×4 PU size, and from 0 to 31 otherwise. The value of rem_idx_minus_one may be encoded with a fixed-length encoding of 4 bits in the case of a 4×4 PU size, and 5 bits otherwise.

As above, the definition of prediction mode numbers in FIG. 9 of the present invention may also be applied to the case of using a number of prediction modes and a prediction mode encoding method dependent on the PU size like the above.

<Modification 6: Selecting the Number of Luma Prediction Modes>

In the above example, the types of prediction modes applicable to luma are taken to be predetermined types decided according to the PU size, but it may also be configured so that the types of applicable prediction modes are switched in units of sequences, pictures, or slices. Particularly, it is preferable to switch between a configuration in which a specific number of prediction modes are applicable to luma, and a configuration in which a smaller number of prediction modes fewer than the specific number are applicable to luma. In this case, in the case of encoding a portion of a video image in which a small number of prediction mode types are sufficient, side information may be reduced by selecting the configuration in which the smaller number of prediction modes are applicable to luma. Hereinafter, a specific example will be described.

For the number of prediction modes applicable to luma, instead of a number determined by the relationship between the log base 2 of the PU size (log 2PartSize) and the number of prediction modes described in FIG. 7, a number determined by the relationship between a combination of the value of a variable intraPredPrecision and the value of log 2PartSize, and the number of prediction modes, as illustrated in FIG. 30(*a*), may also be used. Herein, the variable intraPredPrecision is a variable that indicates the multiplicity of types of applicable prediction modes. A value of 0 indicates many types, whereas a value of 1 indicates few types. According to the relationship of FIG. 30(*a*), the number of prediction modes in the case of a value of 0 for the variable intraPredPrecision is 18 in the case of a log 2PartSize of 2 (a PU size of 4×4 pixels), and 35 in all other cases, that is, in the case of a log 2PartSize of 3 to 6 (a PU size from 8×8 pixels to 64×64 pixels). On the other hand, the number of prediction modes in the case of a value of 1 for the variable intraPredPrecision is 10, regardless of the value of log 2PartSize.

Provided that the number of prediction modes described above is Nm, the types of prediction modes applicable to luma are preferably taken to be the prediction modes respectively corresponding to the prediction mode numbers from 0 to Nm-1 in the prediction mode definition DEFPM4 illustrated in FIG. 31. In the prediction mode definition DEFPM4 of FIG. 31, the prediction mode numbers from 0 to 9 are sequentially associated with the prediction modes Planar, VER, HOR, DC, VER−8, VER−4, HOR−4, VER+4, HOR+4, and VER+8, respectively. Also, the prediction mode numbers from 10 to 18 are sequentially associated with the prediction modes HOR+8, VER−2, HOR−2, VER+2, HOR+2, VER−6, HOR−6, VER+6, HOR+6, and VER+6, respectively. Also, the prediction mode numbers from 19 to 35 are sequentially associated with the prediction modes VER−1, HOR−1, VER+1, HOR+1, VER−3, HOR−3, VER+3, HOR+3, VER−5, HOR−5, VER+5, HOR+5, VER−7, HOR−7, VER+7, HOR+7, and LM, respectively. In the prediction mode definition DEFPM4, the prediction modes corresponding to the prediction mode numbers from 0 to 9 that are applicable in the case of 10 prediction modes have a property of including only DC, Planar, and Angular prediction with a displacement of 0 or a displacement with an absolute value that is a multiple of 4. Meanwhile, the prediction modes corresponding to the prediction mode numbers from 0 to 17 that are applicable in the case of 18 prediction modes have a property of including only DC, Planar, and Angular prediction with a displacement of 0 or a displacement with an absolute value that is a multiple of 2.

In the above example, using 10 as the minimum number of prediction modes is effective in the case of using two estimated prediction modes MPM when decoding the prediction mode number.

The reason for this is because the range of rem_idx becomes 0 to 7, and thus rem_idx may be encoded with a fixed-length encoding of 3 bits.

Note that the above example describes an example of using 10 as the number of prediction modes regardless of the value of log 2PrartSize if the value of the variable IntraPrecision is 1, but is not limited thereto. For example, the number of prediction modes may be taken to be 4, as illustrated in FIG. 30(*b*). In the case of 4 prediction modes, in the prediction mode definition DEFPM4 of FIG. 31, the prediction mode numbers from 0 to 3 are sequentially associated with the prediction modes Planar, VER, HOR, and DC, respectively. Note that using 4 as the number of prediction modes is effective in the case of using two estimated prediction modes MPM when decoding the prediction mode number. The reason for this is because the range of rem_idx becomes 0 to 1, and thus rem_idx may be encoded with a fixed-length encoding of 1 bit. Generally, in the case in which the number of estimated prediction modes is K, it is preferable to make the number of prediction modes Nm be a value such that the value of Nm-K is a power of 2, as this enables rem_idx to be encoded by fixed-length encoding.

By transmitting the variable intraPredPrecision in the SPS, PPS, or slice header, it becomes possible to modify the types of prediction modes selectable for luma in units of sequences, units of pictures, or units of slices, respectively. Note that use of the variable intraPredPrecision is not strictly necessary, and another value may also be used. For example, a flag indicating information on whether or not to make a modification from predetermined types (the types corresponding to the case of an intraPredPrecision of 0) may be decoded, and in the case in which the flag indicates modification, information indicating which types of prediction modes to make applicable to each prediction unit size for luma may be additionally decoded and used.

<Applications>

The video image encoding device 2 and the video image decoding device 1 discussed above may be installed and utilized in various devices that transmit, receive, record, or play back video images. Note that a video image may be a natural video image recorded by a camera or the like, but may also be a synthetic video image (including CG and GUI images) generated by a computer or the like.

First, the ability to utilize the video image encoding device 2 and the video image decoding device 1 discussed above to transmit and receive a video image will be described with reference to FIG. 28.

Figure 28:
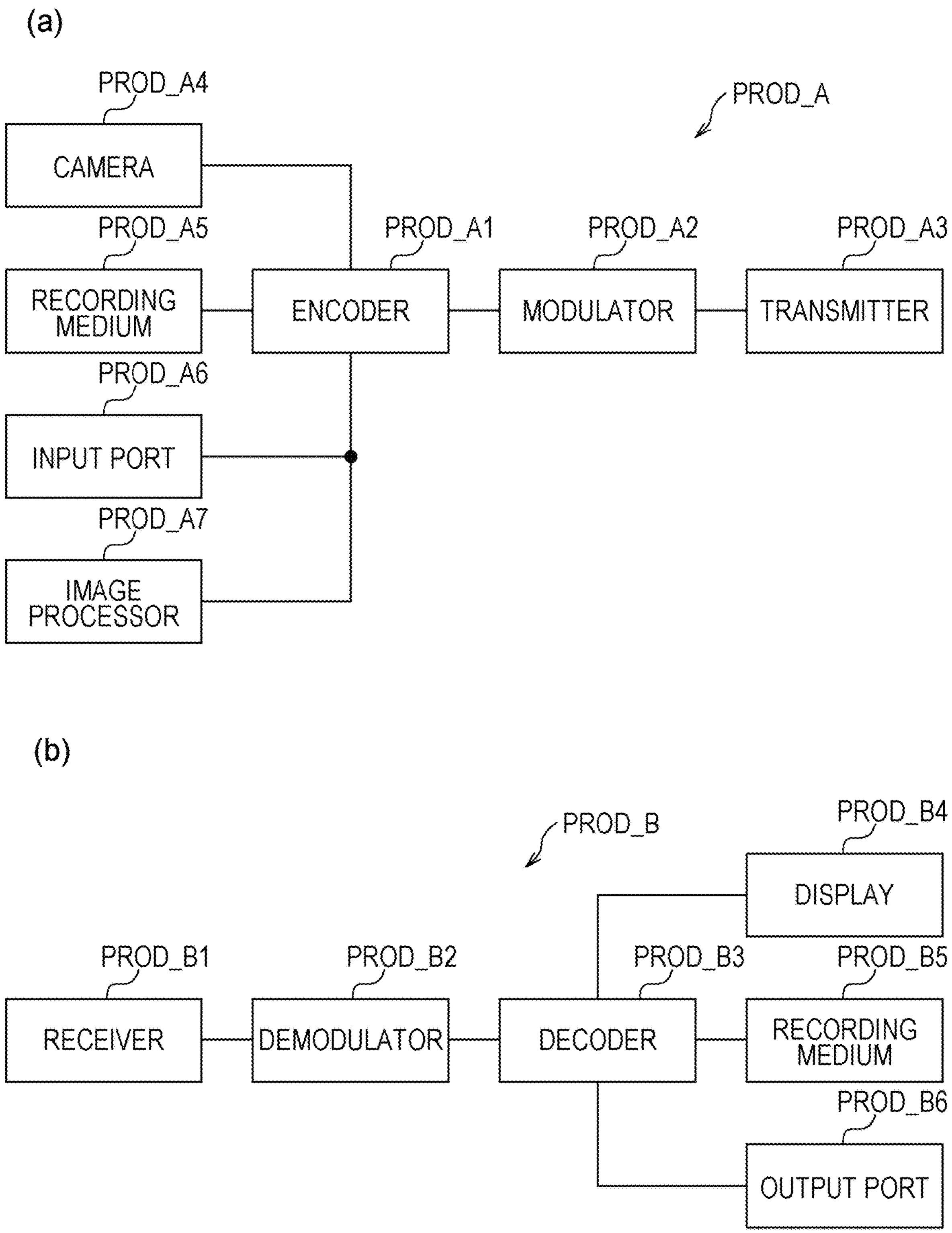
FIG. 28 is a diagram illustrating a configuration of a transmitting device on board the above video image encoding device, and a receiving device on board the above video image decoding device, in which (a) illustrates the transmitting device on board the above video image encoding device, and (b) illustrates the receiving device on board the above video image decoding device.

FIG. 28(*a*) is a block diagram illustrating a configuration of a transmitting device PROD_A equipped with a video image encoding device 2. As illustrated in FIG. 28(*a*), the transmitting device PROD_A is equipped with an encoder PROD_A1 that obtains encoded data by encoding a video image, a modulator PROD_A2 that obtains a modulated signal by modulating a carrier wave with the encoded data obtained by the encoder PROD_A1, and a transmitter PROD_A3 that transmits the modulated signal obtained by the modulator PROD_A2. The video image encoding device 2 discussed earlier is used as the encoder PROD_A1.

As sources for supplying a video image to input into the encoder PROD_A1, the transmitting device PROD_A may be additionally equipped with a camera PROD_A4 that captures a video image, a recording medium PROD_A5 onto which a video image is recorded, an input port PROD_A6 for externally inputting a video image, and an image processor A7 that generates or processes an image. Although FIG. 28(*a*) exemplifies a transmitting device PROD_A equipped with all of the above, some may also be omitted.

Note that the recording medium PROD_A5 may be a medium storing an unencoded video image, or a medium storing a video image encoded with a coding scheme for recording that differs from the coding scheme for transmission. In the latter case, a decoder (not illustrated) that decodes encoded data read out from the recording medium PROD_A5 in accordance with the coding scheme for recording may be interposed between the recording medium PROD_A5 and the encoder PROD_A1.

FIG. 28(*b*) is a block diagram illustrating a configuration of a receiving device PROD_B equipped with a video image decoding device 1. As illustrated in FIG. 28(*b*), the receiving device PROD_B is equipped with a receiver PROD_B1 that receives a modulated signal, a demodulator PROD_B2 that obtains encoded data by demodulating a modulated signal received by the receiver PROD_B1, and a decoder PROD_B3 that obtains a video image by decoding encoded data obtained by the demodulator PROD_B2. The video image decoding device 1 discussed earlier is used as the decoder PROD_B3.

As destinations to supply with a video image output by the decoder PROD_B3, the receiving device PROD_B may be additionally equipped with a display PROD_B4 that displays a video image, a recording medium PROD_B5 for recording a video image, and an output port PROD_B6 for externally outputting a video image. Although FIG. 28(*b*) exemplifies a receiving device PROD_B equipped with all of the above, some may also be omitted.

Note that the recording medium PROD_B5 may be a medium for recording an unencoded video image, or a medium for recording a video image encoded with a coding scheme for recording that differs from the coding scheme for transmission. In the latter case, an encoder (not illustrated) that encodes a video image acquired from the decoder PROD_B3 in accordance with the coding scheme for recording may be interposed between the decoder PROD_B3 and the recording medium PROD_B5.

Note that the transmission medium via which the modulated signal is transmitted may be wireless or wired. Also, the transmission format by which a modulated signal is transmitted may be broadcasting (herein indicating a transmission format in which a recipient is not specified in advance) or communication (herein indicating a transmission format in which a recipient is specified in advance). In other words, the transmission of a modulated signal may be realized by any of wireless transmission, wired transmission, wireless communication, and wired communication.

For example, a digital terrestrial broadcasting station (such as a broadcasting facility)/receiving station (such as a television receiver) is an example of a transmitting device PROD_A/receiving device PROD_B that transmits or receives a modulated signal by wireless broadcasting. Also, a cable television broadcasting station (such as a broadcasting facility)/receiving station (such as a television receiver) is an example of a transmitting device PROD_A/receiving device PROD_B that transmits or receives a modulated signal by wired broadcasting.

Also, a server (such as a workstation)/client (such as a television receiver, personal computer, or smartphone) for a service such as a video on demand (VOD) service or video sharing service using the Internet is an example of a transmitting device PROD_A/receiving device PROD_B that transmits or receives a modulated signal by communication (ordinarily, either a wireless or wired medium is used as the transmission medium in a LAN, while a wired medium is used as the transmission medium in a WAN). Herein, the term personal computer encompasses desktop PCs, laptop PCs, and tablet PCs. Also, the term smartphone encompasses multifunction mobile phone devices.

Note that a client of a video sharing service includes functions for decoding encoded data downloaded from a server and displaying the decoded data on a display, and additionally includes functions for encoding a video image captured with a camera and uploading the encoded data to a server. In other words, a client of a video sharing service functions as both the transmitting device PROD_A and the receiving device PROD_B.

Next, the ability to utilize the video image encoding device 2 and the video image decoding device 1 discussed above to record and play back a video image will be described with reference to FIG. 29.

FIG. 29(*a*) is a block diagram illustrating a configuration of a recording device PROD_C equipped with the video image encoding device 2 discussed earlier. As illustrated in FIG. 29(*a*), the recording device PROD_C is equipped with an encoder PROD_C1 that obtains encoded data by encoding a video image, and a writer PROD_C2 that writes encoded data obtained by the encoder PROD_C1 to a recording medium PROD_M. The video image encoding device 2 discussed earlier is used as the encoder PROD_C1.

Note that the recording medium PROD_M may be (1) of a type that is built into the recording device PROD_C, such as a hard disk drive (HDD) or a solid-state drive (SSD), (2) of a type that is connected to the recording device PROD_C, such as an SD memory card or Universal Serial Bus (USB) flash memory, or (3) loaded into a drive device (not illustrated) built into the recording device PROD_C, such as a Digital Versatile Disc (DVD) or Blu-ray Disc (BD; registered trademark).

Also, as sources for supplying a video image to input into the encoder PROD_C1, the recording device PROD_C may be additionally equipped with a camera PROD_C3 that captures a video image, an input port PROD_C4 for externally inputting a video image, a receiver PROD_C5 for receiving a video image, and an image processor C6 that generates or processes an image. Although FIG. 29(*a*) exemplifies a recording device PROD_C equipped with all of the above, some may also be omitted.

Note that the receiver PROD_C5 may be a receiver that receives an unencoded video image, or a receiver that receives encoded data that has been encoded with a coding scheme for transmission that differs from the coding scheme for recording. In the latter case, a transmission decoder (not illustrated) that decodes encoded data that has been encoded with the coding scheme for transmission may be interposed between the receiver PROD_C5 and the encoder PROD_C1.

Potential examples of such a recording device PROD_C are, for example, a DVD recorder, a BD recorder, or a hard disk (HD) recorder (in this case, the input port PROD_C4 or the receiver PROD_C5 becomes the primary source for supplying video images). Also, devices such as a camcorder (in this case, the camera PROD_C3 becomes the primary source for supplying video images), a personal computer (in this case, the receiver PROD_C5 becomes the primary source for supplying video images), a smartphone (in this case, the camera PROD_C3, the receiver PROD_C5, or the image processor C6 becomes the primary source for supplying video images) are also examples of such a recording device PROD_C.

FIG. 29(*b*) is a block diagram illustrating a configuration of a playback device PROD_D equipped with the video image decoding device 1 discussed earlier. As illustrated in FIG. 29(*b*), the playback device PROD_D is equipped with a reader PROD_D1 that reads out encoded data written to a recording medium PROD_M, and a decoder PROD_D2 that obtains a video image by decoding encoded data read out by the reader PROD_D1. The video image decoding device 1 discussed earlier is used as the decoder PROD_D2.

Note that the recording medium PROD_M may be (1) of a type that is built into the playback device PROD_D, such as an HDD or SSD, (2) of a type that is connected to the playback device PROD_D, such as an SD memory card or USB flash memory, or (3) loaded into a drive device (not illustrated) built into the playback device PROD_D, such as a DVD or BD.

Also, as destinations to supply with a video image output by the decoder PROD_D2, the playback device PROD_D may be additionally equipped with a display PROD_D3 that displays a video image, an output port PROD_D4 for externally outputting a video image, and a transmitter PROD_D5 that transmits a video image. Although FIG. 29(*b*) exemplifies a playback device PROD_D equipped with all of the above, some may also be omitted.

Note that the transmitter PROD_D5 may be a transmitter that transmits an unencoded video image, or a transmitter that transmits encoded data that has been encoded with a coding scheme for transmission that differs from the coding scheme for recording. In the latter case, an encoder (not illustrated) that encodes a video image with the coding scheme for transmission may be interposed between the decoder PROD_D2 and the transmitter PROD_D5.

Potential examples of such a playback device PROD_D are, for example, a DVD player, a BD player, or an HDD player (in this case, the output port PROD_D4 connected to a television receiver or the like becomes the primary destination to supply with video images). Also, devices such as a television receiver (in this case, the display PROD_D3 becomes the primary destination to supply with video images), digital signage (also referred to as electronic signs or electronic billboards; the display PROD_D3 or the transmitter PROD_D5 becomes the primary destination to supply with video images), a desktop PC (in this case, the output port PROD_D4 or the transmitter PROD_D5 becomes the primary destination to supply with video images), a laptop or tablet PC (in this case, the display PROD_D3 or the transmitter PROD_D5 becomes the primary destination to supply with video images), a smartphone (in this case, the display PROD_D3 or the transmitter PROD_D5 becomes the primary destination to supply with video images) are also examples of such a playback device PROD_D.

(Hardware Realization and Software Realization)

In addition, each block of the video image decoding device 1 and the video image encoding device 2 discussed earlier may be realized in hardware by logical circuits formed on an integrated circuit (IC chip), but may also be realized in software using a central processing unit (CPU).

In the latter case, each of the above devices is equipped with a CPU that executes the commands of a program that realizes respective functions, read-only memory (ROM) that stores the above program, random access memory (RAM) into which the above program is loaded, a storage device (recording medium) such as memory that stores the above program and various data, and the like. The object of the present invention is then achievable by supplying each of the above devices with a recording medium upon which is recorded, in computer-readable form, program code (a program in executable format, an intermediate code program, or source program) of the control program of each of the above devices that is software realizing the functions discussed above, and by having that computer (or CPU or MPU) read out and execute program code recorded on the recording medium.

For the above recording medium, a tape-based type such as magnetic tape or a cassette tape, a disk-based type such as a floppy (registered trademark) disk/hard disk, and also including optical discs such as a Compact Disc-Read-Only Memory (CD-ROM)/magneto-optical disc (MO disc)/MiniDisc (MD)/Digital Versatile Disc (DVD)/CD-Recordable (CD-R)/Blu-ray Disc (registered trademark), a card-based type such as an IC card (including memory cards)/optical memory card, a semiconductor memory-based type such as mask ROM/erasable programmable read-only memory (EPROM)/electrically erasable and programmable read-only memory (EEPROM)/flash ROM, a logical circuit-based type such as a programmable logic device (PLD) or field-programmable gate array (FPGA), or the like may be used.

In addition, each of the above devices may be configured to be connectable to a communication network, such that the above program code is supplied via a communication network. The communication network is not particularly limited, insofar as program code is transmittable. For example, a network such as the Internet, an intranet, an extranet, a local area network (LAN), an Integrated Services Digital Network (ISDN), a value-added network (VAN), a community antenna television/cable television (CATV) communication network, a virtual private network, a telephone line network, a mobile communication network, or a satellite communication network is usable. Also, the transmission medium constituting the communication network is not limited to a specific configuration or type, insofar as program code is transmittable. For example, a wired medium such as the Institute of Electrical and Electronic Engineers 1394 (IEEE 1394), USB, power line carrier, cable TV line, telephone line, or asymmetric digital subscriber line (ADSL), or a wireless medium such as infrared as in the Infrared Data Association (IrDA) or a remote control, Bluetooth (registered trademark), IEEE 802.11 wireless, High Data Rate (HDR), Near Field Communication (NFC), the Digital Living Network Alliance (DLNA), a mobile phone network, a satellite link, or a digital terrestrial network is usable. Note that the present invention may also be realized in the form of a computer data signal in which the above program code is embodied by electronic transmission, and embedded in a carrier wave.

(Conclusion)

The present invention may also be expressed as follows.

(1) An image decoding device is configured as an image decoding device that generates a predicted image by generating a predicted image with an intra prediction method associated with a prediction mode, equipped with: a prediction mode-dependent method selection processor that selects a decoding method to use in a designated decoding process on the basis of a designated feature related to a prediction mode; and a variable-length decoder that decodes a prediction mode number that uniquely specifies a prediction mode number; wherein the prediction mode number has a property enabling the designated feature to be simply determined.

(2) The above image decoding device may also be equipped with: a prediction direction deriver that decides a main direction and a gradient of a directional prediction on the basis of the prediction mode number; and a directionally predicted image generator that generates a predicted image on the basis of the main direction and the gradient; wherein the designated feature related to the prediction mode is the main direction, and the designated decoding process is a predicted image generation process by the predicted image generator.

(3) Furthermore, in the above image decoding device, equal numbers of odd and even prediction mode numbers may be respectively assigned to all directional prediction modes whose main direction is the vertical direction, while the prediction mode numbers assigned to all directional prediction modes whose main direction is the vertical direction, and different numbers of odd and even prediction mode numbers, may be respectively assigned to all directional prediction modes whose main direction is the horizontal direction.

(4) The above image decoding device may also be equipped with: a prediction direction deriver that decides a main direction and a gradient of a directional prediction on the basis of the prediction mode number; and a directionally predicted image generator that generates a predicted image on the basis of the main direction and the gradient; wherein the designated feature related to the prediction mode is the absolute value of the gradient, and the designated decoding process is a process of deciding the absolute value of the gradient by the prediction direction deriver.

(5) The above image decoding device may also be equipped with: a prediction direction deriver that decides a main direction and a gradient of a directional prediction on the basis of the prediction mode number; and a reference pixel configuration section that selects a filter to apply to reference pixels used in predicted image generation on the basis of the prediction mode number; wherein the designated feature related to the prediction mode is the absolute value of the gradient, and the designated decoding process is a filter selection process by the reference pixel configuring section.

(6) The above image decoding device may also be equipped with: a prediction direction deriver that decides a main direction and a gradient of a directional prediction on the basis of the prediction mode number; wherein the variable-length decoder decodes transform coefficients in a scan order decided on the basis of the prediction mode number, the designated feature related to the prediction mode is the sign of the gradient, and the designated decoding process is a scan order selection process by the variable-length decoder.

(7) The above image decoding device may also be equipped with: a prediction direction deriver that decides a main direction and a gradient of a directional prediction on the basis of the prediction mode number; and an inverse quantization/inverse transform section that decodes a prediction difference by applying to transform coefficients a vertical one-dimensional transform and a horizontal one-dimensional transform that are selected on the basis of the prediction mode number; wherein the designated feature related to the prediction mode is the main direction and the sign of the gradient, and the designated decoding process is a process of selecting a vertical one-dimensional transform and a horizontal one-dimensional transform by the inverse quantization/inverse transform section.

(8) An image decoding device is configured as an image decoding device that generates a predicted image with an intra prediction method associated with a prediction mode, equipped with: a prediction mode decoder that decodes a prediction mode-related syntax from encoded data by arithmetic decoding, and also decodes a prediction mode on the basis of the prediction mode-related syntax; wherein the prediction mode-related syntax at least includes an estimated prediction mode flag, an estimated prediction mode index, and a residual prediction mode, and the prediction mode decoder, in the case in which the estimated prediction mode flag indicates using an estimated prediction mode, derives a first estimated prediction mode on the basis of a prediction mode of a prediction unit neighboring to the left of a target prediction unit, also derives a second estimated prediction mode on the basis of a prediction mode of a prediction unit neighboring on top of the target prediction unit, and decodes one of the estimated prediction modes as the prediction mode on the basis of the value of the estimated prediction mode index, without conducting a magnitude comparison of the two estimated prediction modes.

(9) An image decoding device is configured as an image decoding device that generates a predicted image with an intra prediction method associated with a prediction mode, equipped with: a reference pixel configuration section that selects a filter to apply to reference pixels used in predicted image generation on the basis of the prediction mode number and a size of a unit of predicted image generation; wherein, in a case in which the size of a target prediction unit is large, the filter selection by the reference pixel configuration section selects to apply a reference pixel filter to a prediction mode associated with a prediction direction having a smaller angle with respect to a main direction compared to a case in which the size of a target prediction unit is small.

(10) An image encoding device is configured as an image encoding device that generates a predicted image with an intra prediction method associated with a prediction mode, equipped with: a prediction mode-dependent method selection processor that selects an encoding method to use in a designated encoding process on the basis of a designated feature related to a prediction mode; and a variable-length encoder that encodes a prediction mode number that uniquely specifies a prediction mode number; wherein the prediction mode number has a property enabling the designated feature to be simply determined.

The present invention is not limited to the foregoing embodiments, and various modifications are possible within the scope indicated by the claims. In other words, embodiments that may be obtained by combining technical means appropriately modified within the scope indicated by the claims are to be included within the technical scope of the present invention.

In addition, the present invention may be expressed as follows.

In an image decoding device according to a mode of the present invention, preferably, the feature specifying means specifies an absolute value of the gradient of the prediction direction as the feature, and the decoding means derives a prediction direction corresponding to the prediction mode by deriving the main direction of the directional prediction, and also deriving the gradient of the prediction direction on the basis of the absolute value of the gradient of the prediction direction, as the decoding process.

According to the above configuration, the absolute value of the gradient of a prediction direction is specified from a prediction mode number. In other words, the same index that specifies the gradient is derived from prediction mode numbers that respectively correspond to a group of prediction modes having gradients with equal absolute values. Herein, the group of prediction mode having gradients with equal absolute values is a group of prediction modes having equal absolute values of the angle obtained between a corresponding prediction direction and the main direction. In terms of the example in NPL 1, the absolute value of the gradient of a prediction direction is the same for four directional prediction modes (for example, the absolute value 5 of the gradient for VER−2, HOR−2, VER+2, and HOR+2). For this reason, since the absolute value of the gradient of a prediction direction is derived from the prediction mode number (prediction mode identifier), there is no need to provide a table that associates an absolute value of the gradient of a prediction direction respectively to all prediction mode numbers (prediction mode identifiers).

Consequently, the size of a table for deriving the absolute value of the gradient of a prediction direction from a prediction mode number (prediction mode identifier) may be reduced.

Also, in an image decoding device according to a mode of the present invention, preferably, in the above association, consecutive prediction mode numbers are associated with prediction modes corresponding to prediction directions having equal absolute values of the gradient, and the feature specifying means specifies the absolute value of the gradient by determining, on the basis of the prediction mode number, the group consisting of prediction modes corresponding to prediction directions having equal absolute values of the gradient to which belongs the prediction mode associated with that prediction mode number.

According to the above configuration, the following properties may be obtained.

Property: Simplicity of Determining Absolute Value of Displacement (Gradient)

This is a property enabling simple determination of the absolute value of the displacement of the prediction direction corresponding to a prediction mode. In order to satisfy this property, for example, the prediction modes associated with displacements having equal absolute values may be consecutive, so that the absolute value of the gradient may be specified by determining the group consisting of prediction modes corresponding to prediction directions having equal absolute values of the gradient to which belongs the prediction mode associated with a prediction mode number.

This determination may be conducted according to the value obtained by performing a right-shift operation on the prediction mode number by a designated numerical value, for example. A specific example is as follows. Assume that the prediction mode numbers 7, 8, 9, and 10 are respectively associated with VER−2, HOR−2, VER+2, and HOR+2. At this point, if the operation (m+1)>>2 is applied to a prediction mode number m (where m=7 to 10), 2 is obtained. In this way, it is possible to specify a group consisting of prediction modes corresponding to prediction directions having equal absolute values of the gradient to which a prediction mode belongs. Note that the above determination may also be conducted on the basis of the product obtained by dividing the prediction mode number.

Consequently, an absolute value of a gradient does not need to be associated with each prediction mode number (prediction mode identifier), and it is sufficient to associate the absolute value of the gradient with the above group. As a result, the size of an association table may be reduced.

In an image decoding device according to the present invention, preferably, the feature specifying means specifies an absolute value of the gradient of the prediction direction as the feature, and the decoding means selects a filter to apply to reference pixels used in predicted image generation on the basis of the absolute value of the gradient as the decoding process.

According to the above configuration, the absolute value of the gradient of a prediction direction is specified from a prediction mode number. For this reason, there is no need to provide a table that associates an absolute value of the gradient of a prediction direction respectively to all prediction mode numbers (prediction mode identifiers).

In addition, in the filter process, it is desirable to select a filter according to the size of the target prediction unit, and the absolute value of the gradient of the prediction direction. For example, in the case of a large target prediction unit size, a reference pixel filter is applied to prediction modes associated with prediction directions having a small absolute value of the gradient compared to the case of a small target prediction unit size.

According to the above, a memory reduction is possible in a reference pixel filter application process.

In an image decoding device according to a mode of the present invention, preferably, the feature specifying means specifies a sign of the gradient of the prediction direction as the feature, and the decoding means decides a scan order in which to decode transform coefficients on the basis of the sign of the gradient as the decoding process.

According to the above configuration, the sign of the gradient of a prediction direction is specified from a prediction mode number. For this reason, there is no need to provide a table that associates a sign of the gradient of a prediction direction respectively to all prediction mode numbers (prediction mode identifiers).

In order to specify the sign of the gradient of a prediction direction from a prediction mode number, it is sufficient for the association between the prediction mode number and the prediction mode to have a property like the following, for example.

Property: Simplicity of Determining Sign of Displacement (Gradient)

One example of an association for realizing this property is to associate prediction modes associated with displacements of the same sign with prediction mode numbers that are periodically repeated two at a time.

As a specific example, assume that the prediction mode numbers 7, 8, 9, and 10 are respectively associated with VER−2, HOR−2, VER+2, and HOR+2. At this point, the sign of the displacement (gradient) may be derived as follows.

Calculate the remainder when dividing the prediction mode number m+1 (where m=7 to 10) by 4. At this point, when the remainder is 0 or 1, the sign of the displacement is negative. When the remainder is 2 or 3, the sign of the displacement is positive.

Also, preferably, the scan order of decoding transform coefficients is selected according to the gradient of the prediction direction. Specifically, selecting a diagonal scan is preferable if the gradient is greater than a designated value.

Note that, conversely, a scan order may be selected on the basis of the main direction of the prediction direction if the gradient is less than or equal to the designated value. For example, a vertical scan may be selected if the main direction is the vertical direction, and a horizontal scan may be selected if the main direction is the horizontal direction.

Furthermore, it is also possible to use an association that satisfies the above property 1 in conjunction with the property of the simplicity of determining the sign of the displacement (gradient). In the specific example discussed above, such a property is satisfied. In this way, the above selection may be made by utilizing the property 1.

According to the above, a memory reduction is possible in a scan order selection process.

In an image decoding device according to the present invention, preferably, the feature specifying means specifies a main direction and a sign of the gradient of the prediction direction as the feature, and the decoding means decodes a prediction difference by applying to transform coefficients a vertical one-dimensional transform and a horizontal one-dimensional transform on the basis of the main direction and the sign of the gradient as the decoding process.

According to the above configuration, the main direction and the sign of the gradient of a prediction direction is specified from a prediction mode number. As discussed above, it is also possible to use an association that satisfies the above property 1 in conjunction with the property of the simplicity of determining the sign of the displacement (gradient).

Also, for the inverse orthogonal transform of transform coefficients, a vertical one-dimensional inverse transform and a horizontal one-dimensional inverse transform may be adopted. In these inverse transforms, the one-dimensional inverse DCT or the one-dimensional inverse DST may be selected.

For the vertical one-dimensional inverse transform and the horizontal one-dimensional inverse transform, preferably, a combination is selected according to the characteristics of the prediction difference. The characteristics of the prediction difference are determined by the prediction mode. For a prediction mode of directional prediction, a combination of a vertical one-dimensional inverse transform and a horizontal one-dimensional inverse transform is selected as follows, for example.

If the main direction of the prediction mode is the vertical direction, or alternatively, the main direction of the prediction mode is the horizontal direction and the prediction direction is from the upper-left to the lower-right direction, the one-dimensional DST is configured as the vertical one-dimensional inverse transform. Otherwise, the one-dimensional DCT is configured as the vertical one-dimensional inverse transform.

Meanwhile, if the main direction of the prediction mode is the horizontal direction, or alternatively, the main direction of the prediction mode is the vertical direction and the prediction direction is from the upper-left to the lower-right direction, the one-dimensional DST is configured as the horizontal one-dimensional inverse transform. Otherwise, the one-dimensional DCT is configured as the horizontal one-dimensional inverse transform.

First, the main direction may utilize the above property 1. Also, in the case of a main direction in the vertical direction and the horizontal direction, whether or not the prediction direction is from the upper-left to the lower-right may be determined by the sign of the gradient. Consequently, the above property of the simplicity of determining the sign of the displacement (gradient) may be utilized.

According to the above, a memory reduction is possible in a process of selecting a combination of one-dimensional inverse transforms.

In addition, an image decoding device according to a mode of the present invention is preferably an image decoding device that decodes an image that has been encoded by generating a predicted image with an intra prediction method associated with a prediction mode, equipped with: arithmetic decoding means that, to decode a prediction mode of a target prediction unit, decodes, from encoded data by arithmetic decoding, an estimated prediction mode flag indicating whether or not to use an estimated prediction mode, and an estimated prediction mode index for designating one of multiple estimated prediction modes; estimated prediction mode deriving means that derives the plurality of estimated prediction modes from already-decoded prediction modes assigned to a plurality of nearby prediction units near the target prediction unit; and prediction mode decoding means that, in a case in which context for arithmetic decoding of the estimated prediction mode index is not configured, selects an estimated prediction mode indicated by the estimated prediction mode index if the estimated prediction mode flag indicates a match with an estimated prediction mode, and uses a swapping process for the plurality of estimated prediction modes if the estimated prediction mode flag does not indicate a match with an estimated prediction mode; wherein if the estimated prediction mode flag does not indicate a match with an estimated prediction mode, the prediction mode decoding means executes an estimated prediction mode swapping process on the basis of a magnitude comparison of prediction mode numbers corresponding to the plurality of prediction modes.

In the above configuration, first, an estimated prediction mode flag and an estimated prediction mode index are decoded from encoded data by arithmetic decoding.

Also, a plurality of estimated prediction modes are derived in accordance with already-decoded prediction modes assigned to nearby prediction units. Also, estimated prediction modes are designated by the estimated prediction mode index.

Herein, a nearby prediction unit refers to a prediction unit that is spatially correlated with the target prediction unit. For example, prediction units neighboring the target prediction unit may be treated as nearby prediction units. Also, the nearby prediction units may be the left-neighboring prediction unit and the top-neighboring prediction unit of the target prediction unit.

Note that in the decoding of parameters by arithmetic decoding, context depending on the probability of 0 or 1 may be used. In the case of using context, the bit rate may be reduced if bias occurs in the probability of 0 or 1.

Herein, small prediction mode numbers are associated with prediction modes typically having a high probability.

Thus, by assigning prediction modes with small prediction mode numbers to small values of the estimated prediction mode index, the probability of an estimated prediction mode corresponding to such a small value of the estimated prediction mode index becomes higher than the probability of an estimated prediction mode corresponding to a larger value of the estimated prediction mode index.

From the above, in the case of using context, if a prediction mode with a small prediction mode number is assigned to a larger estimated prediction mode index than a prediction mode with a large prediction mode number, it is preferable to swap (exchange) the index assignment for the prediction mode with the small prediction mode number and the index assignment for the prediction mode with the large prediction mode number.

Also, in this way, if bias in the probability occurs, the bit rate may be reduced by using context in the arithmetic decoding of the estimated prediction mode index.

Conversely, in the case of not using context, the arithmetic decoding decodes by treating the occurrence of 0 and 1 as being equal in probability, or in other words, "no bias occurs in the probability". Consequently, conducting the above swap does not only not contribute to a bit rate reduction, but may even lead to an inadvertent increase in the processing load. For this reason, in the case of not using context, it is desirable to omit the above swap.

According to the above configuration, if context is not configured for arithmetic decoding of the above estimated prediction mode index, an estimated prediction mode swapping process based on a magnitude comparison of the mode numbers corresponding to the above plurality of estimated prediction modes is omitted.

As a result, the processing load required to derive a prediction mode in the case of using an estimated prediction mode may be reduced.

Additionally, typically, applying a smoothing filter to a reference image in a flat area of the image is effective and improves the quality of the predicted image. Also, prediction units of large size are qualitatively selected for comparatively flat areas. Consequently, in prediction units of large size, further increasing the filter application targets is preferable.

According to the above configuration, in a case in which the size of a target prediction unit is large, a reference pixel filter is applied to a prediction mode number associated with a prediction mode associated with a prediction direction having a smaller angle obtained with respect to a main direction compared to a case in which the size of a target prediction unit is small.

For this reason, a smoothing filter based on the prediction direction may be applied according to the size of the target prediction unit, thereby potentially improving the quality of the predicted image.

Note that an image encoding device equipped with a configuration corresponding to the above image decoding device also lies in the scope of the present invention. According to an image encoding device configured as above, advantageous effects similar to an image decoding device according to the present invention may be exhibited.

In order to solve the above problems, a data structure of encoded data according to the present invention is a data structure of encoded data generated by encoding a prediction difference, which is obtained by subtracting a predicted image generated in accordance with a prediction mode selected from a prediction mode group per a prediction unit from an original image, together with side information that includes prediction mode designation information that designates a selected prediction mode, wherein the prediction mode designation information includes a prediction mode number associated with an intra prediction method based on a prediction direction determined by a main direction and a gradient, the data structure of encoded data having a property enabling a designated feature related to at least one of the main direction and the gradient to be specified from the prediction mode number.

According to the above configuration, in the case of taking a decoded image and encoded data as input, and adaptively applying a post-filter to the decoded image, or more specifically, in the case of reconstructing prediction mode numbers on the basis of the encoded data, determining whether the main direction of each prediction mode is the vertical direction or the horizontal direction, and applying a filter to areas corresponding to each prediction mode in the decoded image depending on the determination result, the determination of the main direction of a prediction mode may be realized without referencing a table that associates each prediction mode number with a main direction. Consequently, the memory required during encoding and decoding may be reduced.

INDUSTRIAL APPLICABILITY

The present invention may be suitably applied to an image decoding device that decodes encoded data into which image data is encoded, and an image encoding device that generates encoded data into which image data is encoded. The present invention may also be suitably applied to a data structure of encoded data that is generated by an image encoding device and referenced by an image decoding device.

REFERENCE SIGNS LIST

1 video image decoding device (image decoding device)
11 variable-length decoder (arithmetic decoding means)
111 prediction set decision section
112 MPM deriver (estimated prediction mode deriving means)
113 MPM determination section
114 prediction mode reconstruction section (prediction mode reconstructing means)
116 chroma prediction mode reconstruction section
117 context storage section
13 inverse quantization/inverse transform section (reconstructing means)
14 predicted image generator
144 reference pixel filter section (reconstructing means, filter selecting means)
145 luma prediction section (reconstructing means)
1451 prediction method selector
1452 predicted image deriver
1452D DC prediction section
1452P planar prediction section
1452H horizontal prediction section
1452V vertical prediction section
1452A angular prediction section (reconstructing means)
1453 prediction direction deriver (feature specifying means)
1453A, 1453A' main direction deriver (feature specifying means)
1453B, 1453B' gradient deriver (feature specifying means)
146 chroma prediction section
DEFPM1 to DEFPM3 prediction mode definition
DEFANG1*r*, DEFANG1*r* gradient definition table
DEFANG2 gradient absolute value definition table
2 video image encoding device (image encoding device)
23 predicted image generator
22 inverse quantization/inverse transform section
29 encoded data generator (encoding means)
291 prediction set decision section
292 MPM deriver
293 MPM determination section
294 prediction mode encoder
296 chroma prediction mode encoder

The invention claimed is:

1. An image decoding device for generating a predicted image by using an intra prediction mode, the image decoding device comprising:
- a decoding circuit that:
  - determines whether a prediction mode number indicating the intra prediction mode is greater than or equal to a first threshold value,
  - derives reference pixels for angular prediction by using neighboring samples based on the prediction mode number is greater than or equal to the first threshold value, and
  - derives the predicted image by using the reference pixels; and
- a filter circuit that sets a value of a filter application flag based on the prediction mode number and a target block size, wherein
- the filter circuit derives an absolute value of a gradient of the intra prediction mode by using a difference value between (i) the prediction mode number and (ii) a vertical direction or a horizontal direction,
- the value of the filter application flag is set, in a case that the absolute value of the gradient of the intra prediction mode is greater than a second threshold value specified according to the target block size, the second threshold value being configured with a smaller value for a larger target block size,
- the value of the filter application flag is set equal to zero, in a case that the target block size is equal to 4, and
- the gradient indicates that, as the absolute value of the gradient of the intra prediction mode increases, an angle obtained between a prediction direction corresponding to the prediction mode number and the vertical direction or the horizontal direction also increases.

2. An image encoding device for generating a predicted image by using an intra prediction mode, the image encoding device comprising:
- an encoding circuit that:
  - determines whether a prediction mode number indicating the intra prediction mode is greater than or equal to a first threshold value,
  - derives reference pixels for angular prediction by using neighboring samples based on the prediction mode number is greater than or equal to the first threshold value, and
  - derives the predicted image by using the reference pixels; and
- a filter circuit that sets a value of a filter application flag based on the prediction mode number and a target block size, wherein
- the filter circuit derives an absolute value of a gradient of the intra prediction mode by using a difference value between (i) the prediction mode number and (ii) a vertical direction or a horizontal direction, the value of the filter application flag is set, in a case that the absolute value of the gradient of the intra prediction mode is greater than a second threshold value specified according to the target block size, the second threshold value being configured with a smaller value for a larger target block size, the value of the filter application flag is set equal to zero, in a case that the target block size is equal to 4, and the gradient indicates that, as the absolute value of the gradient of the intra prediction mode increases, an angle obtained between a prediction direction corresponding to the prediction mode number and the vertical direction or the horizontal direction also increases.

3. A non-transitory computer-readable storage medium having stored therein instructions to cause one or more processors of a device to perform a method for generating a predicted image by using an intra prediction mode, the method comprising:

determining whether a prediction mode number indicating the intra prediction mode is greater than or equal to a first threshold value, deriving reference pixels for angular prediction by using neighboring samples based on the prediction mode number is greater than or equal to the first threshold value, deriving the predicted image by using the reference pixels, deriving an absolute value of a gradient of the intra prediction mode by using a difference value between (i) the prediction mode number and (ii) a vertical direction or a horizontal direction, and setting a value of a filter application flag based on the prediction mode number and a target block size, wherein the value of the filter application flag is set, in a case that the absolute value of the gradient of the intra prediction mode is greater than a second threshold value specified according to the target block size, the second threshold value being configured with a smaller value for a larger target block size, the value of the filter application flag is set equal to zero, in a case that the target block size is equal to 4, and the gradient indicates that, as the absolute value of the gradient of the intra prediction mode increases, an angle obtained between a prediction direction corresponding to the prediction mode number and the vertical direction or the horizontal direction also increases.

4. The image decoding device of claim 1, wherein the first threshold value is equal to 18.

* * * * *